US012226281B2

(12) United States Patent
O'Leary et al.

(10) Patent No.: US 12,226,281 B2
(45) Date of Patent: Feb. 18, 2025

(54) FLEXIBLE 3D PRINTED ORTHODONTIC DEVICE WITH ATTACHMENT SUPPORTS

(71) Applicant: ALIGN TECHNOLOGY, INC., San Jose, CA (US)

(72) Inventors: Siobhan O'Leary, Santa Clara, CA (US); Peter Webber, San Mateo, CA (US); Jun Sato, San Jose, CA (US); Crystal Tjhia, Sunnyvale, CA (US); Jessica H. Schiltz, San Jose, CA (US); Jeremy Riley, Mountain View, CA (US); Ken Wu, San Jose, CA (US); Kangning Su, Arlington, VA (US); Yuxiang Wang, Newark, CA (US); Zhaonan Sun, Charlottesville, VA (US); Andrei Soldatov, Santa Clara, CA (US)

(73) Assignee: ALIGN TECHNOLOGY, INC., San Jose, CA (US)

(*) Notice: Subject to any disclaimer, the term of this patent is extended or adjusted under 35 U.S.C. 154(b) by 136 days.

(21) Appl. No.: 17/249,253

(22) Filed: Feb. 25, 2021

(65) Prior Publication Data

US 2021/0259810 A1 Aug. 26, 2021

Related U.S. Application Data

(63) Continuation of application No. 17/249,218, filed on Feb. 24, 2021.

(Continued)

(51) Int. Cl.
A61C 7/08 (2006.01)
A61C 7/00 (2006.01)
(Continued)

(52) U.S. Cl.
CPC ............... *A61C 7/08* (2013.01); *A61C 7/002* (2013.01); *A61C 7/146* (2013.01); *B33Y 80/00* (2014.12)

(58) Field of Classification Search
CPC ...................................... A61C 7/146
See application file for complete search history.

(56) References Cited

U.S. PATENT DOCUMENTS 5,820,368 A 10/1998 Wolk
5,863,198 A * 1/1999 Doyle ............... A61C 7/146
433/3

(Continued)

FOREIGN PATENT DOCUMENTS

GB 2392844 A 3/2004
WO 2011065777 A2 6/2011
WO WO-2018232113 A1 * 12/2018 ............ A61C 7/002

OTHER PUBLICATIONS

Screen Captures From Youtube Video Entitled "Articulated Cuttlefish With Print-in-place Ball & Socket Joints," 4 pages, uploaded on Sep. 16, 2016 by Andrew Sink. Retrieved from Internet: https://www.youtube.com/watchv=njPpyidOFSc. (Year: 2016).

(Continued)

Primary Examiner — Cris L. Rodriguez
Assistant Examiner — Courtney N Huynh
(74) Attorney, Agent, or Firm — FisherBroyles, LLP

(57) ABSTRACT

A dental attachment placement device comprises a plurality of articulated registration elements shaped for placement on a plurality of teeth, which can facilitate placement, accommodate tooth movement, and improve alignment of the registration elements with the teeth, so as to accurately position an attachment for placement. The plurality of registration elements may comprise one or more attachment supports and one or more retention supports extending from the plurality of registration elements. A dental attachment (Continued)

can be removably coupled to the attachment support. The plurality of registration elements and attachment supports may be located on opposing sides of one or more teeth in order to maintain placement prior to adhering the attachment to the tooth. In some embodiments, each of the plurality of registration elements comprises a tooth registration surface shaped to engage the tooth with a specific position and orientation for accurate positioning of the attachment.

21 Claims, 30 Drawing Sheets

Related U.S. Application Data

(60) Provisional application No. 62/980,680, filed on Feb. 24, 2020.

(51) Int. Cl.
*A61C 7/14* (2006.01)
*B33Y 80/00* (2015.01)

(56) References Cited

U.S. PATENT DOCUMENTS

| | | |
|---|---|---|
| 6,183,248 B1 | 2/2001 | Chishti et al. |
| 6,309,215 B1 | 10/2001 | Phan et al. |
| 6,386,864 B1 | 5/2002 | Kuo |
| 6,454,565 B2 | 9/2002 | Phan et al. |
| 6,471,511 B1 | 10/2002 | Chishti et al. |
| 6,524,101 B1 | 2/2003 | Phan et al. |
| 6,572,372 B1 | 6/2003 | Phan et al. |
| 6,607,382 B1 | 8/2003 | Kuo et al. |
| 6,705,863 B2 | 3/2004 | Phan et al. |
| 6,783,604 B2 | 8/2004 | Tricca |
| 6,790,035 B2 | 9/2004 | Tricca et al. |
| 6,814,574 B2 | 11/2004 | Abolfathi et al. |
| 6,830,450 B2 | 12/2004 | Knopp et al. |
| 6,947,038 B1 | 9/2005 | Anh et al. |
| 7,074,039 B2 | 7/2006 | Kopelman et al. |
| 7,104,792 B2 | 9/2006 | Taub et al. |
| 7,121,825 B2 | 10/2006 | Chishti et al. |
| 7,160,107 B2 | 1/2007 | Kopelman et al. |
| 7,192,273 B2 | 3/2007 | McSurdy, Jr. |
| 7,234,934 B2 | 6/2007 | Rosenberg |
| 7,347,688 B2 | 3/2008 | Kopelman et al. |
| 7,354,270 B2 | 4/2008 | Abolfathi et al. |
| 7,448,514 B2 | 11/2008 | Wen |
| 7,481,121 B1 | 1/2009 | Cao |
| 7,543,511 B2 | 6/2009 | Kimura et al. |
| 7,553,157 B2 | 6/2009 | Abolfathi et al. |
| 7,600,999 B2 | 10/2009 | Knopp |
| 7,658,610 B2 | 2/2010 | Knopp |
| 7,766,658 B2 | 8/2010 | Tricca et al. |
| 7,771,195 B2 | 8/2010 | Knopp et al. |
| 7,831,322 B2 | 11/2010 | Liu et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,914,283 B2 | 3/2011 | Kuo |
| 7,947,508 B2 | 5/2011 | Tricca et al. |
| 8,152,518 B2 | 4/2012 | Kuo |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,161,823 B2 | 10/2015 | Morton et al. |
| 9,241,774 B2 | 1/2016 | Li et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,487 B2 | 1/2021 | Cam et al. |
| 10,912,629 B2 | 2/2021 | Tanugula et al. |
| 10,959,810 B2 | 3/2021 | Li et al. |
| 10,993,783 B2 | 5/2021 | Wu et al. |
| 2002/0192617 A1 | 12/2002 | Phan et al. |
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |
| 2007/0031775 A1 | 2/2007 | Andreiko |
| 2008/0118882 A1 | 5/2008 | Su |
| 2008/0160473 A1 | 7/2008 | Li et al. |
| 2008/0268400 A1 | 10/2008 | Moss et al. |
| 2008/0286716 A1 | 11/2008 | Sherwood |
| 2008/0286717 A1 | 11/2008 | Sherwood |
| 2009/0280450 A1 | 11/2009 | Kuo |
| 2010/0055635 A1 | 3/2010 | Kakavand |
| 2010/0129763 A1 | 5/2010 | Kuo |
| 2011/0189629 A1* | 8/2011 | Kilcher .................. A61C 5/85 |
| | | 433/226 |
| 2011/0269092 A1 | 11/2011 | Kuo et al. |
| 2013/0029285 A1 | 1/2013 | Teasdale |
| 2014/0067334 A1 | 3/2014 | Kuo |
| 2014/0255864 A1 | 9/2014 | Machata et al. |
| 2015/0157421 A1 | 6/2015 | Martz et al. |
| 2015/0265376 A1 | 9/2015 | Kopelman |
| 2015/0366637 A1 | 12/2015 | Kopelman et al. |
| 2015/0366638 A1 | 12/2015 | Kopelman et al. |

(56) References Cited

U.S. PATENT DOCUMENTS

| | | |
|---|---|---|
| 2016/0157962 A1* | 6/2016 | Kim ................. B29C 65/48 156/242 |
| 2016/0193014 A1 | 7/2016 | Morton et al. |
| 2016/0242870 A1 | 8/2016 | Matov et al. |
| 2016/0242871 A1 | 8/2016 | Morton et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007365 A1 | 1/2017 | Kopelman et al. |
| 2017/0007366 A1 | 1/2017 | Kopelman et al. |
| 2017/0007386 A1 | 1/2017 | Mason et al. |
| 2017/0135792 A1 | 5/2017 | Webber |
| 2017/0135793 A1 | 5/2017 | Webber et al. |
| 2017/0165032 A1 | 6/2017 | Webber et al. |
| 2017/0319296 A1 | 11/2017 | Webber et al. |
| 2018/0153648 A1* | 6/2018 | Shanjani ................ B33Y 10/00 |
| 2018/0153733 A1 | 6/2018 | Kuo |
| 2018/0168776 A1 | 6/2018 | Webber |
| 2018/0318046 A1 | 11/2018 | Lee |
| 2018/0353264 A1 | 12/2018 | Riley et al. |
| 2018/0360567 A1 | 12/2018 | Xue et al. |
| 2018/0368944 A1 | 12/2018 | Sato et al. |
| 2019/0000592 A1 | 1/2019 | Cam et al. |
| 2019/0000593 A1 | 1/2019 | Cam et al. |
| 2019/0021817 A1 | 1/2019 | Sato et al. |
| 2019/0029775 A1 | 1/2019 | Morton et al. |
| 2019/0046297 A1 | 2/2019 | Kopelman et al. |
| 2019/0069975 A1 | 3/2019 | Cam et al. |
| 2019/0099129 A1 | 4/2019 | Kopelman et al. |
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0231477 A1 | 8/2019 | Shanjani et al. |
| 2019/0262101 A1 | 8/2019 | Shanjani et al. |
| 2019/0298494 A1 | 10/2019 | Webber et al. |
| 2019/0314119 A1* | 10/2019 | Kopelman ................ A61C 7/10 |
| 2019/0338067 A1 | 11/2019 | Liska et al. |
| 2019/0343606 A1 | 11/2019 | Wu et al. |
| 2020/0000553 A1 | 1/2020 | Makarenkova et al. |
| 2020/0086553 A1 | 3/2020 | Mojdeh et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0100871 A1 | 4/2020 | Wang et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0390523 A1 | 12/2020 | Sato et al. |
| 2021/0078357 A1 | 3/2021 | Venkatasanthanam et al. |

OTHER PUBLICATIONS

WO2011065777A2 (Kwon Haja; Kangseokjin) (Orapixco LTD; Kwon Ha Ja; Kang Seok Jin) One-Piece Orthodontic Jig, Jun. 3, 2011. [retrieved on Mar. 15, 2023], Translation retrieved from: Espacenet (Year: 2011).

"Channel." [online], Merriam-Webster.com Dictionary, Merriam-Webster. 14 pages, Retrieved on Sep. 26, 2024. Retrieved from the Internet: URL: https://www.merriam-webster.com/dictionary/channel. (Year: 2024).

* cited by examiner

FLEXIBLE 3D PRINTED ORTHODONTIC DEVICE WITH ATTACHMENT SUPPORTS

RELATED APPLICATIONS

This application is a continuation of U.S. patent application Ser. No. 17/249,218, filed Feb. 24, 2021, which claims the benefit under 35 U.S.C. § 119 (e) of U.S. Provisional Patent Application No. 62/980,680, filed Feb. 24, 2020, and titled "Flexible 3D Printed Orthodontic Device" all of which are incorporated, in their entirety, by this reference.

BACKGROUND

Procedures such as orthodontic and dental procedures may include repositioning misaligned teeth and/or changing bite configurations for improved cosmetic appearance and/or dental function. Teeth repositioning can be accomplished, for example, by applying controlled forces to one or more teeth or a jaw of a patient over a period of time. As an example, teeth repositioning may be provided through a process that uses positioning appliances for realigning teeth. Such appliances may utilize a shell of material having resilient properties, referred to as an "aligner," that generally conforms to a patient's teeth but is slightly out of alignment with a current tooth configuration.

Placement of such an appliance over the teeth may provide controlled forces in specific locations to gradually move the teeth into a new configuration. Repetition of this process with successive appliances in progressive configurations can move the teeth through a series of intermediate arrangements to a final desired arrangement. Appliances can also be used for other dental conditions, such as application of medications, appliances to help with sleep apnea, mandibular relocation, and other issues.

Some treatments may use one or more attachments that may be affixed to the one or more teeth of the patient, typically with an adhesive material, such as an attachment composite material, or directly cured to the tooth. These attachments may interact with surfaces on the appliance to impart forces on one or more teeth.

The positioning, orientation, and securing of attachments is typically done by a treatment professional at a dentist or orthodontist's office. However, prior approaches to placing attachments on teeth can be more complex and time consuming that would be ideal. For example, placing an attachment can involve mixing, forming, positioning, orienting, or securing one or more of the attachments. In some instances, the attachment combination may not fit together correctly or impart the correct one or more forces, which may result in a less than ideal treatment.

Although attachment templates have been proposed to facilitate the attachment process, work in relation to the present disclosure suggests that the prior attachment templates can be less than ideal in at least some instances. For example, the prior attachment templates may not properly align with the teeth, which can result in improper placement of the attachment. The teeth of a patient may change during the time period between when the teeth of the patient are scanned and the attachments are positioned on the patient with the template. For example, the teeth of an adolescent patient may move significantly between teeth scan and the insertion visit, which may result in a less than ideal fit of the template and positioning of the attachments. Furthermore, a treatment professional may need to replace, re-bond, or adjust the position and/or the orientation of an attachment during treatment, and at least some of the prior templates may have less than ideally addressed attachment replacement during treatment. Also, in some treatments it may be desirable to place an attachment after the teeth repositioning treatment has been partially completed.

Although 3D printing of attachment templates has been proposed, work in relation to the present disclosure suggests that at least some of the prior attachment templates can be less than ideally suited for use with additive manufacturing such as 3D printing. In some instances, the prior templates may be less than ideally stabilized when placed on the teeth, which can result in the treatment professional holding the attachment template on the teeth to maintain positioning of the template. This less than ideal stabilization of the prior attachment templates can increase the amount of time to adhere the attachments and may limit the ability of the treatment professional to use both hands for other aspects of the treatment. Also, the prior approaches to attachment templates may less than ideally accommodate tooth movement in at least some instances.

Prior approaches to placing an attachment on a tooth can leave excess material deposited on the tooth over an area that is somewhat larger and less well defined than would be ideal in at least some instances. Removal of this excess material after curing can take more time and may add complexity to the treatment.

In light of the above, improved methods and devices for placing attachments on teeth are needed that overcome at least some of the above limitations of the prior approaches.

SUMMARY

The presently disclosed attachment placement devices can provide improved placement of attachments, ease of handling, improved stabilization and accommodation teeth movement between the time of scanning and placement of the device. In some embodiments, the device is configured for the treatment professional to remove his or her hands from the device with the device positioned on the teeth prior to bonding the attachments to the teeth, such that the treatment professional can use both hands for other tasks. According to some embodiments, the device comprises a plurality of articulated registration elements 210 shaped for placement on a plurality of teeth, which can facilitate placement, accommodate tooth movement, and improve alignment of the registration elements 210 with the teeth, so as to more accurately position an attachment. The plurality of registration elements 210 may comprise one or more attachment supports extending from the plurality of registration elements 210, and one or more retention supports extending from the plurality of registration elements 210. The attachment supports and registration elements 210 can be sized and shaped to engage the teeth on opposing sides in order to maintain placement on the teeth prior to adhering the attachment. In some embodiments, each of the plurality of registration elements 210 comprises a tooth registration surface shaped to engage the tooth with a specific position and orientation. In some embodiments, the tooth registration surface comprises a mating surface sized and shaped to approximate the contour of the tooth and fit the tooth with an intended position and orientation.

An articulated coupling can be located between adjacent registration elements 210 to provide articulation between the adjacent registration elements 210, so as to improve registration and alignment with the tooth by allowing the position and orientation of the registration element 210 to change in relation to other registration elements 210. This articulation of the plurality of registration elements 210 at a plurality of locations can accommodate differences in tooth height, and may reduce the amount of material and time for fabrication by allowing the registration elements 210 to have similar heights. Also, by allowing relative movement between the plurality of registration elements 210, the plurality of couplings may allow teeth to move between the time the teeth are scanned and the device is placed on the teeth to adhere the attachments. The plurality of couplings can be configured in many ways and may comprise one or more of a spring, a resilient member, a joint, a ball joint, or a heim joint.

In some embodiments, the device comprises at least a first registration element, a second registration element, a third registration element, and a first coupling between the first and second registration element 210 and a second coupling between the second and third registration element. The first and second couplings can allow the position and orientation of the second registration element 210 to change in relation to the first and third registration elements 210, which can improve placement of the retention elements on the teeth and positioning of the attachment. According to some embodiments, the number of couplings is 1 less than the number of registration elements 210.

In some embodiments, each of the plurality of registration elements 210) comprises a flexible arm extending from the registration element 210 on a lingual side. The flexible arm comprising a connected end and a distal end, the distal end configured to extend at least part way over the tooth and apply a lingual force to bias the registration element 210 against the tooth. Alternatively or in combination, the flexible arm can be located on a buccal side and apply a buccal force to bias the registration element 210 against the tooth.

In some embodiments, the registration element 210 is configured to be self-retentive when placed on a tooth. The registration element 210 may comprise one or more features to promote self-retention when placed, such as one or more of a friction fit, roughening of the tooth registration surface, resiliency of a retention support, resiliency of an attachment support, one or more interproximal locators, or an adhesive. In some embodiments, the attachment placement device is configured for placement on the teeth with a small amount of force in order deform one or more resilient features to retain the device on the teeth. The one or more resilient features may comprise one or more of the retention support, the attachment support, or the registration surface. In some embodiments the retention support extends to a distal end and the attachment support extends to a distal end, defining a distance there between. Either or both of these supports may comprise a flexible arm configured to flex when the retention element is placed on the tooth, so as to vary the distance. In some embodiments, the resiliency of the flexible arm applies a force to one or more teeth to maintain the registration element 210 on the one or more teeth with the intended position and orientation. In some embodiments, the flexible arm comprises a proximal segment, an elbow and a distal segment, in which the proximal segment extends away from the registration element 210 toward the elbow and the elbow is located between the proximal segment and the distal segment.

In some embodiments, the flexible arm is configured to engage an undercut portion of a tooth, and the distal end of the flexible arm is configured to engage the undercut portion of a tooth. The distal end can be convexly shaped or concavely shaped. The distal end of the flexible arm may have a contact area shaped to match the surface of a tooth. In some embodiments, the distal end of the flexible arm is configured to contact a single tooth. Alternatively, the distal end of the flexible arm may have a teeth contact area shaped to fit into an interproximal region between two teeth and contact both of the teeth, for example shaped to match the interproximal region between adjacent teeth.

The attachment placement device can be configured in many ways to place the attachment on the tooth. The device may include an attachment releasably carried by the attachment support, in which the attachment is configured to break away from the attachment support.

In some embodiments, the device includes an attachment mold shaped to receive an attachment material and mold the attachment on the tooth. A well surrounds at least a portion of the attachment or the mold, in order to collect or shape excess adhesive material for removal. The attachment well may include a rim configured for surface contact with a tooth. In some embodiments, the rim defines an edge of the attachment and separates the attachment from excess attachment material in the well, in order to facilitate removal of the excess attachment material.

INCORPORATION BY REFERENCE

All patents, applications, and publications referred to and identified herein are hereby incorporated by reference in their entirety, and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

Figure 1:
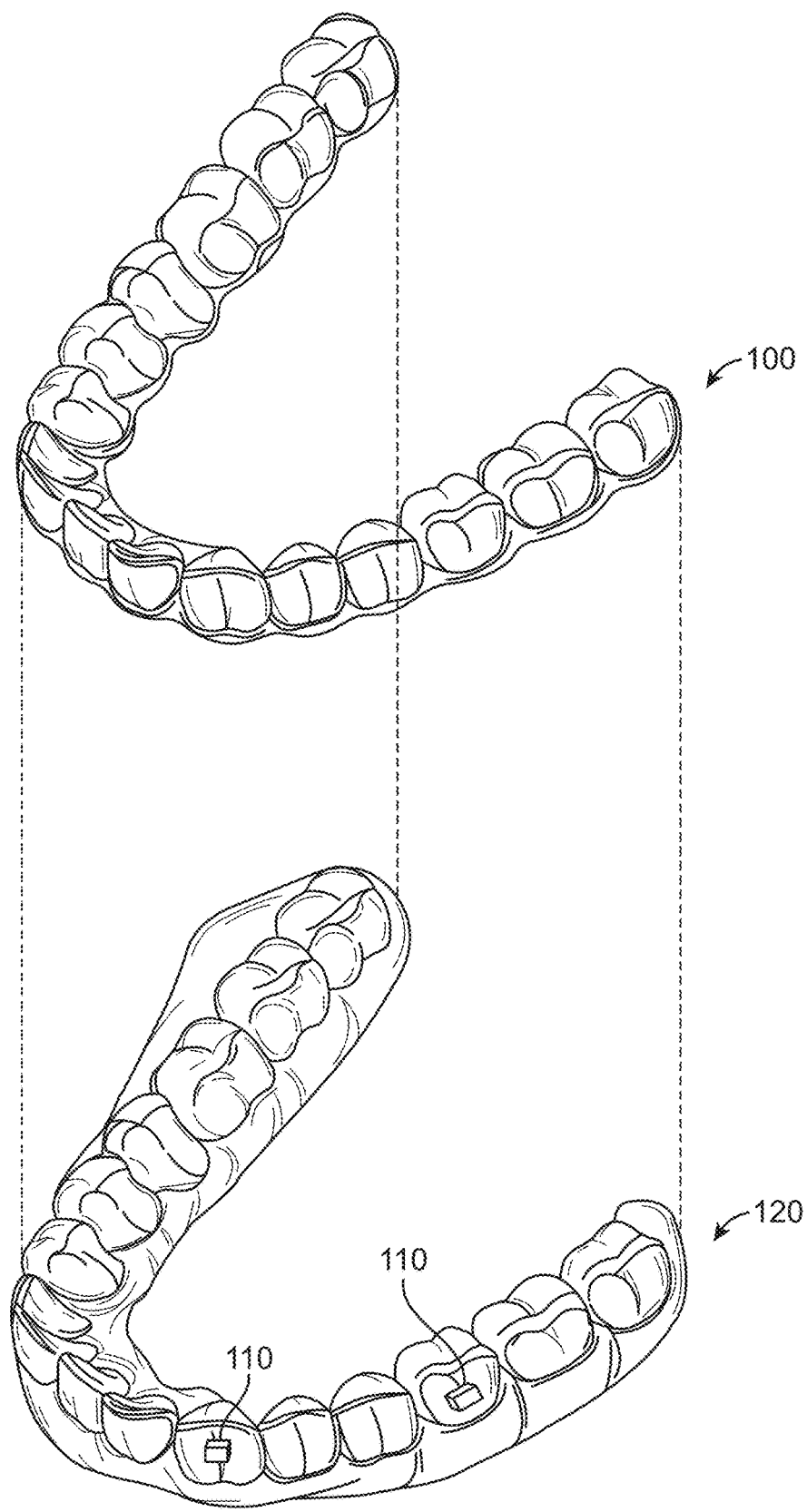
FIG. 1 shows a dental appliance and attachments, in accordance with some embodiments.

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

The present disclosure describes methods, computing device readable medium, devices, apparatuses, and systems related to dental attachment placement. Such solutions make positioning, orienting, securing, and forming attachments more efficient with greater accuracy, and can improve the patient's experience and comfort.

The presently disclosed methods and devices are well suited for combination with prior approaches, such as treatment planning, intraoral scanning, attachments and aligners to move teeth and additive manufacturing, such as 3D printing. For example, once an attachment is affixed to the tooth surface in the desired location, the attachment can be decoupled from the attachment placement device and the attachment placement device removed from the mouth of the patient. The attachment may then be used in conjunction with one or more appliances, such as an aligner, to apply a controlled force to the teeth in accordance with a dental treatment plan.

In some embodiments, the teeth are scanned with an intraoral scanner, and the scanned teeth profiles used for treatment planning. The treatment planning software can be used to place virtual attachments at any suitable location to model movement of the teeth. Once a treatment plan and corresponding virtual attachment locations have been determined, the attachment placement device can be manufactured in accordance with the locations of the virtual attachment locations.

The attachment placement device and the appliances used to move the teeth can be manufactured in many ways for example by additive manufacturing or thermoforming. In some embodiments, the scanned profiles of the teeth and virtual attachments are used to manufacture the attachment placement device with additive manufacturing. The shape of the teeth can be used to determine the surface profile of the registration surface, the locations of the attachments, registration elements 210) and retention supports. Once the positions, locations and shapes of these virtual components have been determined, the attachment placement device can be directly fabricated with an additive manufacturing processes such as 3D printing. The virtual attachment placement device can be output to a suitable file format, such as 3D file comprising a plurality of voxels, and the physical attachment placement device fabricated with a suitable additive manufacturing machine.

Although reference is made to additive manufacturing, a dental appliance or attachment placement device can be made, for example, by thermoforming a sheet of plastic over a physical dental mold.

Once the attachment placement device is fabricated, it may be positioned on the patient's dental arch. For example, registration elements 210 can be placed and adjusted to register with one or more teeth of the patient. The retention supports may be positioned on a lingual side of the tooth, the buccal side of the tooth, or both. Once registered in the predetermined position of a tooth, the attachment can be bonded to the tooth using methods described herein, such as by using an adhesive, an attachment bonding material, and polymerizing the bonding material.

As described herein, the dental attachment placement devices described herein can be made of one material or a combination of materials. In some cases, the dental attachment placement devices can be formed of one or more polymers (e.g., polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a poly butylene terephthalate, a polyetherimide, a polyethersulfone, a polytrimethylene terephthalate, or a combination thereof). In some embodiments, the dental attachment placement device can be fabricated out of a second material that is different than the attachment material. For example, the attachment can be fabricated from a composite material and the dental attachment placement device can be fabricated from a polymer, such as those discussed above. In some embodiments, the attachment and dental attachment placement device can be constructed such that they are connected to each other. As described herein, this connection can be designed to be cut, broken, or otherwise released to allow the dental attachment placement device to be removed while the attachment remains positioned on the tooth. The attachment placement device and the attachment may be integrally formed through an additive manufacturing process, which may allow different materials to be used for 3D printing.

Through use of virtual modeling, attachments can be virtually tested and the best attachment type, shape, position, and/or orientation can be selected without inconveniencing the patient with trial and error of attachments during treatment. Additionally, use of virtual modeling can also allow for custom design of attachment shapes that will be suitable for a specific patient's needs and/or a specific function within an area of a patient's mouth. From such analysis, different physical attachment placement devices can be created from the virtual dental attachment placement apparatus data that would be utilized to create the attachments needed for the different stages of treatment.

Further, the specialized nature of the design of such attachments can also allow the attachments to be made from different materials. In this manner, attachments during a treatment plan or even during one stage of treatment can be of a different material that may provide more specialized force distribution than was possible with standard attachments. In some embodiments, the attachment comprises a first material with a first color and the placement device comprises a second material with a second color different from the first color, which can facilitate visual identification of the attachments and the placement apparatus.

In some embodiments, the components are printed, such as by a three dimensional or direct fabrication device that can create a dental appliance directly from instructions from a computing device. Embodiments of the present disclosure utilizing such technology can be particularly beneficial for a variety of reasons. For example, such direct manufacture allows for less waste of materials due to fewer processing steps and increased specialization of the attachment placement device, attachment materials, and/or other components of the appliances described herein.

According to some embodiments, a dental attachment placement device includes one or more registration elements 210 configured to extend over at least a portion of a tooth: a coupling between adjacent registration elements 210 allowing relative movement between the registration elements 210: an attachment support extending from a buccal side of the registration element: a dental attachment carried by the attachment support; and a retention support extending from a lingual side of the registration element 210 and configured to maintain the registration element 210 on the tooth.

The dental attachment may be coupled to the attachment support via one or more frangible portions 232 of the device. The dental attachment may be adapted to decouple, break away, or otherwise disengage from the attachment support at an interface region. The dental attachment may be surrounded by an attachment frame 260) and attached to the attachment frame 260 by one or more frangible portions 232. The dental attachment may include a textured surface to increase a bond strength of the dental attachment to the tooth surface. At least one registration element 210 may have a contoured surface to complement a surface of one or more teeth of the patient's dentition. The contoured surface of the at least one registration element 210 can correspond to the surface of one or more of an incisor, canine, premolar, and molar of the patient's dentition. The dental attachment may be configured to attach to the surface of the same tooth as the registration element 210 is configured to complement. The placement device can include at least two registration elements 210, where the attachment support is between the at least two registration elements 210. The retention support can be adapted to contact one or more lingual tooth surfaces. In some embodiments, one or more retention supports are configured to contact one or more buccal tooth surfaces, and in some instances, are adapted to contact the gingiva of a patient. The retention support can be adapted to contact an interproximal region between two teeth. The retention support can be adapted to contact a single lingual tooth surface. The device can include an integrated device identifier for identifying the device. The dental attachment may include one or more auxiliary features that extend from the dental attachment. The one or more auxiliary features may include a power arm, hook, button, spring, brace, bracket, wire, rod, band, blade, coil, elastic, ring, track, link and chain. The attachment support and the retention support may extend with respect to a bottom surface of the registration element 210 over a surface of a tooth.

The registration elements 210 can each have a registration contact surface adapted to contact a corresponding tooth. The registration contact surface can be a contoured surface corresponding to a surface of at least one tooth of the dental arch. The registration contact surface can be sized and shaped to register with the surface of the intended tooth with a predetermined position and orientation on the tooth, so as to substantially fix the position and orientation of the registration element 210 on the tooth. The contoured surface can correspond to one or more of a lingual, occlusal, incisal, buccal, mesial, and distal tooth surface. The dental attachment can extend from a buccal side of the registration element 210 and the retention support can extend from a lingual side of the registration element. The retention support can be adapted to contact one or more tooth surfaces or one or more gingiva surfaces. The attachment support can extend from the registration element 210 and the dental attachment can be positioned to attach to one of the teeth. The dental attachment can be configured to attach to the surface of the same tooth as the registration element 210 is configured to contact. The device can include a second attachment support having a second dental attachment adapted to attach to a second tooth surface. The attachment support may extend from a first registration element. The dental attachment may include one or more auxiliary features that extend from the dental attachment. The one or more auxiliary features can include one or more of a power arm, hook, button, spring, brace, bracket, wire, rod, band, blade, coil, elastic, ring, track, link and chain.

Any of the methods or devices described herein may involve an additive manufacturing process. For example, the registration element, attachment support, dental attachment, and retention support can be formed together (e.g., in one piece) using an additive manufacturing process. One of the surfaces of the device, e.g., a top surface of the registration element, may be formed directly on a build plate during the additive manufacturing process (i.e., without the use of supports). The process can include the printing of one material, or more than one material. For example, an entire dental attachment placement device, including the one or more attachments, may be made of the same material (e.g., same polymer). Alternatively, portions of the dental attachment placement device may be made of different materials (e.g., different polymers).

In some embodiments, an attachment well may be located around an individual attachment to catch surplus attachment material or attachment composite. For example, where attachment bonding composite it packed into a cavity in the attachment, when the attachment is pressed into position, any surplus attachment bonding composite will squeeze out of the cavity and be captured within the attachment well. The lip of the cavity separates the cavity from the attachment well and is configured to firmly press against the tooth. The pressing of the lip of the cavity against the tooth will create a demarcation between the attachment bonded to the tooth and the surplus attachment composite. The surplus attachment composite may subsequently be removed from the tooth after the attachment composite is cured, such as by scraping, grinding, abrading, or other removal step. Similarly, where the attachment is formed in place by using attachment material that is cured and secured onto a tooth simultaneously, the excess attachment material may squeeze out of the attachment cavity and collect in the attachment well, thereby creating a clear demarcation of the proper attachment shape.

The dental attachment (which may be referred to herein as simply an "attachment") may be coupled directly or indirectly to the attachment support via a plurality of frangible portions 232. The dental attachment may therefore be adapted to decouple from the attachment support at an interface region.

The attachment support comprises an attachment frame 260 around (e.g., partially or completely encircling and/or surrounding) the dental attachment, wherein the dental attachment is attached to the attachment frame 260 by one or more frangible portions 232.

Any of the attachments, registration elements 210, or retention supports described herein may include a textured surface on a tooth-facing side to increase a bond strength of the dental attachment to the tooth surface. The textured surface may be a grid, bumps, peaks and valleys, surface roughness, or other set of protrusions that leave gaps between the tooth and the attachment into which adhesive may be held (and subsequently crosslinked). Any of the attachments may permit the passage of a UV or other crosslinking wavelength of radiation to cure the attachment and/or the attachment bonding composite.

In general, the registration element 210 may have a contoured registration surface to complement a surface of one or more teeth of the patient's dentition. For example, the contoured surface of the registration element 210 may correspond to the surface of one or more of an incisor, canine, premolar, and molar of the dental arch. The dental attachment may be configured to attach to the surface of the same tooth that the registration element 210 is configured to hold the dental attachment against. Alternatively or additionally, the dental attachment may be configured to attach to the surface of a different tooth than the registration element 210 is configured to hold the dental attachment against.

In some embodiments, the retention support may be resilient and elastically deform to provide a retaining force to bias the registration element 210 and the attachment support against a surface of the tooth. The retention support may provide a lingual force, that is, a force that tends to bias the registration element 210 and the attachment support carried by the registration element 210 toward the lingual direction, thereby contacting the buccal surface of the tooth.

Any of these dental attachment placement devices may include at least two registration elements 210. The attachment supports may be between the at least two registration elements 210, or be secured to one or more registration elements 210 directly. In some embodiments, adjacent registration elements 210 are connected together by a coupling. The coupling may allow relative movement between adjacent registration elements 210, such as by a joint, a spring, a resilient member, a ball and socket joint, a heim joint, a ring joint, or some other coupling that allows relative movement between adjacent registration elements 210.

In some instances, the coupling is formed by additive manufacturing during manufacture of the registration elements 210. In some embodiments, the registration elements 210, couplings, retention supports, attachment support, and attachments are all manufactured by an additive manufacturing process as a unitary structure formed of one or more suitable materials.

The retention support may be adapted to contact one or more lingual or buccal tooth surfaces. The retention support may be adapted to contact to an interproximal region between two teeth, or to the lingual surface of a tooth. In some embodiments, the retention support is configured to contact an undercut portion of a tooth and may be contoured to match the shape of the tooth. The retention support may alternatively be formed to create a point contact with the tooth, such as by forming the contacting region as a convex surface.

In any of the devices and methods described herein, the dental attachment may be configured to include one or more auxiliary features that extend from the dental attachment. For example, the one or more auxiliary features may include a power arm, hook, button, spring, brace, bracket, wire, rod, band, blade, coil, elastic, ring, track, link and chain.

The attachment placement device may comprise a textured surface on one or more of the registration element, the retention support, or the attachment support to increase friction of the registration element 210 and/or the retention support against the dentition. The attachment support, dental attachment, registration element, and retention support may be formed from the same material. In some embodiments, at least two of the attachment support, dental attachment, registration element, and retention support are formed from different materials. In general, forming the attachment support, dental attachment, registration element, and retention support may comprises using an additive manufacturing process.

FIG. 1 shows an oral appliance 100 and one or more attachments 110 secured to one or more teeth of a patient. The appliance 100 can be configured to fit over an entire dental arch 120. In some embodiments, the oral appliance 100 may be designed to fit over some or all of the teeth in the upper or lower jaw. For example, the dental appliance 100 may be formed with a plurality of teeth receiving cavities that allow the oral appliance 100 to securely fit onto the dental arch. The oral appliance 100 can be fabricated from a polymeric shell, or formed from another material, and include a number of teeth receiving cavities shaped to receive corresponding teeth. Aligners for positioning teeth are commercially available from Align Technology.

The one or more attachments 110 can be placed at any suitable location on the teeth to properly position the oral appliance 100, but according to some embodiments, attachments 110 are secured to one or more teeth of the upper jaw of a patient to support an oral appliance 100 placed on the upper jaw. Attachments 110 may additionally or alternatively be secured to one or more teeth of the lower jaw of a patient to support an oral appliance 100 placed on the lower jaw.

The oral appliance 100 comprises suitable materials for use with an oral appliance. The oral appliance may be made of any suitable material as will be appreciated by one of ordinary skill in the art. In some embodiments, the attachments 110 may be formed of any suitable material, such as any of a number of suitable polymeric materials, and in some cases, are formed by 3D printing the attachment. As an example, one or more attachments 110 may formed by direct fabrication of the attachments along with one or more registration elements 210 for placing the attachments onto the dentition of a patient. According to some embodiments, this results in an appliance that includes the registration element 210 and attachments as a directly fabricated device that, when placed onto the teeth of a patient, accurately locates and orients the attachments for bonding.

Figure 2:
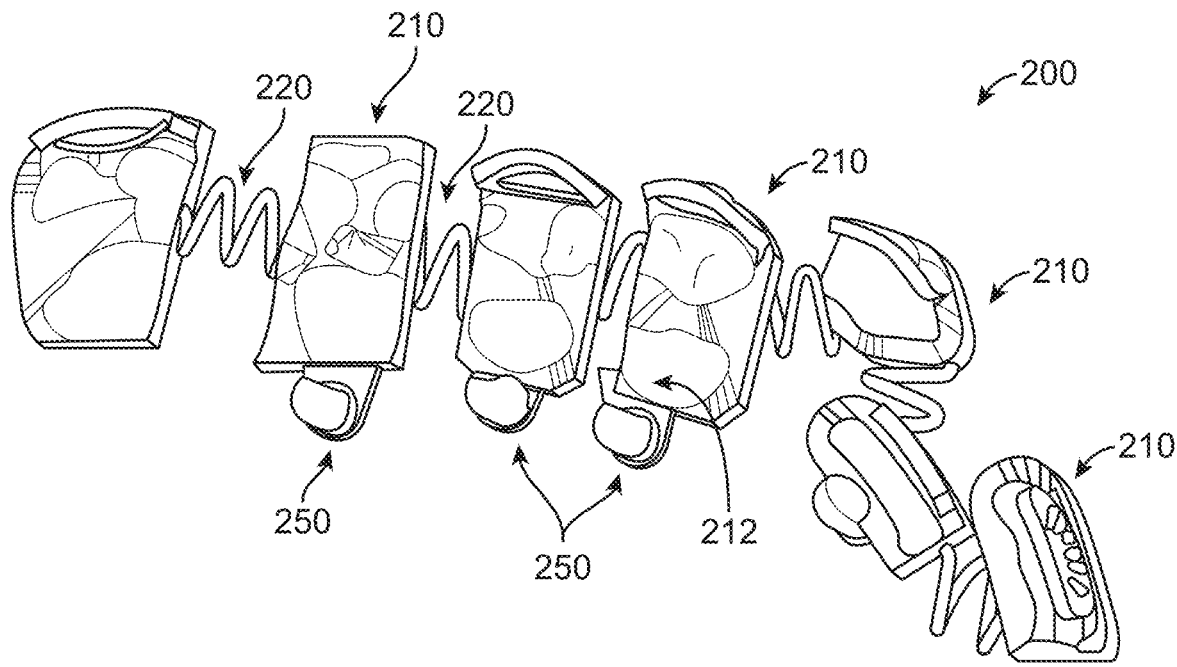
FIG. 2 shows an attachment placement device having registration elements 210 connected by a flexible coupling, in accordance with some embodiments.
Figure 3:
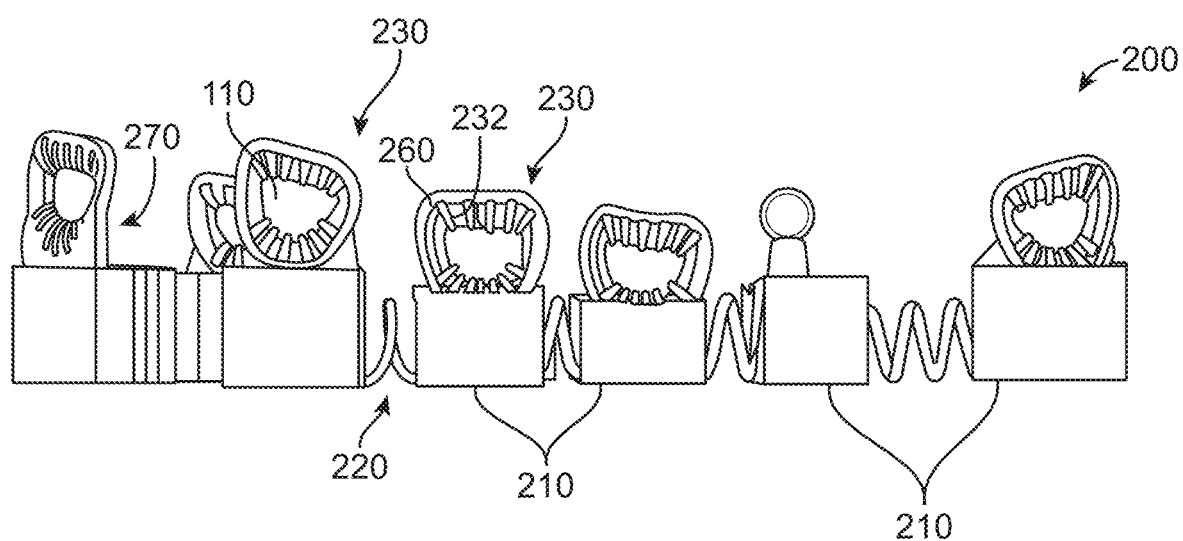
FIG. 3 shows an attachment placement device having registration elements 210) connected by a flexible coupling, in accordance with some embodiments.

FIGS. 2 and 3 illustrate an attachment placement device 200 comprising a plurality of registration elements 210 separated by a plurality of couplings 220. The registration elements 210 define an inner surface 212 that is configured to contact the occlusal surface of a tooth, an attachment support, and a retention support.

The attachment support may comprise an attachment frame 260 that holds an attachment 110 at a predetermined position relative to the registration element. A frame belt 270 may extend between the frame 260 and the registration element 210, for example to the inner surface 212 of the registration element 210. The attachment frame 260 may incorporate a member 232 that allows the attachment 110 to decouple from the attachment support at the appropriate time during treatment. In some embodiments, the attachment frame 260 comprises a frangible portion 232 that is configured to release the attachment 110 once the attachment 110 has been secured in place to a tooth.

In some embodiments, the attachment support 230 extends from the registration element 210 and covers a portion of the buccal surface of a tooth. The attachment support 230 may be provided on each registration element 210, or only on some registration elements 210. In some embodiments, one or more attachment supports 230 cover a portion of a lingual surface of a tooth, and attachment 110 can be bonded to the lingual tooth surface.

The retention supports 250 may be configured to engage the interproximal region of the dentition, the lingual surface of the tooth, an undercut region of select teeth, or a combination. In some embodiments, the retention support 250 is configured to elastically deform as it is placed on a dentition and thus provide a lingual force (e.g., a force that biases the attachment support 230 in a lingual direction and thus positions the attachment support against the buccal surface of the tooth. Alternatively or in combination, the attachment support 230 can urge the retention surface of the retention element 250 toward the tooth so as to position and orient the retention element on the tooth. A plurality of retention supports may be provided with an attachment placement device 200 and configured to cooperate to maintain the attachment placement device 200 secured to the dentition of a patient without requiring the treatment professional to hold it in place.

The attachment placement device 200 may include a plurality of attachment supports 230 and only some may be used to secure attachments at any given time. In such applications, the attachment placement device 200 can, for example, be used to affix one attachment 110 at a first time and can be later reused to secure another attachment 110 at a second time.

In some embodiments, the attachment placement device 200 is fabricated to fit a particular patient's teeth, and as such, can be specialized to provide an individual fit which may include the size and shape of the attachment 110, and other specialized characteristics.

In some embodiments, a computing device can be used to create a treatment plan to move the teeth of a patient in an incremental manner to improve their position within the patient's mouth, for example with one or more attachments placed on one or more teeth of the patient. Other dental appliances can be created to aid patients with sleep apnea or medication delivery, among other types of appliances.

A computing device can be used to create such devices or molds to fabricate such dental appliances, attachments, and/or attachment placement devices. In some embodiments, a computing device can be used to virtually model a patient's dentition along with dental appliances, attachments, and/or attachment placement devices.

Figure 4A:
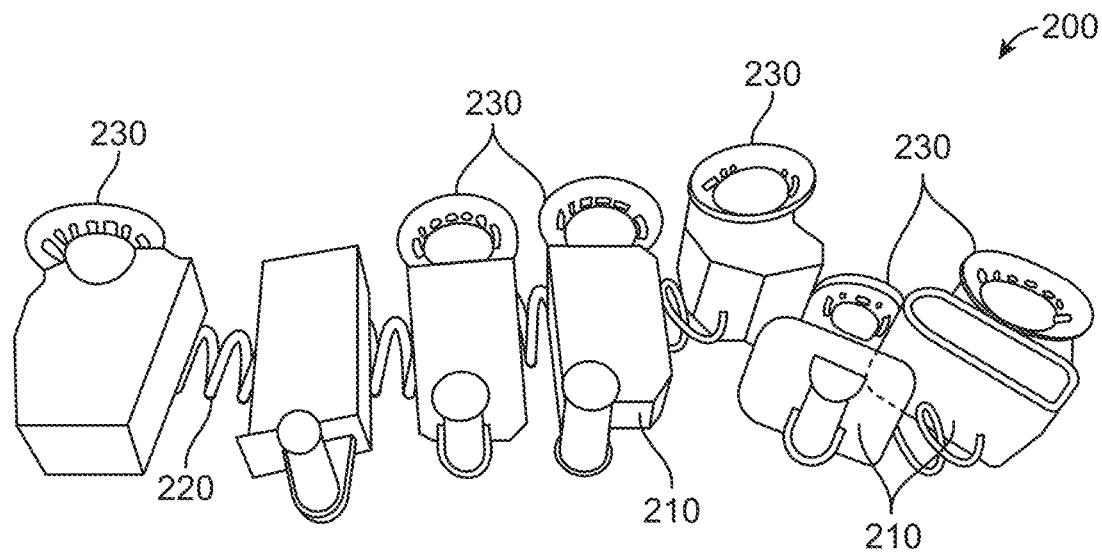
FIGS. 4A and 4B show an attachment placement device comprising a plurality of registration elements 210 connected by a plurality of flexible couplings, in accordance with some embodiments.
Figure 4B:
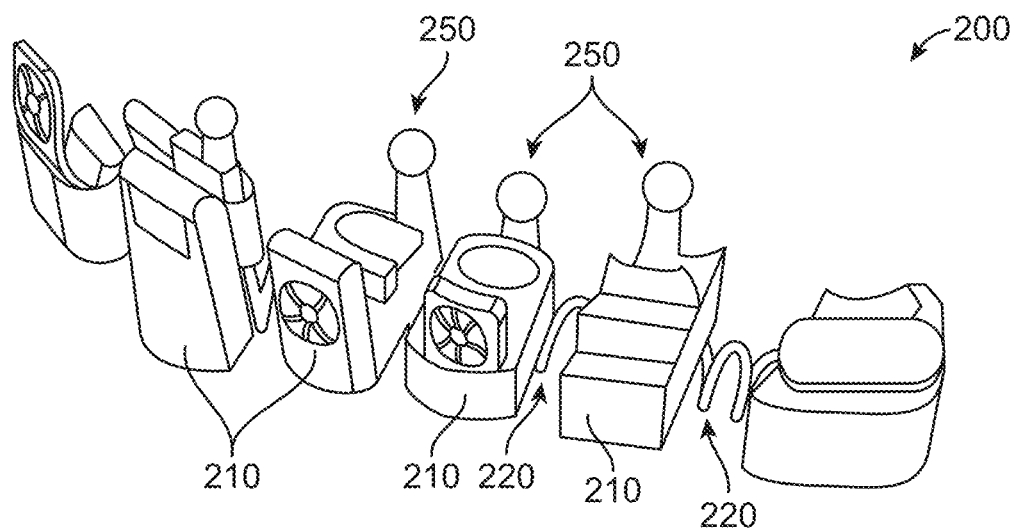

FIGS. 4A and 4B show an attachment placement device 200 comprising a plurality of registration elements 210 separated by a plurality of couplings 220. Each of the plurality of registration elements 210 may include an attachment support 230 and a retention support 250). In some embodiments, an attachment support 230 is carried by each of the registration elements 210. In some embodiments, such as shown in FIGS. 2, 3, and 4A, not all of the registration elements 210 carry an attachment support.

In some embodiments, the registration elements 210 further comprise an inner surface (for engaging with the occlusal surface of a tooth), and a buccal surface for contacting at least a portion of the buccal surface of a tooth. In some embodiments, the attachment support 230) extends from a buccal side of the retention element and is configured to carry an attachment 110 for bonding onto a tooth. The attachment support may be configured to releasably carry the attachment 110 so that the attachment can be released from the attachment support at an appropriate time. For example, the attachment support 230 may comprise one or more frangible portions 232 that are designed to break away from the attachment 110 once the attachment is secured to a tooth. Other structures and methods for releasing the attachment 110 from the attachment support are contemplated, such as through the use of a releasable adhesive that may be chemically, optically, or thermally released from the attachment carrier. In some embodiments, the attachment support carries an attachment cavity into which a treatment professional can pack attachment material that can be cured and bonded to a tooth once the attachment cavity is properly positioned onto the tooth.

The registration elements 210 are connected to one another by one or more couplings 220. In some embodiments, the coupling 220 allows for relative movement between adjacent registration elements 210. The coupling 220 may be formed as a spring, which includes any suitable type of spring (e.g., coil, helical, conical, disc, leaf, or other suitable shape). When formed as a spring, the coupling 220) can be configured to have spring properties depending on the treatment plan, and the spring may be a constant spring, variable spring, or a variable stiffness spring. The spring constant may also be designed into the spring to allow a desired motion of adjacent registration elements 210 in response to an applied force. The coupling 220 may alternatively be formed of any suitable geometry, such as zig-zag, sinusoidal, s-shaped, circuitous, V-shaped, flat, and the like. The coupling may also be formed as a suitable connection, such as a joint (e.g., ball and socket, heim joint, rose joint, etc.), flexible member, lattice structure, or other suitable coupling. In some embodiments, the coupling allows articulation between the registration elements 210 and may allow the distance between adjacent registration elements 210 to be adjusted.

According to some embodiments, the coupling 220 allows relative movement between adjacent registration elements 210 to allow each of the registration elements 210 to be independently positioned on a respective tooth. In some embodiments, the coupling 220) is designed and configured to allow a relative range of motion within a range from about 1 mm to about 5 mm and to exert a force within a range of from about 0.1 N to about 1 N.

The coupling 220 allows freedom in the relative distance and orientation between adjacent registration elements 210. For example, in the course of a treatment plan, the patient's teeth are scanned. By the time the attachment placement device 200 is applied to the patient's teeth (which can be several days or weeks after the initial scan), the teeth may have moved. The one or more couplings 220 that allow relative motion between adjacent registration elements 210 reduces the possible need to fabricate a new attachment placement device 200 or perform an updated scan of the patient's teeth. The result can be greater efficiency, flexibility, and adjustability at the treatment location.

The coupling 220 additionally provides advantages during manufacturing, handling, and installation. For example, the one or couplings may facilitate removal from a 3D printing platform and allow the attachment placement device 200 to absorb impacts and other forces associated with handling to a greater degree without failing.

Figure 4C:
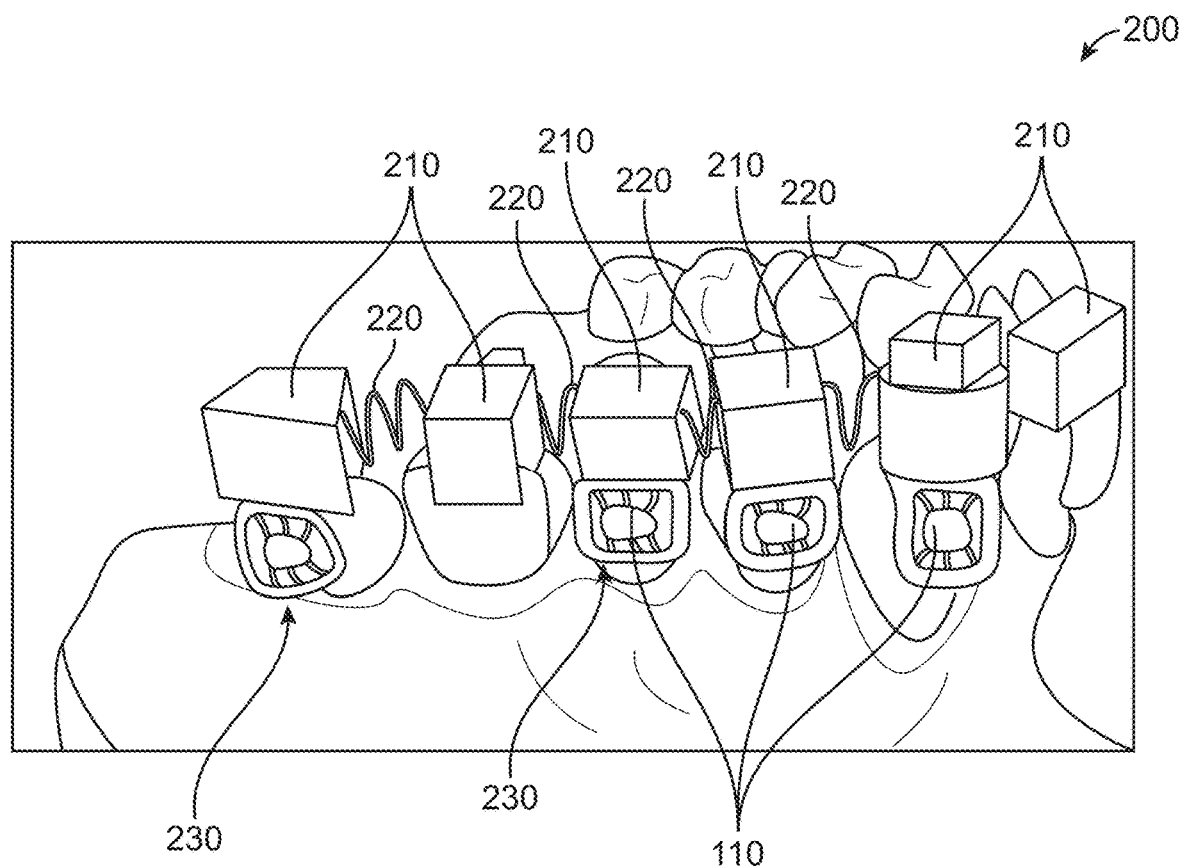
FIG. 4C shows an attachment placement device having registration elements 210 connected by a flexible coupling installed on a model of a dentition, in accordance with some embodiments.

FIG. 4C shows an attachment placement device 200 attached to a model of a dentition. The model may comprise a 3D printed positive model of the patient's teeth. Although reference is made to a positive 3D printed positive model, the attachment placement device 200 can be similarly configured for placement on the patient's teeth. The attachment placement device 200 comprises a plurality of registration elements 210, each configured to be placed on a tooth. As illustrated, the registration elements 210 are shown placed in corresponding registration positions and orientation on a lower jaw of the dentition model. An attachment support extends from the registration element 210 to place an attachment covering at least a portion of the buccal surface of the tooth. The attachment support 230) removably carries an attachment 110 and once the registration element 210 is properly placed the tooth with the appropriate position and orientation, the attachment 110 is properly located and oriented according to the treatment plan and can be bonded to the tooth. In some embodiments, a retention support (FIGS. 4A and 4B) biases the attachment support 230 against the buccal surface of the tooth. In some embodiments, the attachment support 230, the retention support 250, or both, are resilient so that they can elastically deform in order to be placed over a tooth and then provide a retaining force to maintain the attachment placement device 200 in its proper location. While the illustrated embodiments show an attachment 110 configured to be bonded to a buccal surface of the dentition, it should be appreciated that the devices and methods described herein are equally applicable to bonding attachments to a lingual surface of a tooth, or an interproximal region of the teeth. Moreover, the registration element 210 may carry an attachment cavity (e.g., a female mold) into which attachment material can be packed and polymerized in situ on the dentition.

In some embodiments, such as those shown at least in FIGS. 3-4C, the attachment 110 and/or the dental attachment placement device 200), can be fabricated through direct fabrication, such as via a three-dimensional (3D) printer. This can be beneficial and facilitate manufacturing. The dental attachment placement device 200 can be sized and shaped with treatment planning software based on a virtual model of teeth from a three-dimensional scan of a patient's dentition, and then 3D printed. In some embodiments, the treatment professional can print these components at their location rather than at a manufacturing facility.

Direct fabrication can also improve efficiency in changing oral conditions in the patient because the design can be altered via a computing device and directly printed from the modified design stored in memory on the computing device or a connected network or memory. Further, direct fabrication may allow for creation of components of different materials without substantial changes to equipment that may be used at a manufacturing facility, among other benefits.

For example, a dental attachment placement apparatus can be formed through direct fabrication, such as by printing, using a three-dimensional printing apparatus. The three-dimensional printing apparatus can use any suitable material or combination of materials, to print the components of the attachment placement device 200. For instance, an attachment 110 can be printed out of a suitable attachment material and coupled to an attachment support connected to a registration element, as a single printed piece. In some embodiments, the dental attachment placement device 200 and the attachment 110 can be fabricated from the same material.

In some embodiments, the dental attachment placement device 200 can be fabricated out of a second material that is different from the attachment material. For example, the attachment 110 can be fabricated from a composite material and the dental attachment placement device 200 can be fabricated from a polymer, such as those discussed above. In some embodiments, the attachment 110 and attachment support can be constructed such that they are connected to each other. As discussed herein, this connection can be designed to be cut, broken, or otherwise released to allow the dental attachment placement device 200 to be removed while the attachment 110 is positioned on the tooth.

In some embodiments, the entire attachment placement device 200 is fabricated out of a single material through direct printing. For instance, a three-dimensional printer may be programmed with instructions that cause the printer to print one or more registration elements 210, couplings between adjacent registration elements 210, attachment supports, attachments, and retention supports from a single print job and out of a single material.

As described herein, one of the potential advantages of direct fabrication is that one or more surfaces that will be used to attach the attachment 110 to a tooth and/or to position an attachment with respect to one or more teeth (e.g., to engage the retention support or the registration element 210 with one or more teeth) can be fabricated with surfaces that will mate with the corresponding surfaces of the one or more teeth to improve the contact and/or the bond with the teeth. This can be accomplished by virtual modeling of these surfaces and then using these virtual models to directly fabricate the attachment 110, the dental attachment placement device 200, the registration element 210, the couplings 220, the retention support 250, or any combination of components. The components may engage with the teeth at any suitable surface of the teeth, such as, for example, the buccal surface, the occlusal surface, the lingual surface, the interproximal region, an undercut region, or any combination of surfaces of the teeth. In some instances, one or more components of the attachment placement device 200 may engage with the gingiva of the patient.

Figure 5A:
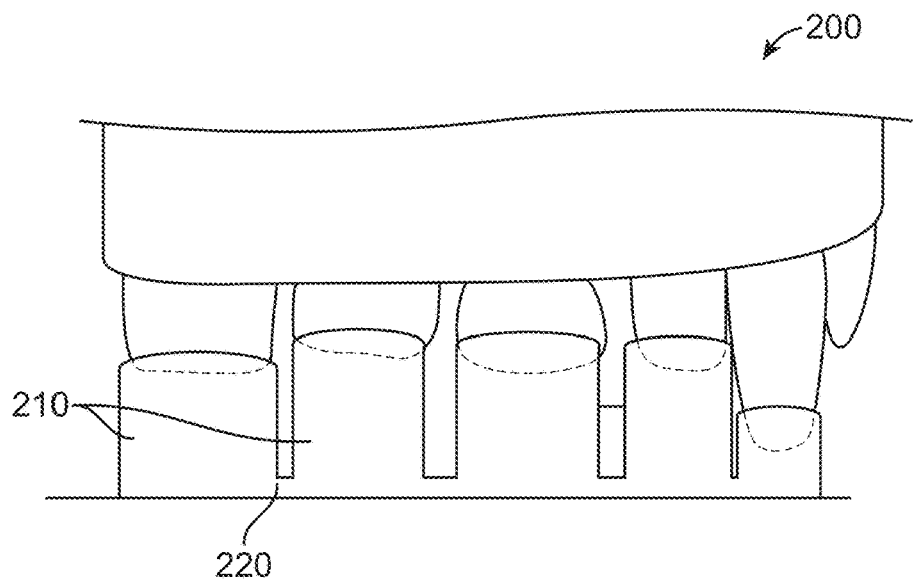
FIG. 5A shows an attachment placement device comprising a plurality of registration elements 210 with fixed coupling between registration elements 210, in accordance with some embodiments.

FIG. 5A shows an attachment placement device 200 comprising a plurality of registration elements 210 with fixed coupling 220 between registration elements 210. The registration elements 210 may have a surface facing away from the tooth that share a common plane. That is, the surface of the registration elements 210 that is not shaped to engage a tooth are in a common plane, and the height of the registration elements 210 may be related the length of the tooth protruding from the gingiva. During manufacture, the registration elements 210 are all formed having different heights, which is related to the length of the tooth. For example, if the minimum height of a registration element 210 is 10 mm, a registration element 210 having a height of 10 mm can be fabricated to attach to the longest tooth, which may be a central incisor tooth. Other teeth, such as canine, or molar teeth, may not extend from the gingiva as far as the central incisor, and thus, the registration elements 210 have a height that is greater than 10 mm. This may be related, in part, to the way that 3D printers work by printing onto a flat substrate (e.g., a build plate), such that the attachment placement device 200 is built directionally from the build plate.

Although the fixed coupling between registration elements 210 may be suitable in accordance with some embodiments disclosed herein, work in relation to the present disclosure suggests that articulated coupling that allows relative translational movement between coupling elements can have advantages in some instances.

Figure 5B:
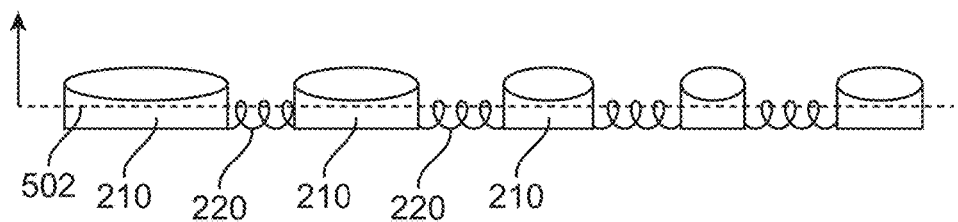
FIG. 5B shows an attachment placement device comprising registration elements 210 having similar heights connected by a flexible coupling, in accordance with some embodiments.

FIG. 5B shows an attachment placement device 200 in which the registration elements 210 are coupled together to allow articulation between adjacent registration elements 210. By providing a coupling 220 that allows articulation between adjacent registration elements 210, the registration elements 210 can all be formed having the same, or a similar, height, e.g. to within about 20% of each other. This can reduce the amount of material and manufacturing time and complexity during fabrication of the registration elements 210. The couplings can be designed and configured to provide for an adequate relative movement to accommodate the spacing and height differences between teeth. Therefore, the height of the registration element 210 is not dictated by the lowest hanging tooth, but rather, the registration elements 210 can each have a low profile because the relative position between adjacent registration elements 210 is adjustable at the time of installation onto the teeth, for example.

In some embodiments, the additive manufacturing process such as 3D printing proceeds in a fabrication direction from the support plate. New layers of material are subsequently solidified on prior layers to fabricate the attachment placement device 200. Each of the plurality of registration structures 210 and the plurality of couplings 220 may comprise a plurality of layers 502 corresponding to the 3D deposition process. The 3D deposition process, such as 3D printing may comprise a spatial resolution within a range from about 0.03 mm to about 0.3 mm, to provide an appropriate shape to the registration surface of the attachment 110 and allow accurate placement of the registration element 210 positionally and orientationally on the tooth. A common corresponding layer 502 from the additive manufacturing process, e.g. 3D printing, can extend through each of the plurality of registration elements 210 and each of the plurality of flexible couplings. When placed on the patient's teeth, the corresponding layer of each registration element 210 and each coupling element can move relative to one another as described herein, in order to facilitate placement on the patient's teeth and to decrease the amount of material, for example.

Embodiments described herein allow adjustments of the relative spacing between registration elements 210 to be performed by the treatment professional at the time the orthodontic device is applied to the teeth of a patient. Some embodiments described herein have the advantage of matching the registration element 210 to a tooth shape, which does not change over time, rather than locating a registration element 210 based upon the relative distance between neighboring teeth, a distance that may change over time, for example.

Moreover, in cases where the distance between teeth changes, such as an erupting dentition, losing a tooth, or having a tooth extrude between the scan and the time the orthodontic device is installed, embodiments of the attachment placement device 200 can be modified by the treatment professional and the relative distance between two or more registration elements 210 can be adjusted to accommodate movement of the dentition over time. Additionally, if an attachment 110 becomes loose, falls off, breaks, or is otherwise no longer suitable for its purpose, the treatment professional can adjust the attachment placement device 200 and re-secure the attachment 110, or bond a new attachment, during the treatment plan once the teeth have been moved, without having to rescan the teeth, create a new virtual model of the dentition, or fabricate a new attachment placement device 200 to properly locate and orient the attachments for bonding, for example.

The coupling between adjacent registration elements 210 can be tuned to have desired properties. For example, the couplings can be designed to have a desired strength, stiffness (e.g., spring constant "k"), restorative force, thickness, and the like. In some embodiments, the coupling 220 is manufactured with the registration elements 210 through an additive manufacturing process as described herein. Other coupling parameters that may be adjusted include, without limitation, spring diameter, diameter of a spring winding, number of windings, pitch, length, and the like. The coupling 220 may be attached to the registration elements 210 through any suitable connection, such as an interference fit, bonding, mechanical fastening, integrally formed during manufacture, or any other suitable method for connecting the registration elements 210 with a coupling.

Figure 6A:
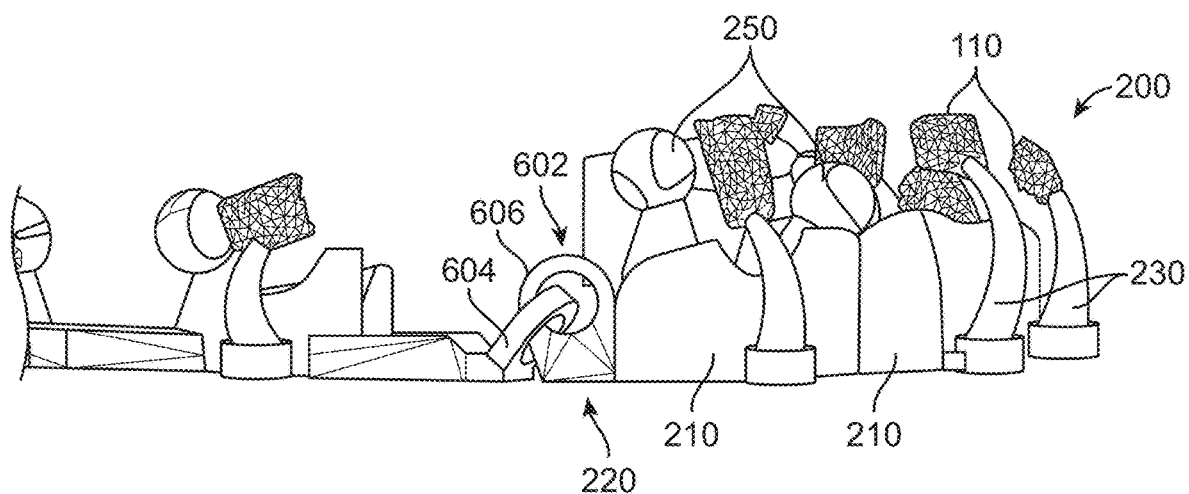
FIGS. 6A and 6B show embodiments of couplings that can be used to couple registration elements 210 of an attachment placement device, in accordance with some embodiments.
Figure 6B:
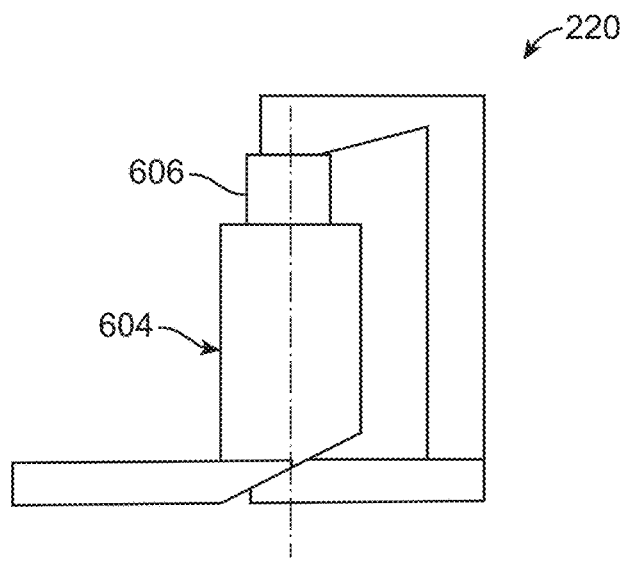

FIGS. 6A and 6B show a link joint 602 alternative for coupling 220 registration elements 210. The link joint 602 can include interlocking links 604, 606, such as a first link 604 and a second link 606 which may be annular in shape or otherwise have a perimeter defining an aperture though which each link is coupled to a corresponding link. The link joint can include any number of interlocking links (e.g., 2, 3, 4, 5, 6, 10, 20 or more.) The interlocking nature of the link joint may allow the links to move with respect to each other while remaining connected to each other. The link joint can provide flexibility to the attachment placement device 200 for resisting breakage when a force, such as pushing, pulling, twisting, are applied to the attachment placement device 200.

With respect to FIG. 6B, in some embodiments, a first link 604 may be a hollow or annular shape, such as a cylinder, while the second link may be a cylinder, post, or column shape. The second link passing through the aperture of the first shape.

The link joint can be located anywhere along the attachment placement device 200 as needed, and the attachment placement device 200 may include any number of joint links. The attachment placement device 200 may include one or more joint links, and one or more other types of couplings. For example, the attachment placement device 200 may include one or more joint links to couple two or more registration elements 210, and one or more flexible couplings to couple two or more registration elements 210. The joint link geometry may efficiently be formed using an additive manufacturing process in which the interlocking links can be formed integrally during manufacture.

A single registration element 210 may be attached to two couplings 220, such as is shown in in FIGS. 3-4C. The couplings 220 may be the same type of coupling, or they may be different. For example, a registration element 210 may be attached to a first coupling that allows articulation between the registration element 210 and an adjacent registration element, and a second coupling that allows variable distance between another adjacent registration element.

Figure 7A:
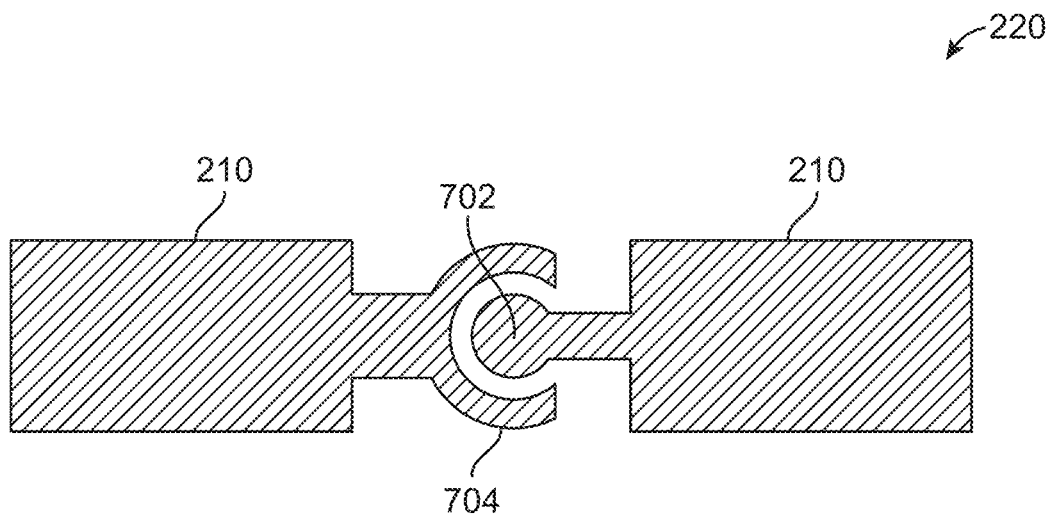
FIGS. 7A and 7B show a coupling that can be used to couple registration elements 210 of an attachment placement device, in accordance with some embodiments.
Figure 7B:
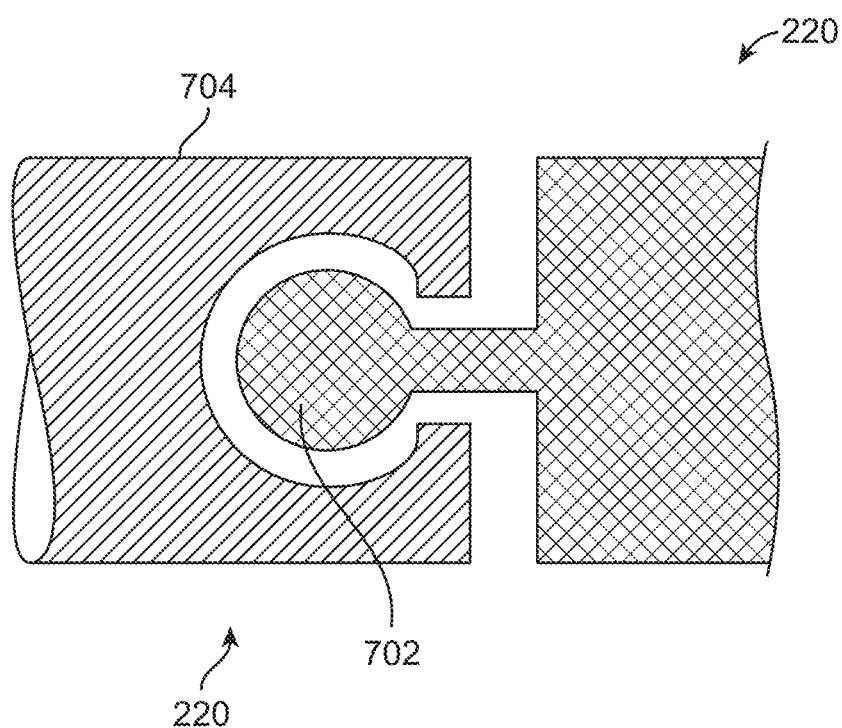

FIGS. 7A and 7B show another type of coupling that allows articulated movement between adjacent registration elements 210. In the illustrated embodiment, a first registration element 210 comprises a ball 702 extending therefrom and a second registration element 210 comprises a socket 704 configured to receive the ball. In some embodiments, the socket 704 elastically deforms in order to receive the ball 702 therein, and then returns to its original shape to capture the ball within the socket, for example. In some embodiments, the ball and socket are 3D printed as a connected structure and no further assembly is required. Similarly, a heim coupling may be fabricated, configured and used in much the same way. The illustrated couplings provide for relative movement between adjacent registration elements 210 and allow the attachment placement device to articulate at the coupling. The coupling 220 can be fabricated through any suitable additive manufacturing process, such as 3D printing and allows articulation with three degrees of freedom about the coupling. In some embodiments, a combination of couplings can be provided in an attachment placement device. For example, a resilient coupling, a link, a ball and socket joint, or any combination of couplings can be used within a single attachment placement device.

Figure 8A:
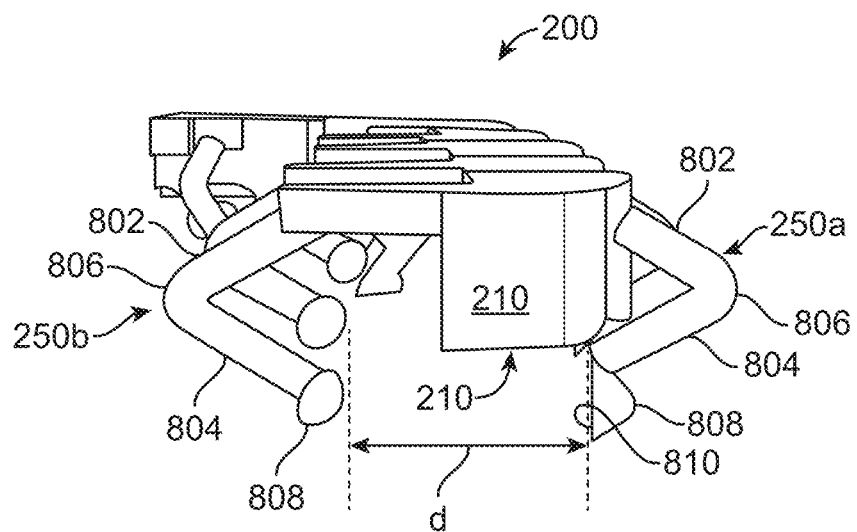
FIGS. 8A, 8B, and 8C show an attachment placement device with self-retention structures, in accordance with some embodiments.
Figure 8B:
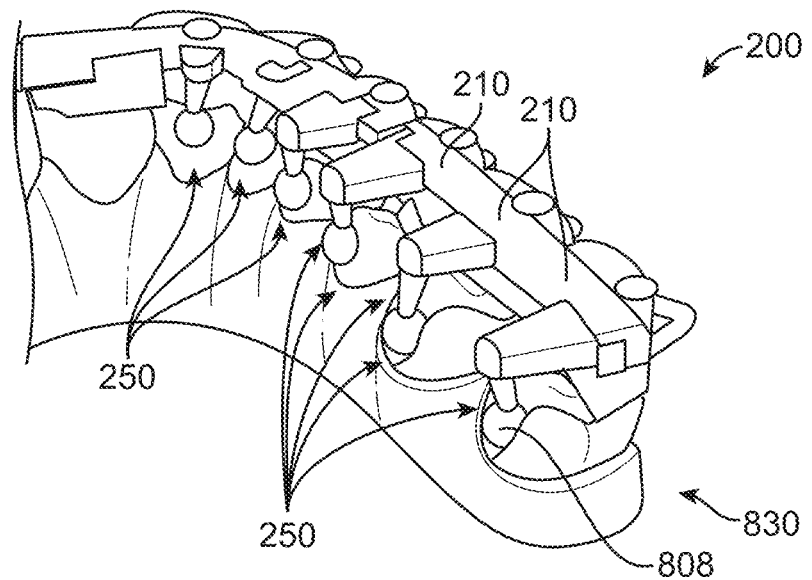
Figure 8C:
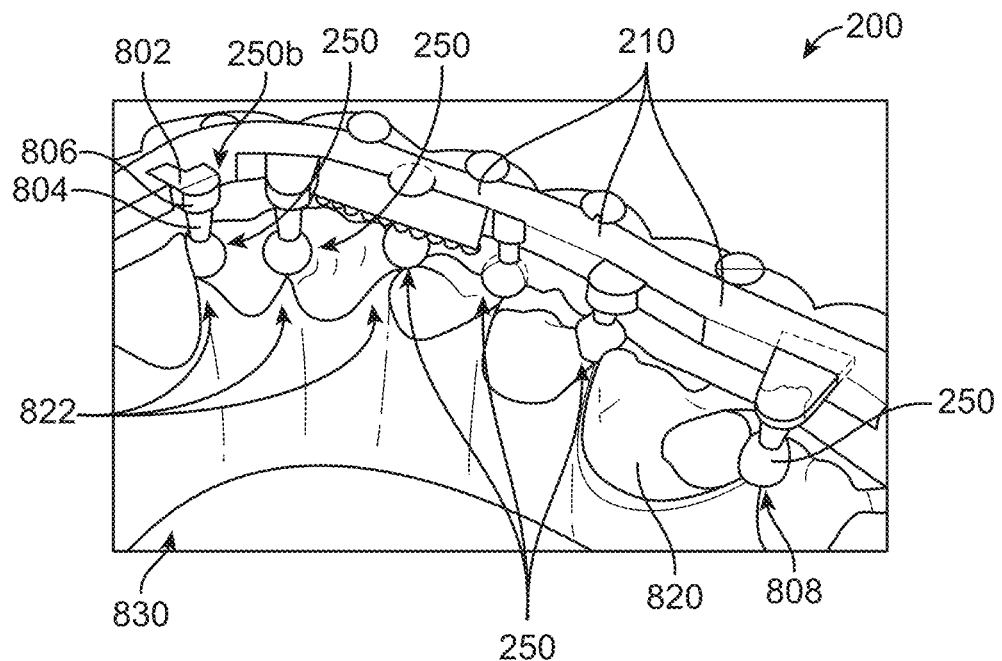

FIGS. 8A, 8B, and 8C illustrate embodiments of a retention support 250 that comprises segments that resiliently deform to provide a holding force against the dentition. According to some embodiments, the attachment placement device 200 includes one or more retention supports 250*a*, 250*b*, that comprise one or more flexible arms. A buccal retention support 250*a* may extend from one or more registration elements 210 on a buccal side of a tooth. A lingual retention support 250*b* may extend from one or more registration elements 210 on the lingual side of a tooth. The retention supports 250 have a proximal segment 802 and a distal segment 804 and an elbow 806 joining the proximal segment and the distal segment, for example. The proximal segment may extend away from the registration element 210 and the distal segment may extend toward the registration element. In some embodiments, the proximal segment, the distal segment, the elbow, or any combination are formed from a resilient material that allows the retention support to elastically deform.

The proximal segment 802 has a connected end that connects the retention support to the registration element. The proximal 802 segment extends generally away from the registration element 210. An elbow 806 connects the proximal segment 802 to the distal segment 804. The elbow provides 806 a change of direction so that the distal segment 804 extends generally towards to registration element, and the elbow may form an angle or a curve that creates an angle between the proximal segment and the distal segment. According to some embodiments, the angle is acute, such as less than 90°, while in other embodiments, the angle is obtuse (e.g., greater than) 90)°. In some embodiments, the angle is 90°.

The tooth engagement surface of the distal end 808 of the lingual retention support may be separated by a distance d from the distal end 808 of the buccal retention support. The distance d may be less than the thickness of the tooth between the location where the distal ends 808 contact the tooth, thereby providing a clamping or holding force on the tooth. In some embodiments, the distance d may match the thickness of the tooth at between the location where the distal ends 808 contact the tooth.

In some embodiments, the proximal segment is shorter than the distal segment. In some embodiments, the proximal segment is longer than the distal segment. In some embodiments, the proximal segment and the distal segment are the same length.

The distal segment has a distal end configured to engage with the dentition to provide a holding force for the attachment placement device 200. The distal end may have a convex shape to approach a point contact with a portion of the dentition. In some embodiments, the distal end is formed for surface engagement with a portion of the dentition.

As an example, the distal end 808 may be formed in correlation with the virtual model 830 of the dentition, as shown in FIGS. 8B and 8C, and the distal end 808 can be shaped to cooperate with anatomical features of the dentition. For instance, the distal end may be shaped to engage the interproximal region 822 between two teeth 820 (FIG. 8C). Alternatively, the distal end of the retention supports 250) may be shaped to engage an undercut portion of a tooth (FIG. 8B), such as the cervix region near the gingiva 824 of a tooth. In some embodiments, a buccal retention support engages the buccal surface of a tooth, and a lingual retention support engages a lingual surface of a tooth. The distal end may be configured to engage with the gingiva 824 of a patient to provide a holding force for the attachment placement device.

The virtual model 830 of the dentition may be used to form a compound surface on the distal end that will engage with a surface of a tooth. The distal end may engage with one or more surfaces of a tooth and may engage the buccal surface or the lingual surface of a tooth. The virtual model may be used to subtract a portion of the tooth shape from the distal end to provide an intimate surface contact between the distal end and a surface of the tooth or teeth.

In some embodiments, the buccal retention support, the lingual retention support, or both, are resilient and create a force when installed onto a dentition to maintain the orthodontic device in place. In use, as the orthodontic device is placed over a dentition, the lingual retention support, the buccal retention support, or both, elastically deform to allow the device to fit onto the dentition. The retention supports cooperate to provide a lingual force that biases the device in a lingual direction, thereby holding the orthodontic device in place, for example. In some embodiments in which attachments 110 are held in place by the orthodontic device, the lingual force holds the attachments against the tooth and allows a treatment professional to proceed to bond the attachments to the tooth, as desired. In some instances, the retention supports adequately holds the orthodontic device in place and the treatment professional is free to use both of her hands for other purposes. In some embodiments, the resilient retention support is configured to hold the device place such that the treatment professional does not need to actively hold the orthodontic device in place.

In some embodiments, one or more retention supports are able to clamp onto a tooth and hold the device in place. One or more retention supports may be applied to a single tooth in order to retain the device in place. In some embodiments, two or more retention supports are provided on the attachment placement device 200, while in some embodiments, four, six, eight, ten, or more retention supports are provided to hold the device onto the dentition, for example with gentle clamping.

The retention supports may be integrally formed with the attachment placement device 200, such as by forming them using an additive manufacturing process. The clamping force of the retention supports can be configured by selection of the manufacturing material, the angles of the proximal segment and distal segment in relation to the dentition and to each other, the thickness of the retention support, and the thickness and angle of the elbow, among other things.

The one or more retention supports can be configured to contact an interproximal region between teeth, or may be configured to contact a surface of a single tooth. In some cases, the one or more retention supports are configured to contact a surface of one or more teeth. The non-interproximal region contact configuration may provide greater retention through increased surface contact with the one or more teeth. Contacting a single tooth also allows the registration element 210 to register relative to a single tooth, rather than registering the space between teeth, which may move over time. In some cases, a digital scan of the interproximal region may be less accurate than a scan of a tooth surface away from the interproximal region. In some embodiments, the attachment placement device 200 includes a combination of one or more retention supports configured to contact one or more interproximal regions and one or more retention supports configured to contact a single tooth surface.

Figure 9:
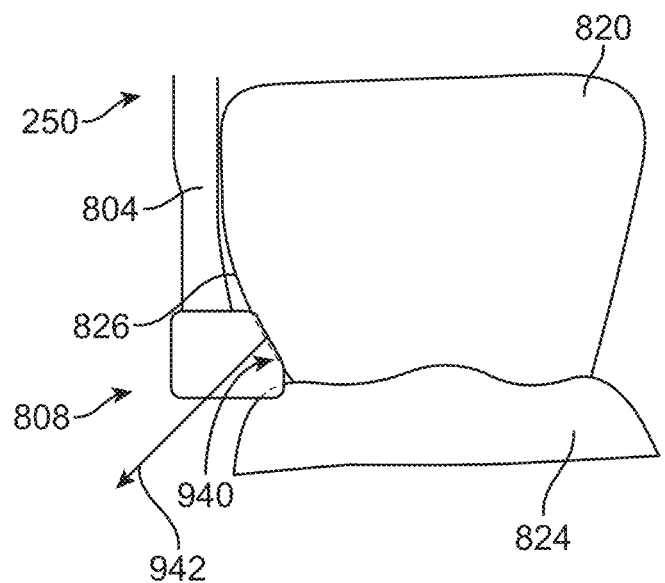
FIG. 9 shows a self-retention structure engaging an undercut portion of a tooth, in accordance with some embodiments.

FIG. 9 illustrates a side view of a tooth 820 and illustrating a retention support 250) in closeup showing the distal segment 804 and the distal end 808. The distal end 808 has been shaped to conform to the surface 826 of the tooth 820. In some embodiments, a scan of the teeth can be used to create a 3D model of the dentition and the shape of the tooth at the point of contact can be subtracted from the distal end of the retention support. In this way, the distal end mates with the surface 826 of the tooth to provide a surface contact 826 between the distal end and the tooth surface. As illustrated, the distal end can engage the tooth along an undercut region near the base of the tooth. In some embodiments, one or more retention supports engage the tooth at one or more undercut regions 940 to provide an anchoring force 942 for the attachment placement device 200. A retention force 942 is created by the resiliency of the retention support as it wants to return to its original, undeformed, shape. The retention force 942 is applied in a direction normal to the surface contact between the distal end and the tooth. By securing the distal end to an undercut region 940 of a tooth, as shown, the retention force applies a vector component in a lingual direction and a vector component in a direction toward the gingiva 842, thus holding the registration element 210 in an installed position on the tooth. The retention force can be configured for any desired magnitude and direction by selectively varying the retention support or the contact area between the distal end and the tooth, or both. Two or more retention supports can be configured to cooperate to provide retention force vectors having different directions and magnitudes to maintain the attachment placement device 200 in its proper location.

In some embodiments, one or more retention supports are configured to engage tooth and contact the gingiva of a patient. Buccal and/or lingual retention supports can be configured to interact with the gingiva of the patient and hold the attachment placement device 200 in place from above (or below) the teeth. The distal ends of the retention support can engage below where the roots of the tooth end and the tooth has a natural undercut region within the gingiva.

Figure 10:
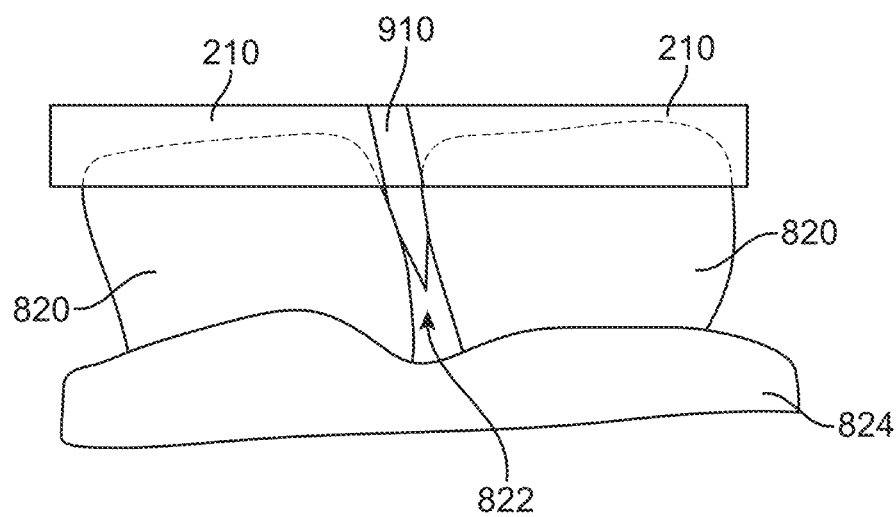
FIG. 10 shows a locator for insertion into an interproximal region to locate one or more registration elements 210, in accordance with some embodiments.

FIG. 10 shows an embodiment of a locator that can be used to accurately position one or more registration elements 210. In some embodiments, a wedge-shaped locator can be formed that corresponds to the anatomical geometry of the interproximal region between two teeth. The locator 910 can be attached to one or more registration elements 210 and pushed between the teeth 820 to position the attachment placement device 200 in place. Depending on the tooth geometry, teeth spacing, angle of teeth, etc., utilizing a single interproximal locator may be used to position an entire segment or an entire quadrant of the attachment placement device 200. The wedge-shaped locator can be formed integrally with the one or more registration elements 210, such as through an additive manufacturing process and in view of a 3D virtual model of the dentition to accurately locate and shape the locator to provide a securing force through interference with the interproximal region between two teeth. In some embodiments, a locator can be provided on one or more registration elements 210, and one or more couplings may be provided between adjacent registration elements 210 to provide adjustability of the attachment placement device 200.

Figure 11A:
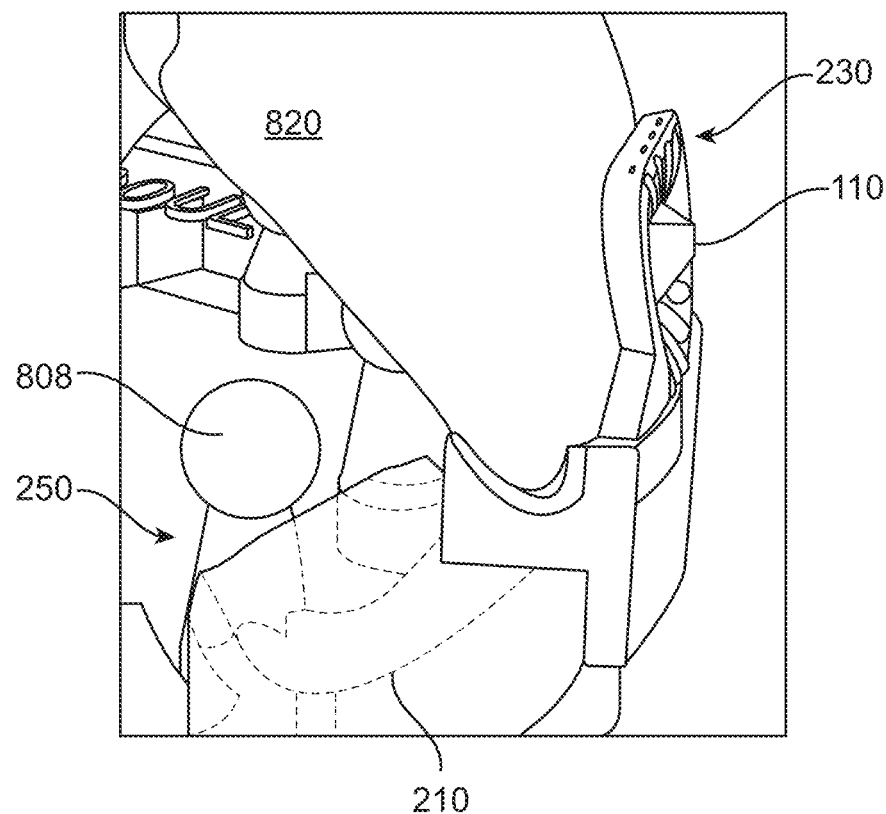
FIGS. 11A and 11B show an attachment placement device that has been sized to provide a press fit onto one or more teeth, in accordance with some embodiments.
Figure 11B:
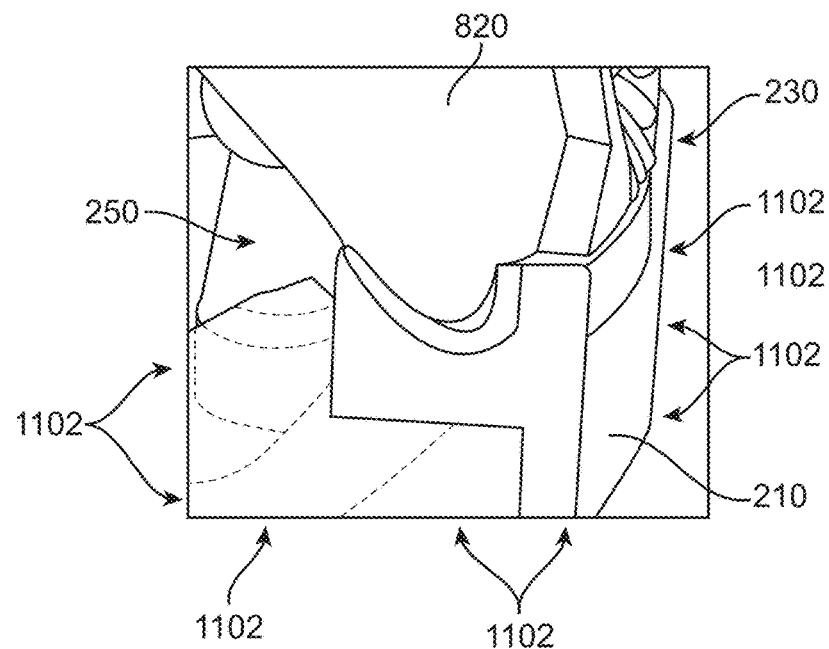

FIGS. 11A and 11B illustrate embodiments of an attachment placement device 200 having a friction fit with an incisal edge (or an occlusal surface in the case of a molar)

of a tooth. In some embodiments, the registration element 210 is designed to match the surface features of a tooth and fit over a part of the tooth. Specifically, an inner surface of the registration element 210 can be shaped to match the incisal surface of a tooth to which it is configured to be attached. In some instances, the registration element 210 is undersized with respect to the geometry of the tooth to create a friction fit with the tooth, as shown by arrows in FIG. 11B. For example, a registration element 210 can be undersized, such as by 0.5%, 1%, 1.5%, 2% or more, by scaling down the dimensions of the registration element, for example prior to fabrication with appropriate processor instructions or during fabrication. The reduction in dimensions of the opposing structures (e.g., the registration element 210) and the incisal surface of the tooth) provide a tight surface contact that allows a friction fit to promote engagement of the registration element 210 with the tooth. The friction fit promotes the registration element 210 being installed at the proper location, thereby positioning an attachment coupled to the registration element 210 at a proper location.

A friction fit between the registration element 210 and the tooth may be provided in combination with the other retention structures described herein. Specifically, a registration element 210 may be configured for a friction fit with a tooth, as has been described, and the registration element 210 may additionally have one or more retention supports to promote engagement of the registration element 210 with a tooth. The registration element 210 may comprise an elastically deformable material that provides elastic forces (indicated with arrows 1102) to the tooth to retain the registration element 210 on the tooth. In accordance with embodiments described herein, an attachment placement device 200 may comprise one or more registration elements 210, a resilient coupling between registration elements 210 where the attachment placement device comprises two or more registration elements 210, one or more retention supports, one or more attachment supports, and one or more attachments.

Figure 12A:
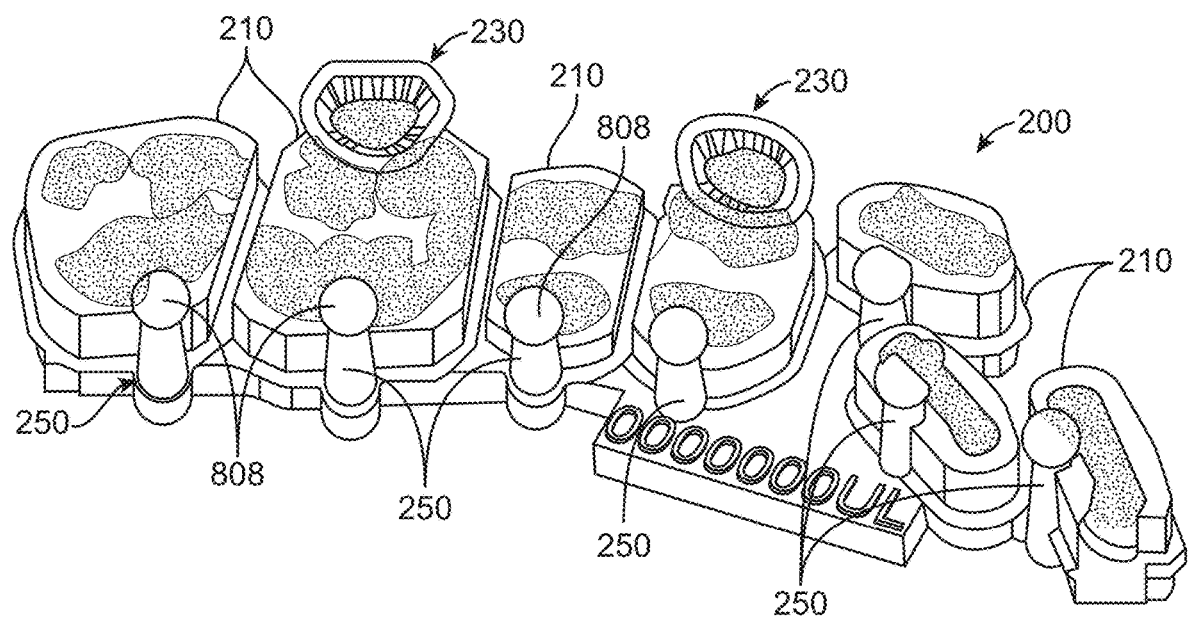
FIGS. 12A, 12B, and 12C show surface texture to increase the friction between surfaces, in accordance with some embodiments.
Figure 12B:
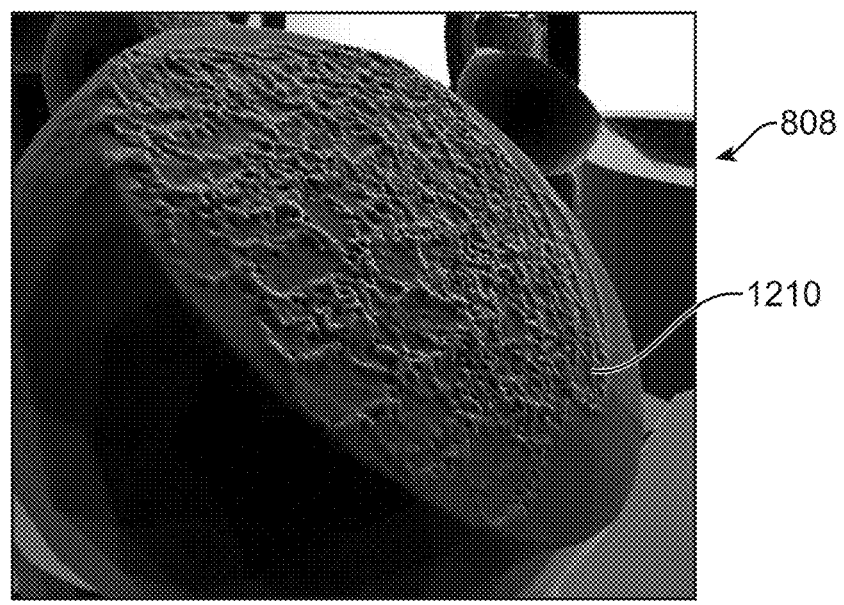
Figure 12C:
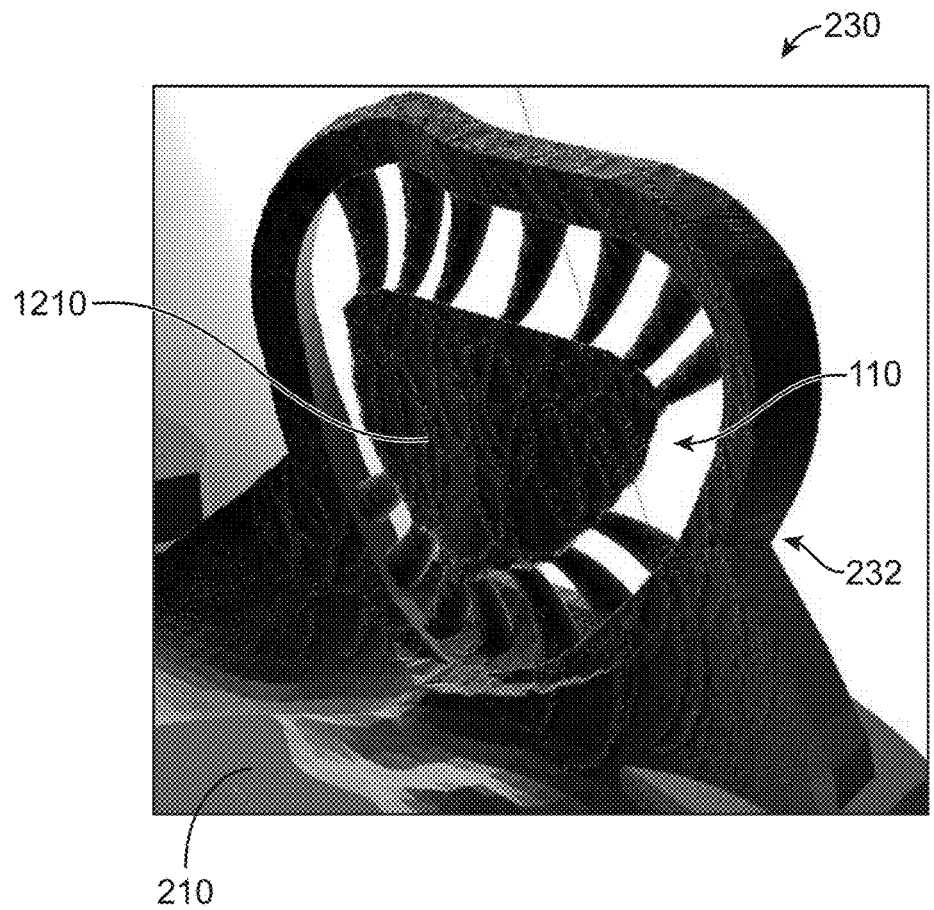

FIGS. 12A, 12B, and 12C show an attachment placement device 200 in which the tooth contacting surfaces 1210 are configured with a texture to increase friction and/or bonding surface area. As shown, surfaces, such as an inner surface 1210 of the registration element, a contact surface 1210 of the attachment 110, or the attachment support can be formed with a textured surface to increase the friction at the interface of the attachment placement device 200 and the tooth. The texture may be formed in any suitable configuration and may be a pattern, roughness, bumps, points, peaks and valleys, or any regular or irregular surface feature that promotes friction between mating surfaces.

An attachment placement device 200 may comprise one or more registration elements 210, attachment supports, and retention supports. The attachment supports can comprise an attachment frame and an attachment carried by, and selectively releasable from, the attachment frame 260. An attachment support may be carried by each registration element. An attachment 110 may be carried by each attachment support. In some embodiments, there are more registration elements 210 than there are attachment supports. In some embodiments, there are more attachment supports than there are attachments 110. In some embodiments, a treatment professional may bond some, but not all of, the attachments provided with an attachment placement device 200 at a treatment setting. The unused attachments may remain with the attachment placement device 200 until the treatment professional decides to bond the unused attachments to the teeth at a later time in a later procedure.

In some embodiments, the attachment placement device 200 may be marked with indicia to provide information about the attachment placement device. For example, the indicia may be a device identifier that uniquely identifies the model, lot number, specific device, patient or other identifying characteristic of the attachment placement device 200. The indicia may include one or more numbers, letters and symbols. In some cases, the indicia are integrated into the device during manufacture. The identifier may be added in a virtual model of the attachment placement device 200 and integrally formed into the structure when 3D printed. In some cases, the indicia may be added after forming the attachment placement device 200.

According to some embodiments, the attachment placement device 200 may include structure that holds the device in place once installed on a dentition of a patient. Accordingly, the treatment professional need not physically hold the device in place while bonding attachments. The treatment professional may utilize both hands during bonding of one or more attachments to the teeth and then selectively separate the attachments from the attachment placement device 200 and remove the attachment placement device from the dentition, leaving the attachments behind.

In some embodiments, the attachment placement device 200 is installed by gently forcing the attachment placement device 200 onto the dentition of a patient. In some embodiments, an installation force will cause the retention supports to resiliently deform to slide over one or more teeth of the patient, and may cause the registration element 210 to form a press fit with one or more teeth of the patient. In some embodiments, the installation force is applied by the treatment professional, such as by using her hands to force the attachment placement device 200 onto the dentition. In some embodiments, the opposing jaws of the patient are used to provide an installation force.

In some embodiments, the amount of force to remove the placed appliance from the teeth is greater than the weight of the appliance, such that the attachment placement device 200 can remain placed on an upper jaw.

Figure 13:
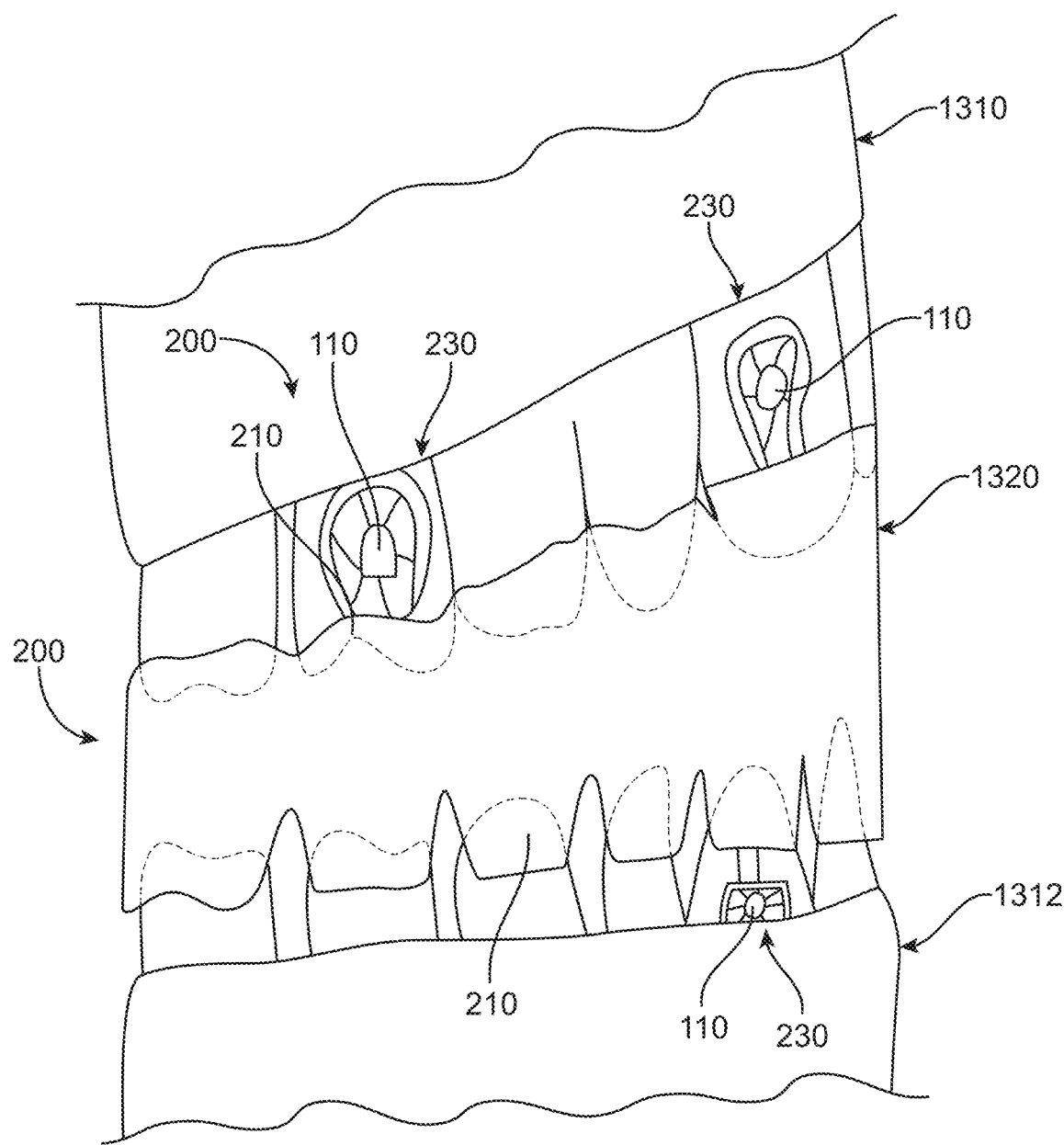
FIG. 13 shows an attachment placement device held in place by an opposing jaw clamping forces, in accordance with some embodiments.

FIG. 13 shows an attachment placement device 200 in which the opposing jaws 1310, 1312 of the patient provide an installation force to fit the attachment placement device 200 onto the upper dentition, the lower dentition, or both. According to some embodiments, an upper attachment placement device 200 and a lower attachment placement device 200 as described herein may be formed of a unitary structure 1320, or may be coupled together by a spanning structure that allows both upper and lower attachment placement devices to be installed concurrently by the patient biting down on the structure. In some embodiments, the opposing jaws act as a clamp to hold the upper, lower, or both attachment placement devices in place while the treatment professional bonds one or more attachments to one or more teeth.

The spanning structure 1320 may comprise holes, a lattice structure, or open areas that allow the treatment professional to access the lingual side of the device for curing attachments 110 onto the lingual surfaces of teeth. In addition, the spanning structure may be formed to promote alignment between jaws. According to some embodiments, the attachment placement device 200 can be 3D printed and be designed to have teeth receiving cavities to accommodate both the upper and lower jaws. In those embodiments in which upper and lower attachment placement devices are installed concurrently, attachments placed on the upper and lower dentitions can be bonded during the same bonding procedure. That is, the upper and lower attachments 110 can be positioned and located concurrently, and the treatment professional can bond all the attachments according to the treatment plan during the procedure.

The embodiments illustrated may incorporate one or more of the features previously described. For example, the embodiments of FIG. 13 may include surface textures to improve friction between the incisal surface of the teeth and the attachment placement device 200, the attachment placement device may be undersized to promote a press fit with the upper, lower, or both dentitions. In addition, the attachment placement device 200 may include one or more attachment supports 230 and one or more attachments that are releasably carried by the attachment supports. There may be fewer attachments than there are attachment supports to allow the treatment professional to only bond selected attachments at one time and have the option of using the attachment placement device 200 during a subsequent procedure to bond additional attachments to the same, or different, locations throughout the dentition.

Figure 14:
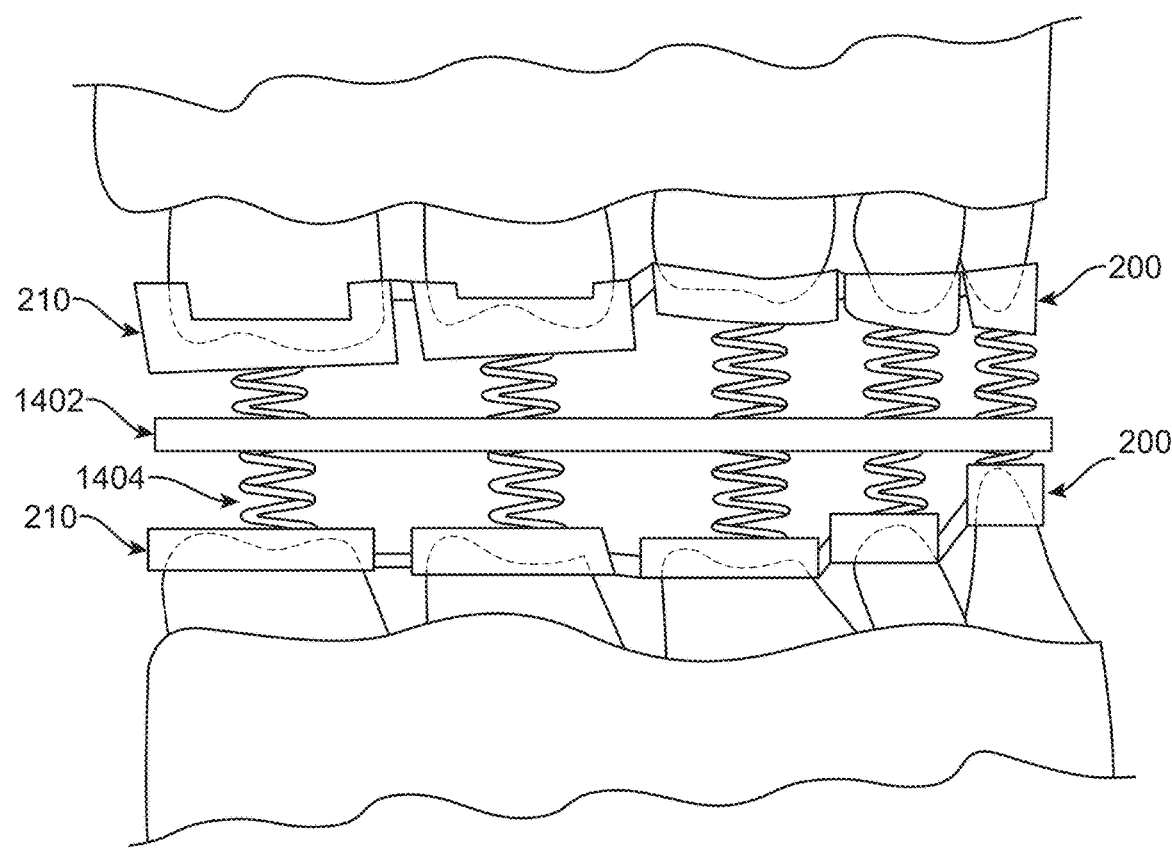
FIG. 14 shows an attachment placement device with a bite plate held in place by opposing jaw clamping forces, in accordance with some embodiments.

FIG. 14 illustrates an embodiment in which a bite plate is used to provide an installation force applied by the opposing jaws of the patient. In the illustrated embodiment, one or more registration elements 210 are positioned over the upper and/or lower teeth of a patient. A bite plate 1402 is located between the upper and lower registration elements 210, which are coupled to the bite plate by springs. 1404 In use, when a patient bites down onto the bite plate, the springs 1404 exert an installation force onto the registration elements 210 which become installed onto the teeth. While the illustration shows springs, it should be appreciated that any resilient structure as described herein could be used to aid in the application of the installation force. For example, the spring could comprise a coil spring, a helical spring, a resilient material formed in any suitable shape (e.g., a foamed material, a sponge material, a lattice material, etc.) or any other material that transfers a force caused by opposing jaws moving together into an installation force on the registration elements 210.

The registration elements 210 may include structure to promote self-retention on the dentition. For example, surface texture may improve friction between mating surfaces, the tooth receiving cavities may be slightly undersized to promote a press fit, one or more retention supports may provide a clamping force onto the dentition, or other such structure may optionally be added to promote a self-retentive attachment placement device 200. Any, or all, of the self-retentive structures described throughout this disclosure may be integrally formed with the attachment placement device 200, such as through additive manufacturing, e.g. 3D printing. In some embodiments, a self-retentive structure is one in which the registration element 210 remains in place in an installed position on a tooth. The self-retentive structure can be any of a number of structures that encourages the registration element 210 to remain in an installed orientation. Examples of self-retentive structures are provided throughout the description and figures and include, without limitation, a press fit, retention supports, friction, a bite plate, a clamping force applied by opposing jaws of a patient, screws, adhesives, among others.

In some embodiments, the bite plate is optional, and the registration elements 210 may be directly coupled to opposing registration elements 210 by a resilient structure (e.g., a spring or other material or structure). According to some embodiments, adjacent registration elements 210 configured to be installed on the upper dentition are coupled by a resilient coupling that allows relative movement between adjacent registration elements 210. In addition, or in the alternative, the registration elements 210 configured to be installed on the upper dentition are also coupled to registration elements 210 configured for installation on the lower dentition. In use, the treatment professional places the registration elements 210 in their approximate location, and as the patient bites down, the clamping force from the opposing jaws provides an installation force to cause the registration elements 210 to fit over the teeth in the proper location and orientation. The self-retentive features (e.g., retention supports, surface textures, press fit, etc.) maintain the registration elements 210 in the installed position. In turn, the attachments are properly located because they are positioned relative to the registration elements 210. The treatment professional is then free to selectively bond one or more attachments 110 to any tooth according to the treatment plan.

Figure 15:
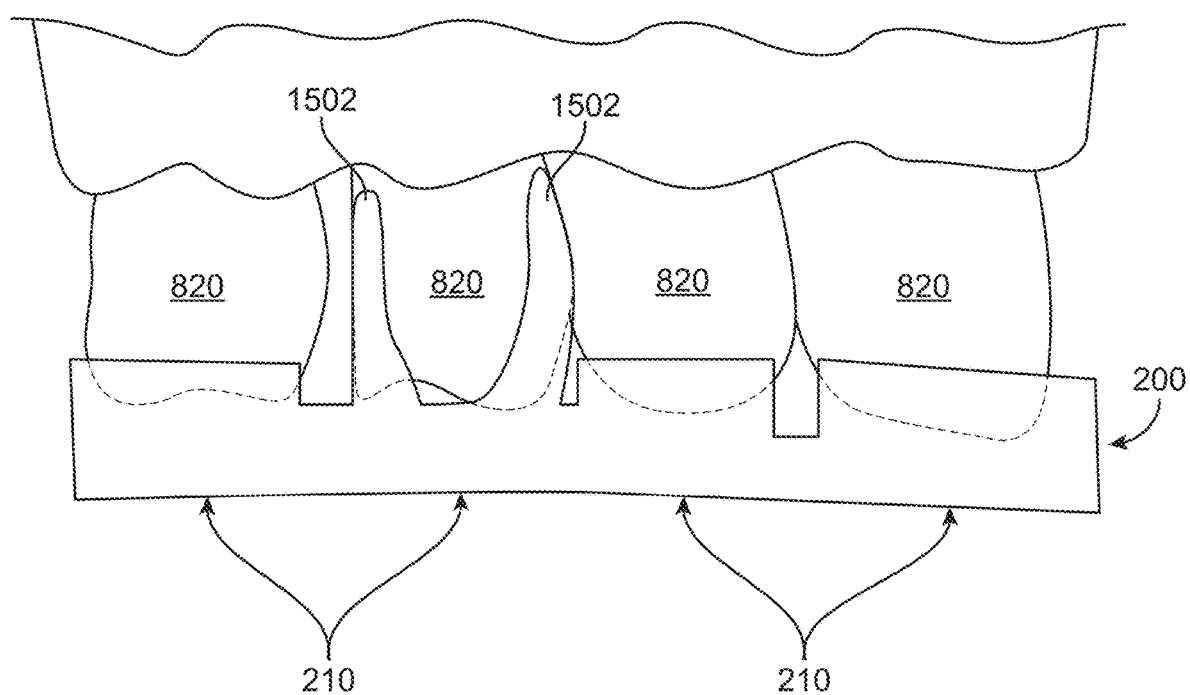
FIG. 15 shows an attachment placement device held in place by gripping a tooth with fingers, in accordance with some embodiments.

FIG. 15 illustrates another embodiment of a self-retentive structure that can be used in combination with an attachment placement device 200, which may also be used in combination with any other structure or feature described herein. As illustrated, one or more registration elements 210 may comprise one or more fingers 1502 that extend around a tooth to grip the tooth and retain the attachment placement device 200 in the installed position. The one or more fingers 1502 may be formed during manufacture, such as during 3D printing of the attachment placement device 200. Additionally, the fingers may be shaped to mate with the surfaces of the tooth, such as the buccal surface, the lingual surface, or the interproximal region. In some embodiments, a 3D virtual model of the dentition is created and the fingers are formed to correspond to the surfaces of the tooth with which the fingers are designed to grip. The fingers may be formed of a resilient material such that as an installation force is applied to the registration element, the fingers spread outwardly to accept the tooth and then spring back into shape to surround a portion of the tooth and provide a gripping force. The fingers may have surface features to increase the coefficient of friction with the tooth as described herein. The fingers may include a surface texture, roughness, bumps, protrusions, or the like to promote the grip of the fingers on the tooth, for example.

In some embodiments, less than all of the registration elements 210 comprise fingers to grip a tooth. For example, fingers may be provided to grip one tooth in each quadrant of the dentition. In other words, an upper attachment placement device may comprise 2 sets of fingers configured to grip 2 teeth. Similarly, a lower attachment placement device may comprise 2 sets of fingers configured to grip 2 lower teeth. Other numbers and locations of sets of fingers may be provided to present alternate forms of self-retention of the attachment placement device.

According to some embodiments, alternative self-retention features may be applied to one or more attachment placement devices. For example, depressions, holes, or other features can be fabricated into the registration elements 210 that interface with the occlusal surfaces (or other surfaces) of the teeth. A temporary adhesive may be applied to the registration elements 210 to promote the registration elements 210 remaining in place once installed. The adhesive may be applied by the treatment professional, or it may be applied during manufacture of the attachment placement device 200. The adhesive may promote the attachment placement device 200 remaining in place, thereby locating the attachments, while the attachments are bonded. After the attachments are bonded, the adhesive bond may be broken by any suitable manner, such as by heat, chemically, an aqueous rinse, a solvent, or by applying a tensile force such as by pulling the attachment placement device 200 off the teeth.

Other retention features and/or structures can be integrated into an attachment placement device 200 in addition or in alternative to the structures already described. For example, a threaded hole may be formed in one or more registration elements 210 and a screw may be threaded into the threaded hold to engage the dentition to provide a holding force to maintain the attachment placement device 200 in the installed configuration. In some embodiments, a set screw may be threaded into the threaded hole and engage the interproximal region between teeth to provide a force on the registration element 210 to help maintain its installed position.

While the embodiment shown in FIG. 15 illustrates an attachment placement device 200 having the registration elements 210 fixedly connected, e.g. with stiffness to add rigidity, it should be appreciated that any one or more of the flexible couplings described herein can be used to couple the registration elements 210 to allow for articulation and/or adjustment of the relative distance between adjacent registration elements 210. For example, any coupling, such as a spring, joint, socket, resilient member, and the like can be used to couple two or more registration elements 210 to provide for adjustability of the attachment placement device 200.

Figure 16:
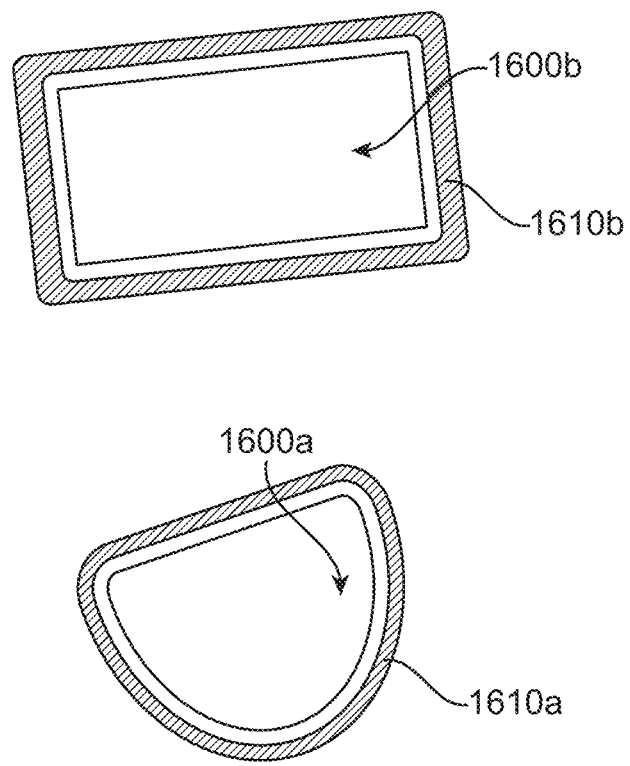
FIG. 16 shows an attachment material overflow well, in accordance with some embodiments.

With reference to FIG. 16, an attachment cavity 1600a and 1600b (e.g., a concave mold) is shown for forming an attachment 110. The attachment cavity may be any suitable size and shape according to a dental treatment plan and provide an anchor point for providing an adjusting force to reposition one or more teeth of a patient's dentition. The one or more attachments may be secured to one or more teeth of a patient. In some embodiments, the attachment cavity comprises a concave space defined by a cavity lip. The attachment cavity can be filled with a curable attachment material, placed on a tooth, and cured with a suitable radiative wavelength, such as UV in some cases.

The attachment well 1610a and 1610b can extend around at least a portion of the attachment cavity to collect excess attachment material. In some embodiments, the attachment well is formed around a portion of the attachment cavity, while in some embodiments, the attachment well surrounds the attachment cavity. In some embodiments, the attachment well defines multiple discrete channels around portions of the attachment cavity.

The attachment well may comprise a volume in relation to the attachment cavity, and may have a volume on the order of 5%, 10%, 15%, 20%, 25%, or more of the attachment cavity. In some embodiments, the attachment cavity is packed with attachment material and positioned on a tooth in a desired location and orientation. Any excess attachment material is allowed to squeeze out of the attachment cavity and collect in the attachment well. In some embodiments, an attachment is pre-formed and the attachment well is used to collect excess attachment bonding composite that squeezes out as a result of bonding an attachment to a tooth.

The securing of the attachment 110 can be accomplished in any suitable manner. For example, the attachment 110 can be cured to the tooth surface, for instance, by use of a light source, such as ultra-violet (UV) light, which will bond the attachment material directly to the surface of the tooth. In some embodiments, an adhesive material can be applied to the back side of the attachment 110 and the adhesive can be used to secure the attachment 110 to the tooth surface. In any case, the attachment well is configured to collect excess material (e.g., excess attachment material, excess attachment bonding composite, or excess attachment adhesive) and the cavity lip, as it is pressed against the surface of the tooth, creates a demarcation between the attachment 110 and the excess material. The excess material can then be removed while leaving a clean edge of the attachment.

The attachment well can further be used to provide a visual aid as to when an attachment cavity is fully packed. As the attachment cavity becomes fully packed, excess material may begin to collect in the attachment well, even before the attachment 110 is fitted onto a tooth, providing a visual indication that the attachment cavity is fully packed.

Although reference is made to directly fabricated appliances, in some embodiments the appliance comprises a thermoformed appliance. For example, the attachment well described with reference to FIG. 16 may comprise a well of a thermoformed appliance.

Figure 17A:
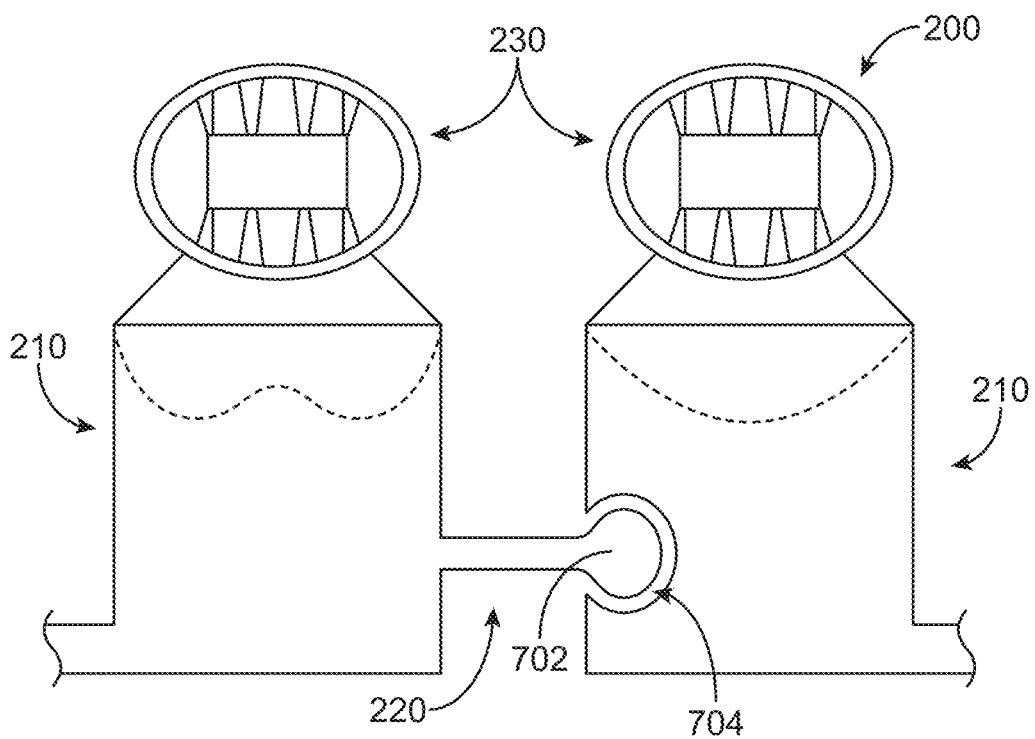
FIGS. 17A and 17B show couplings between registration elements, in accordance with some embodiments.
Figure 17B:
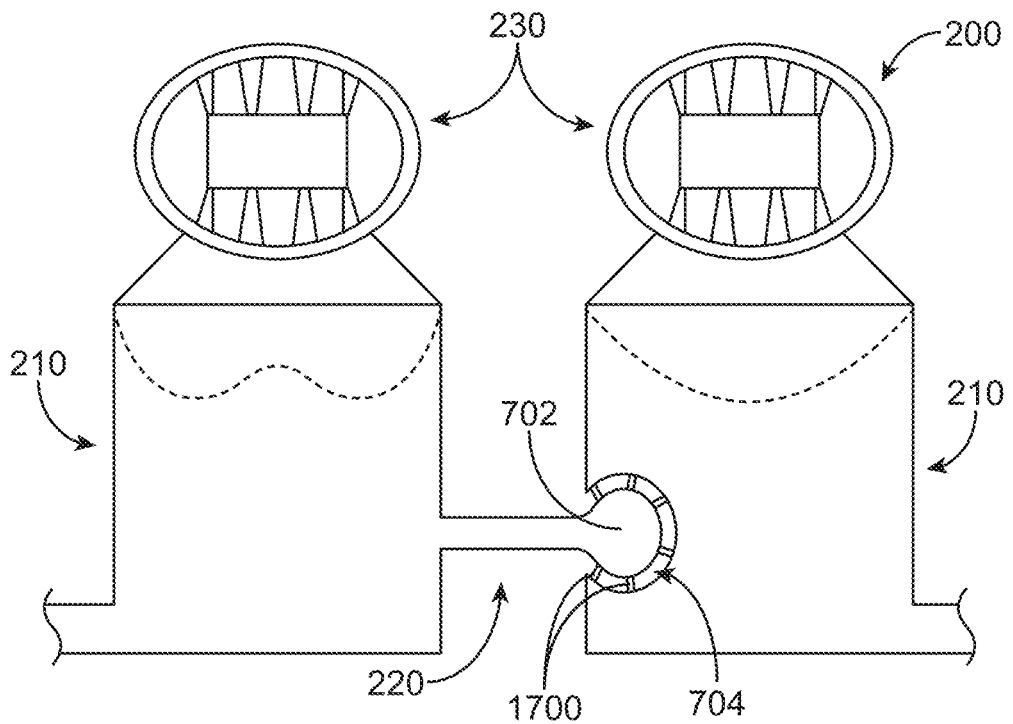

FIGS. 17A and 17B show a variation of the coupling shown in FIGS. 7A and 7B. FIGS. 17A and 17B show a ball and socket joint that allows for articulated movement between adjacent registration elements 210. In the illustrated embodiment, a first registration element 210 comprises a ball 702 extending therefrom and a second registration element 210 comprises a socket 704 configured to receive the ball. In some embodiments, the socket 704 elastically deforms in order to receive the ball 702 therein, and then returns to its original shape to capture the ball within the socket, for example. In some embodiments, the ball and socket are 3D printed as a connected structure and no further assembly is required.

The illustrated couplings provide for relative movement between adjacent registration elements 210 and allow the attachment placement device to articulate at the coupling. The coupling 220 can be fabricated through any suitable additive manufacturing process, such as 3D printing and allows articulation with three degrees of freedom about the coupling. In some embodiments, a combination of couplings can be provided in an attachment placement device. For example, a resilient coupling, a link, a ball and socket joint, or any combination of couplings can be used within a single attachment placement device.

FIG. 17B depicts a section of an attachment placement device 200 that includes two registration elements 210 connected by a ball and socket joint after manufacture. In some embodiments rather than inserting the ball 702 into the socket 704, the ball 702 may be manufactured within the socket 704. Support 1700 may be used in order to facilitate direct fabrication of the ball and socket coupling 220. The support 1700 may extend from an interior surface of the socket 704 to the exterior surface of the ball 702. In some embodiments, the supports 1700 provide the support used in fabricating structures that are not supported by the build plate or another structure during. The supports 1700 may be separated from the ball and the socket after fabrication. For example, the supports 1700 may be frangible such that mechanical articulation of the registration elements 210 relative to each other cause breakage of the support 1700 and separation of the ball from the socket.

Figure 18A:
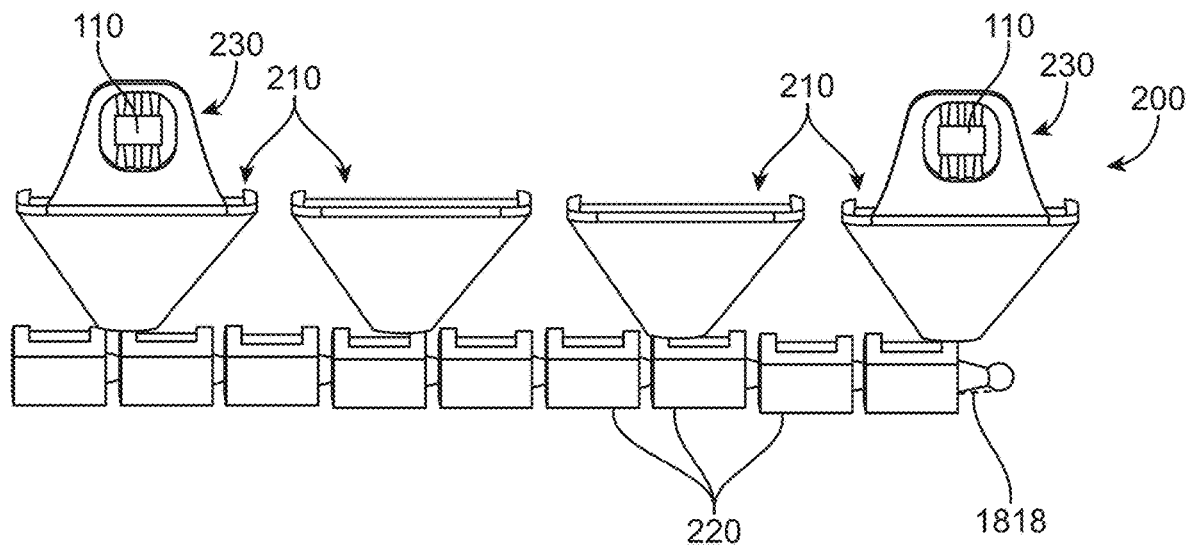
FIGS. 18A, 18B, and 18C, show attachment placement devices with couplings, in accordance with some embodiments.
Figure 18B:
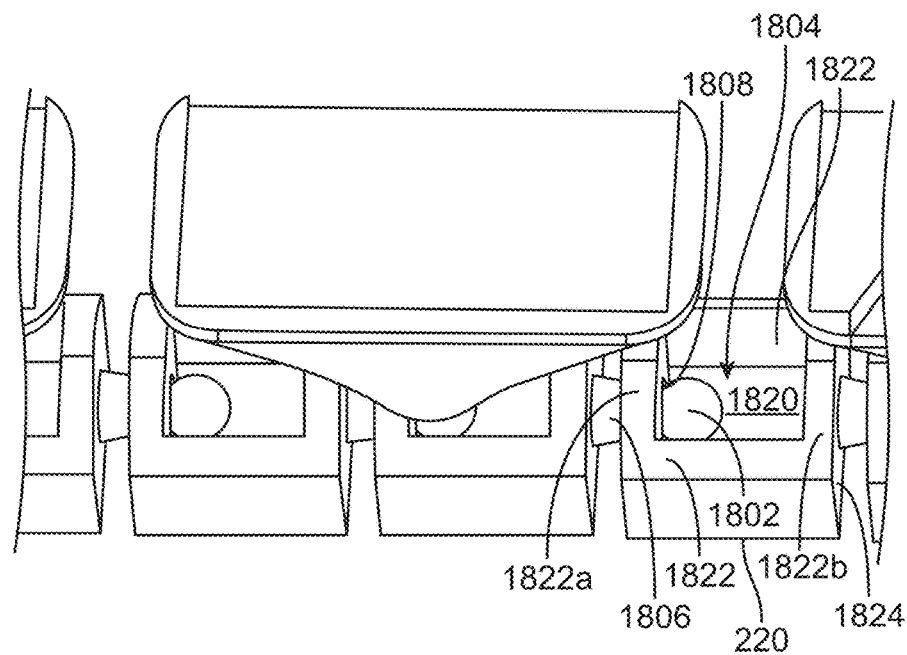
Figure 18C:
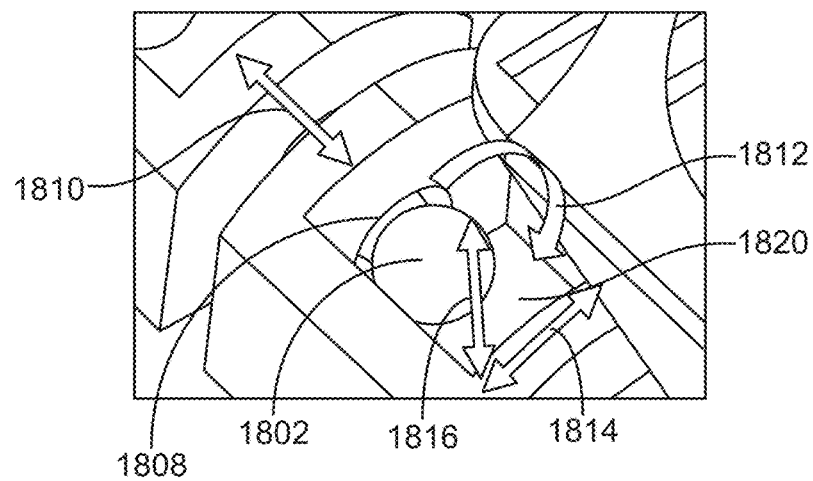

FIGS. 18A, 18B, and 18C depict an attachment placement device 200 that includes a plurality of registration elements 210 coupled to each other via a plurality of couplings 220. The registration elements 210 may include attachment supports 230 for aligning and bonding attachments 110 to a patient's tooth, as discussed herein. The couplings 220 may be a variation of the ball and socket couplings discussed herein.

Each individual coupling 220 may include a socket 1804 and a ball 1802 at a distal end of a shaft 1806. The socket 1804 may include a bottom surface 1820 and a plurality of sidewalls 1822 extending from the bottom surface 1820. In some embodiments the socket may be enclosed such that it has an upper surface opposite the bottom surface to enclose the socket 1804. A first sidewall 1822 a may include an aperture 1808 there through.

The aperture 1808 may be sized such that it has a dimension, such as a diameter, that is larger than a dimension, such as a diameter, of the shaft 1806. In some embodiments the dimension of the aperture 1808 is larger than the dimension of the shaft at both its proximal and distal end. The aperture 1808 may have a dimension, such as a diameter, that is course is smaller than a dimension, such as a diameter, of the ball 1802. The relative sizes of the dimensions allow the shaft to move freely within the aperture but may prevent or resist the movement of the ball 1802 through the aperture 1808. In this way, a ball and shaft of a first of the couplings 220 may be retained within the socket of a second, adjacent, coupling 220. The couplings may be directly fabricated together with the shaft of a first of the couplings 220 formed within the aperture 1808 of a second of the couplings while the ball of a first of the couplings 220 is formed within a socket 1804 of a second, adjacent, coupling 220.

The couplings may be oriented along a mesial distal direction of a patient's dentition when placing the attachment placement device 200 on the patient's teeth. In some embodiments, the length of the shaft 1806 of the first of the couplings in a mesial distal direction may correspond to a width of socket 1804 that extends between sidewalls 1822a and 1822b along a mesial distal direction.

In some embodiments, the aperture 1808 may be a slot extending in a buccal-lingual direction or in an occlusal gingival direction when the attachment placement device 200 is attached to the patient's teeth. In some embodiments, the aperture 1808 may include two intersecting slots, such as a first lot that extends in a buccal-lingual direction and a second slot that extends in a occlusal gingival direction.

In some embodiments, in attachment placement device 200 may include a plurality of couplings 220 with varying degrees of articulation. For example, in some embodiments, the more anterior of the couplings may provide for a greater degree of articulation than the more posterior of the couplings. An anterior coupling may be a coupling directly coupled to the a registration element 210 that is shaped to engage with an anterior tooth of the patient while a posterior coupling may be a coupling directly attached to a registration element 210 that is shaped to engage with a posterior tooth. For example, the shafts and sockets of the anterior couplings may be longer and wider than the shafts and sockets of posterior couplings. Similarly, the apertures of the interior couplings may be larger than apertures of posterior couplings, while the shaft diameters of anterior couplings may be smaller than the shaft diameters of posterior couplings.

In some embodiments, the bottom edge 1818 of the shaft 1806 may be at an angle with respect to a bottom surface of the coupling 220. The angle may be a minimum overhang angle that a direct fabrication machine is able to produce without supports. In some embodiments, the angle may be greater than the minumum overhang angle that a direct fabrication machine is able to produce without supports. In some embodiments, the bottom edge 1818 of the shaft 1806 may extend from an exterior sidewall 1824 of the coupling 220 to a bottom of the ball 1802 as depicted by the dashed line in FIG. 18A. Extending the bottom edge 1818 of the shaft 1806 to a bottom of a ball 1802 may allow the ball to be fabricated without additional supports. In some embodiments, a single support, such as a frangible support 1700 may extend from the bottom surface 1820 of the socket 1804 to support the ball. In some embodiments, a plurality of supports may extend from the bottom surface 1820 of the socket 1804 to support the fabrication of the ball 1802. While reference is made to a bottom surface 1820, the surface 1820 may be considered a first surface formed during the fabrication of the socket during the direct fabrication process. For example, during fabrication using SLA, the surface 1820 may be formed before the sidewalls 1822. During SLA fabrication the device 200 may be formed beneath or suspended from the build plate of an SLA fabrication machine in which case, the surface 1820 is formed above the sidewalls 1822. However, in some embodiments the device 200 may be formed on top of or sitting on a build plate in which case, the surface 1820 is formed below the sidewalls 1822.

As depicted in FIG. 18C, the shape of the shaft, ball, and socket allow articulation of adjacent couplings 220 along and/or about all three dimensions or axis. For example, mesial-distally 1810, buccal-lingually 1814, and occlusal-gingivally 1811. The shapes may also provide for mesial-distal rotation 1812, buccal-lingual rotation, and occlusal-gingival rotation.

Figure 19A:
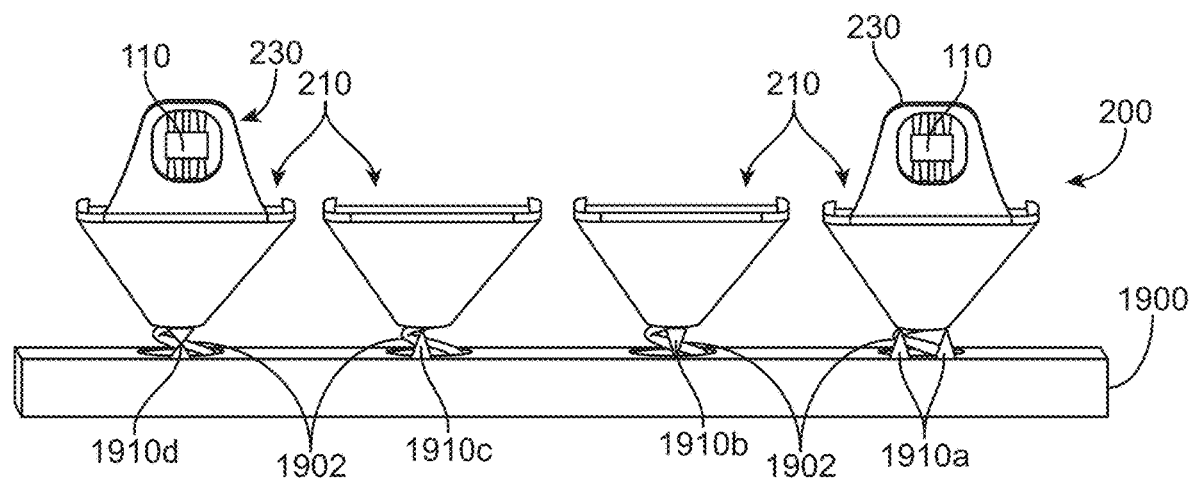
FIGS. 19A, 19B, and 19C show attachment placement devices with couplings, in accordance with some embodiments.
Figure 19B:
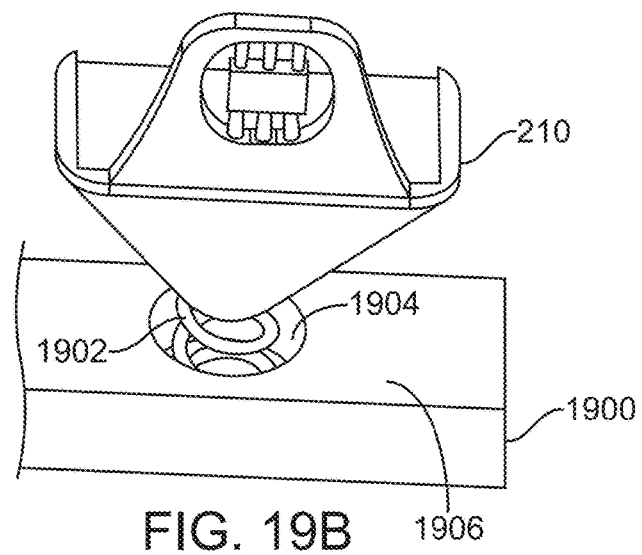
Figure 19C:
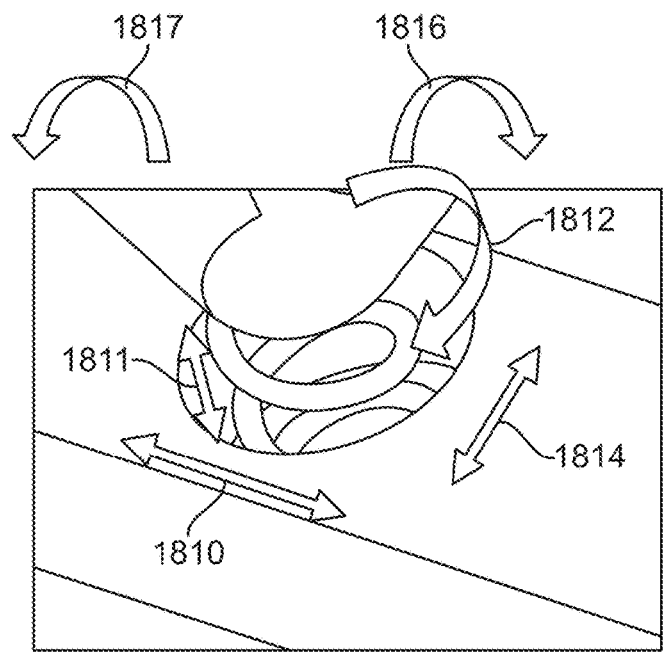

FIGS. 19A, 19B, and 19C depict an attachment placement device 200 that includes a plurality of registration elements 210 coupled to each other via a base 1900. The registration elements 210 may include attachment supports 230 for aligning and bonding attachments 110 to a patient's tooth, as discussed herein. The attachment placement device 200 may also include a plurality of couplings, such as spring couplings 1902, for coupling each of the plurality of registration elements 210 to the base 1900.

The base 1900 may be a continuous structure that is shaped to correspond to a shape of a quadrant of a patient's arch. In some embodiments, the base may be formed to be substantially parallel to the occlusal plane of the patient when the attachment placement device 200 is placed on the teeth of the patient.

In some embodiments, the coupling 1902 allows for relative movement between adjacent registration elements 210 with respect to each other and the base 1900. The coupling 1902 may be formed as a spring, which includes any suitable type of spring (e.g., coil, helical, conical, disc, leaf, or other suitable shape). When formed as a spring, the coupling 1902 can be configured to have spring properties depending on the treatment plan, and the spring may be a constant spring, variable spring, or a variable stiffness spring. The spring constant may also be designed into the spring to allow a desired motion of adjacent registration elements 210 in response to an applied force. The coupling 1902 may alternatively be formed of any suitable geometry, such as zig-zag, sinusoidal, s-shaped, circuitous, V-shaped, flat, and the like. The coupling may also be formed as a suitable connection, flexible member, lattice structure, or other suitable coupling. In some embodiments, the coupling allows articulation between the registration elements 210 and the base 1900 and may allow the distance between adjacent registration elements 210 and the base 1900 to be adjusted.

According to some embodiments, the coupling 1902 allows relative movement between registration elements 210 and the base to allow each of the registration elements 210 to be independently positioned on a respective tooth. In some embodiments, the coupling 1902 is designed and configured to allow a relative range of motion within a range from about 1 mm to about 5 mm and to exert a force within a range of from about 0.1 N to about 1 N.

The coupling 1902 allows freedom in the relative distance and orientation between registration elements 210 and the base 1900. For example, in the course of a treatment plan, the patient's teeth are scanned. By the time the attachment placement device 200 is applied to the patient's teeth (which can be several days or weeks after the initial scan), the teeth may have moved. The one or more couplings 1902 that allow relative motion between adjacent registration elements 210 and the base 1900 and reduces the likelihood that a new attachment placement device 200 would be fabricated or to perform an updated scan of the patient's teeth. The result can be greater efficiency, flexibility, and adjustability at the treatment location.

The coupling between registration elements 210 and the base 1900 can be tuned to have desired properties. For example, the couplings can be designed to have a desired strength, stiffness (e.g., spring constant "k"), restorative force, thickness, and the like. In some embodiments, the coupling 1902 is manufactured with the registration elements 210 through an additive manufacturing process as described herein. Other coupling parameters that may be adjusted include, without limitation, spring diameter, diameter of a spring winding, number of windings, pitch, length, and the like. For example, the distance between occlusal plane and an occlusal surface of each tooth may vary. In such an embodiment, the length of the spring coupling 1902 may vary according to the distance between the occlusal plane of the patient and the occlusal surface of each tooth. For example, when a tooth is further from the occlusal plane the length of the spring that attaches a corresponding registration element 210 for the tooth to the base may be longer than a spring that connects a corresponding registration element 210 for a tooth with an occlusal surface that is closer to the occlusal plane to the base. The coupling 1902 may be attached to the registration elements 210 and the base 1900 through any suitable connection, such as an interference fit, bonding, mechanical fastening, integrally formed during manufacture, or any other suitable method for connecting the registration elements 210 and the base 1900 with a coupling 1902.

In some embodiments, an attachment placement device 200 with registration elements attached to a unitary base, such as base 1900, may provide for easier handling and manipulation by a dentist than an attachment placement device 200 wherein couplings directly couple the registration elements 210 to each other. This may be because the unitary base 1900 provides a more rigid structure for the dentist to handle.

In some embodiments, the springs may be mounted within a blind hole or aperture 1904 formed partially through the base 1900. In some embodiments, the springs may be mounted to a base surface of the blind hole 1904. In some embodiments, the springs may be mounted to an upper surface 1906 of the base 1900. The upper surface may be a surface that faces the occlusal surfaces of the teeth when the attachment placement device 200 is placed on the patient's teeth.

The attachment placement device 200 may include one or more supports 1910 that connect the engagement elements 210 with the base 1900. In some embodiments supports 1910 may provide a rigid connection between the base 1900 and the engagement elements 210. In some embodiments, the supports 1910 may hold the engagement elements 210 in a position such that all of the engagement elements 210 are located with respect to their corresponding teeth according to a scanned position of the teeth. In some embodiments if the teeth move after an initial scan of the patient's teeth then one or more of the supports 1910 may be fractured or removed to allow the registration element 210 two moved relative to the base 1900.

In some embodiments a plurality of supports 1910*a* may be used to couple a registration element 210 to the base 1900. In some embodiments, a single support 1910 may be used to couple a registration element to the base 1900. The registration elements may have a wide base and a narrow tip. In some embodiments, such as with support 1910*c*, the wide base of the support may be at or connected to the base 1900 with the narrower tip at or connected to the registration element 210. In some embodiments, such as with support 1910*b*, the wide base of the support may be at or connected to the registration element 210 with the narrower tip at or connected to the base 1900. In some embodiments, a support, such as 1910*d*, may have a wide base connected to or at both the base 1900 and the registration element 210 with a narrower or frangible section located between the bases.

As depicted in FIG. 19C, the shape of the spring and blind hole allow articulation of registration elements 210 along and/or about all three dimensions or axis with respect to the base. For example, mesial-distally 1810, buccal-lingually 1814, and occlusal-gingivally 1816. The shapes may also provide for mesial-distal rotation 1812, buccal-lingual rotation 1817, and occlusal-gingival rotation 1816.

Figure 20A:
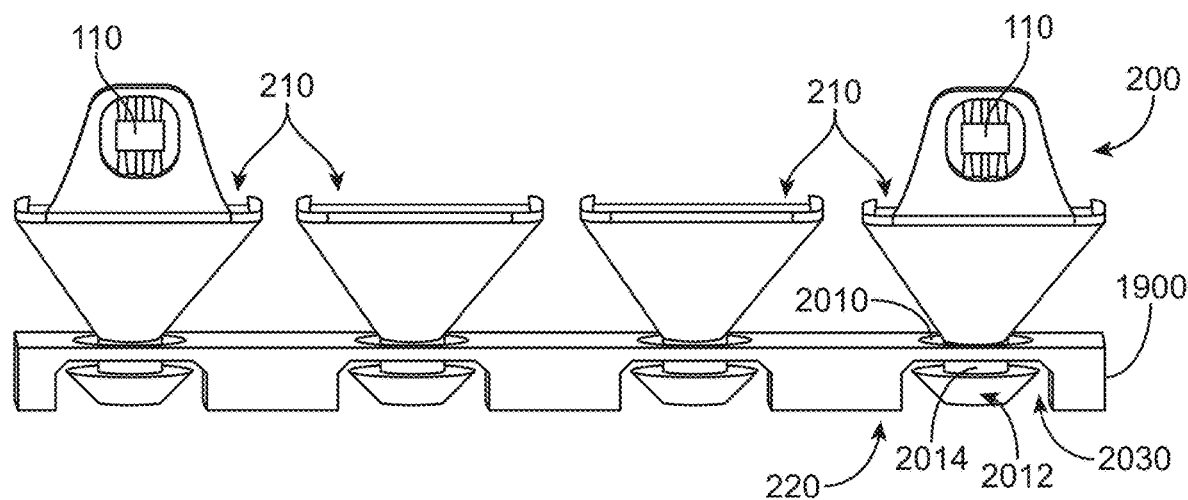
FIGS. 20A, 20B, 20C, and 20D show attachment placement devices with couplings, accordance with some embodiments.
Figure 20B:
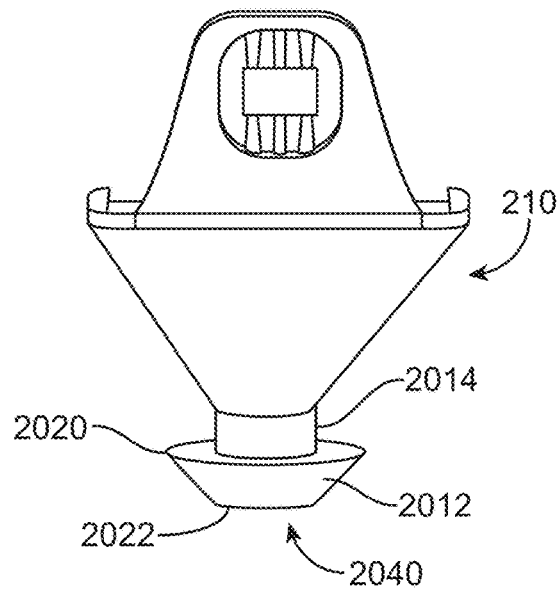
Figure 20C:
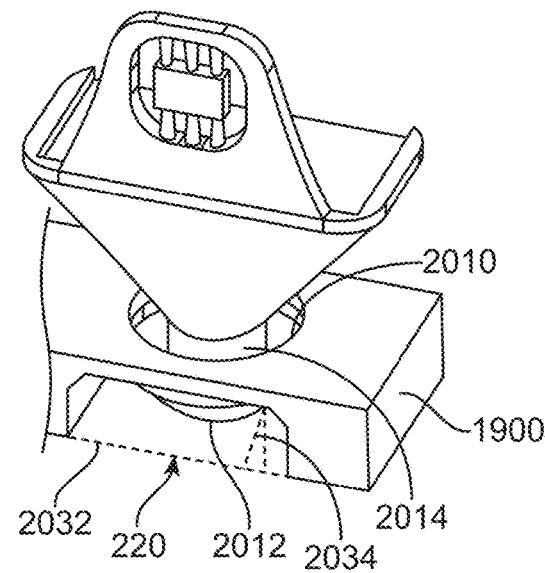

FIGS. 20A, 20B, 20C, and 20C depict an attachment placement device 200 that includes a plurality of registration elements 210 coupled to each other via a base 1900. The registration elements 210 may include attachment supports 230 for aligning and bonding attachments 110 to a patient's tooth, as discussed herein. The attachment placement device 200 may also include a plurality of couplings 220, for coupling each of the plurality of registration elements 210 to the base 1900.

The base 1900 may be a continuous structure that is shaped to correspond to a shape of a quadrant of a patient's arch. In some embodiments, the base may be formed to be substantially parallel to the occlusal plane of the patient when the attachment placement device 200 is placed on the teeth of the patient.

In some embodiments, the coupling 220 allows for relative movement between adjacent registration elements 210 with respect to each other and the base 1900. The coupling 220 may be formed as type of captured coupling wherein a base or end 2012 of the registration element 210 is captured by the base 1900 via an aperture 2010. In some embodiments, the coupling allows articulation between the registration elements 210 and the base 1900 and may allow the distance between adjacent registration elements 210 and the base 1900 to be adjusted.

According to some embodiments, the coupling 220 allows relative movement between registration elements 210 and the base to allow each of the registration elements 210 to be independently positioned on a respective tooth. In some embodiments, the coupling 220 is designed and configured to allow a relative range of motion within a range from about 1 mm to about 5 mm and rotation or angulation of +/− about 5 degrees, about 10 degrees, or about 15 degrees about each axis.

The coupling 210 accommodates changes in the relative distance and orientation between registration elements 210 and the base 1900. For example, in the course of a treatment plan, the patient's teeth are scanned. By the time the attachment placement device 200 is applied to the patient's teeth (which can be several days or weeks after the initial scan), the teeth may have moved. The one or more couplings 220 that allow relative motion between adjacent registration elements 210 and the base 1900 and reduces the likelihood that a new attachment placement device 200 would be fabricated or to perform an updated scan of the patient's teeth. The result can be greater efficiency, flexibility, and adjustability at the treatment location.

The coupling 220 may include two parts, a base portion formed in the base 1900 and a captured portion including a shaft 2014 and head 2012. The base portion may include an aperture 2010 formed through the base 1900 and a cavity or socket 2030 formed in the base and extending from the aperture 2010. In some embodiments, the socket or cavity 2030 has a width 2032 in a buccal-lingual direction and a height 2034 in an occlusal-gingival direction. The aperture 2010 may have a dimension, such as a diameter, that defines the size of the aperture.

The captured portion 2040 may include a shaft 2014 having a first end that extends from the registration element 210 and a second end that extends from the head 2012. The shaft my have a length that extends from the registration element 210 to the head 2012. The head may have a first perimeter 2020 and a second perimeter 2022. The first diameter may be proximal the registration element 210 and the second diameter may be distal to the registration element 210. The dimension of the first perimeter and the second perimeter, such as a diameter of each, may be larger than the diameter or dimension of the aperture 2010 in the base 1900 such that the head is captured by the aperture. In some embodiments, the first perimeter is larger than the diameter of the aperture while the second perimeter is smaller than the diameter of the aperture. In some embodiments, the second perimeter is larger than the diameter of the aperture while the first perimeter is smaller than the diameter of the aperture. In some embodiments, the first and second perimeters have a dimension that is larger than the diameter of the aperture, such that the head is captured by the aperture. The head may have a height extending from the first perimeter to the second perimeter, the height of the head may be less than the height of the cavity 2030.

The base 1900 with the cavity 2030 may be directly fabricated simultaneously with the captured portion including the head and the shaft and the registration element 210, such that the aperture captures the registration element 210 and the captured portion 2040 as they are formed in a direct fabrication process.

The coupling 220, including the base portion and the captured portion 2040, can be tuned to have desired properties. For example, the shaft can be designed to have a desired length in order to provide adjustability for the distance between the base 1900 and a tooth. In addition, the diameter of the aperture and the diameter or the shaft may be shaped to provide for translation and angulation of the registration elements 210 relative to the base 1900.

Figure 20D:
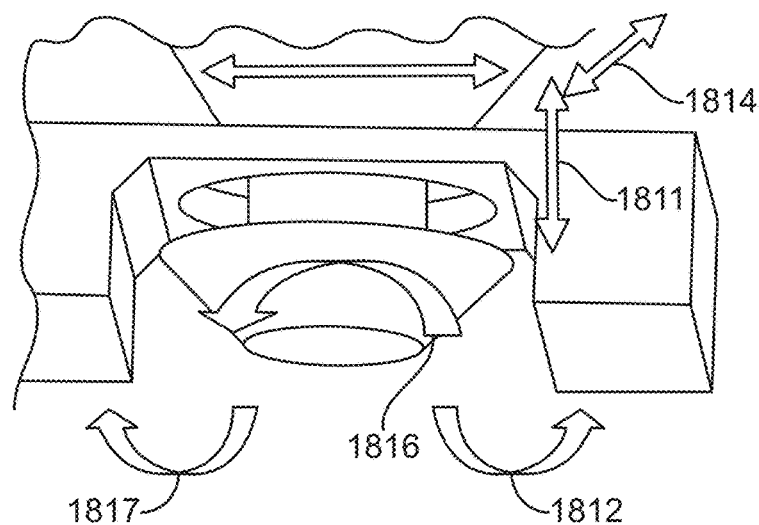

As depicted in FIG. 20D, the shape of the shaft, head, and cavity allow articulation of registration elements 210 along and/or about all three dimensions or axis with respect to the base. For example, mesial-distally 1810, buccal-lingually 1814, and occlusal-gingivally 1816. The shapes may also provide for mesial-distal rotation 1812, buccal-lingual rotation 1817, and occlusal-gingival rotation 1816.

The attachment placement device 200 may include one or more supports, such as supports 1910 that connect the engagement elements 210, including the enlarged head, with the base 1900. In some embodiments, supports 1910 may provide a rigid connection between the base 1900 and the engagement elements 210. In some embodiments, the supports 1910 may hold the engagement elements 210 in a position such that all of the engagement elements 210 are located with respect to their corresponding teeth according to a scanned position of the teeth. In some embodiments if the teeth move after an initial scan of the patient's teeth then one or more of the supports 1910 may be fractured or removed to allow the registration element 210 to move relative to the base 1900.

In some embodiments, the base may have a cross section of about 2 mm in the occlusal-gingival direction and 3 mm in the buccal-lingual direction.

Figure 21:
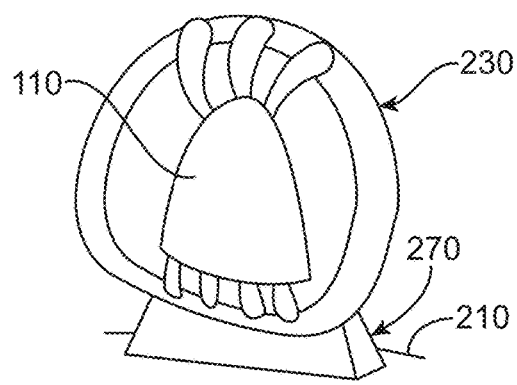
FIG. 21 shows a frame belt of an attachment frame, in accordance with some embodiments.
Figure 22:
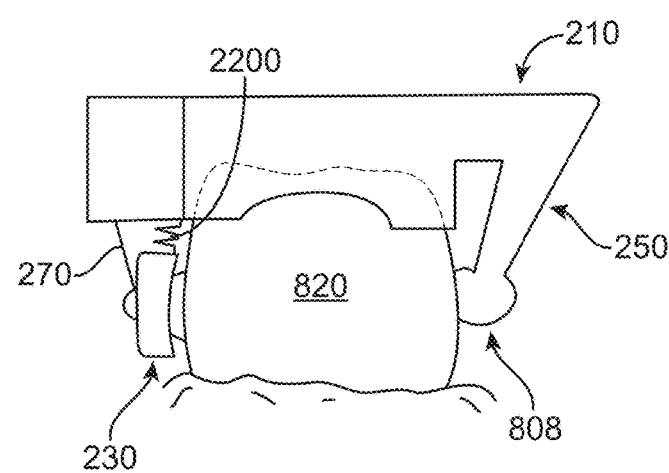
FIG. 22 shows a deflectable frame belt, in accordance with some embodiments.
Figure 23:
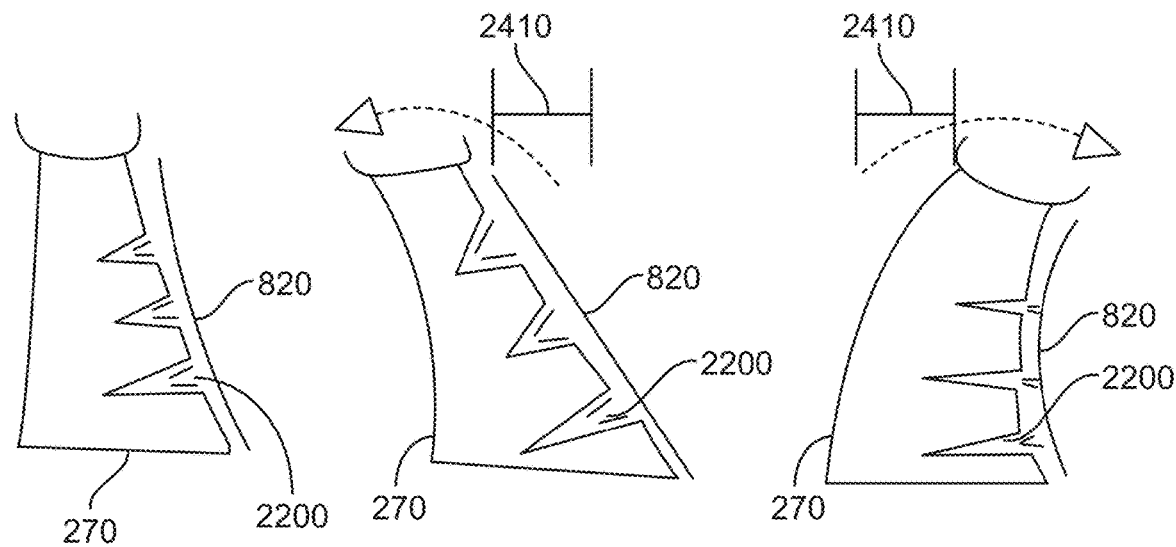
FIG. 23 shows deflection of deflectable frame belts, in accordance with some embodiments.

FIGS. 21-23 depict accommodating frame belts 270 that are designed to provide deformation and flex to the attachment support 230 and the accompanying attachment frame 260 and attachment 110. The frame belt 270) extends between the registration element 210 and the frame 260 of the attachment support 230. By providing for deformation and flex in the frame belt 270, the attachment support and accompanying attachment frame and attachment may accommodate for deviations in the surface of the tooth. For example, a deviation of the surface of the tooth may be formed due to scanning errors in the scanning of the tooth surface or from debris such as access flash, such as epoxy or cured resin or other coupling material that may be left on the tooth.

In some embodiments, the frame belt 270) may be formed from a material with a lower modulus of elasticity than the registration element 210 and the attachment support 230. In some embodiments, the frame belt may include one or more weakening structures 2200. The weakening structures 2200 may be channels formed in and exterior surface of the frame belt, such as the V-shaped channels 2200 or cut wedges depicted in FIG. 23. The channels are weakened portions may extend along a length or width of the surface of the frame belt 2700. In some embodiments a plurality of channels or weakening structures 2200 may be formed in the frame belt. For example, in order to accommodate bending in the buccal lingual direction the frame belt may include channels on both the buccal side of the frame belt and on the tooth facing or lingual side of the frame belt. In some embodiments, the width of the channel is the minimum feature size of the fabrication machine used to fabricate the frame belt 270).

The channels 2200 may extend from an external surface of the frame belt into the frame belt. In some embodiments, the channels 2200 extend into the frame belt less than one third of the width of the frame belt. In some embodiments, the channels 2200) extend into the frame belt between one third and two thirds of the width of the frame belt. In some embodiments, the channels 2200) extend between 20% and 80% of the width of the frame belt. In some embodiments the channels extend between 20% and 50% of the width of the frame belt. In some embodiments the height of the channels of the frame belt is one layer height of the direct fabrication process. In some embodiments the height of the channels is between one and five layers high. In some embodiments, the height of the channels is between two and four layers high.

FIG. 23 depicts a frame belt 270 in three different positions. The leftmost frame belt 270 is shown in a neutral or as fabricated position against a surface of the tooth 820) and matches the expected surface shape of the tooth. The central frame belt 270) is shown deviating a distance 2410 of between one and 300 μm from the expected surface shape of the tooth. In the central depiction, the tooth may include excess flash been that did not exist during the initial scan of the patient's tooth or the scan of the tooth may have resulted in an incorrect model for the surface shape of the tooth. The rightmost frame belt 270 is shown deviating a distance 2410 of between one and 300 μm from the expected surface shape of the tooth. In the rightmost depiction, the tooth surface is inward at a location in, for example, a tooth facing direction that is between one and 300 μm from the expected to shape. In such an embodiment, a dentist or other dental practitioner may apply a force in the direction of the tooth to bend the frame belt 270 and accompanying attachment support towards the surface of the tooth without breaking the frame belt.

Figure 24:
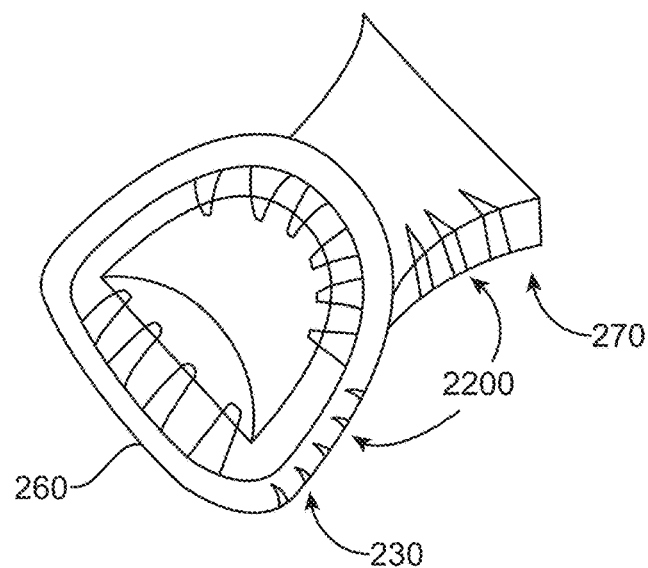
FIG. 24 shows a deflectable frame belt and deflectable attachment frame, in accordance with some embodiments.

FIG. 24 depicts an accommodating frame belt 270) that provides for deformation or flex to the attachment support 230 in a mesial distal direction and an attachment frame 260 that provides for deformation or flex. The accommodating frame belt 270) in the accommodating frame 260 are designed to provide deformation and flex to the attachment support 230) and the accompanying attachment frame 260 and attachment 110.

In some embodiments, the frame belt may include one or more weakening structures 2200 at mesial and distal surfaces of the frame belt 270. The weakening structures 2200 may be channels formed in and exterior surface of the frame belt, such as the V-shaped channels 2200) or cut wedges. The channels or weakened portions may extend along a length or width of the mesial or distal surface of the frame belt 2700. In some embodiments a plurality of channels or weakening structures 2200 may be formed in the frame belt. For example, in order to accommodate bending in the mesial-distal direction, the frame belt may include channels on both the mesial side of the frame belt and on the distal side of the frame belt. In some embodiments, the width of the channel is the minimum feature size of the fabrication machine used to fabricate the frame belt 270.

The attachment frame 260) may also include one or more channels 2200) that may may extend from an external surface of the frame attachment frame 260) into the attachment frame. In some embodiments, the channels 2200 extend into the attachment frame less than one third of the width of the attachment frame. In some embodiments, the channels 2200 extend into the attachment frame between one third and two thirds of the width of the attachment frame. In some embodiments, the channels 2200 extend between 20% and 80% of the width of the attachment frame. In some embodiments the channels extend between 20% and 50% of the width of the attachment frame. In some embodiments the width of the channels of the attachment frame is one layer height of the direct fabrication process. In some embodiments the width of the channels is between one and five layers high. In some embodiments, the width of the channels is between two and four layers high.

Figure 25:
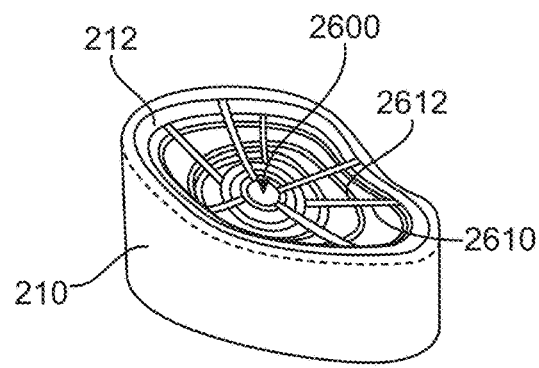
FIG. 25 shows a deflectable occlusal contact surface, in accordance with some embodiments.

FIG. 25 depicts an accommodating occlusal cavity of an inner surface 212 of a registration element 210. The inner surface 212 may be formed of an accommodating structure 2600 that allows the registration element 210 to accommodate changes in the occlusal surface height or shape of a tooth. The changes in the occlusal surface height may be due to interruption of the tooth during the treatment process. The inner surface 212 may be formed of an accommodating basket. In some embodiments the inner surface 210 may be formed from an intersecting web of radial members 2610 that extend from a central location of the inner surface towards a perimeter of the inner surface and a plurality of axial or annular members 2612 that extend concentrically about the center of the occlusal cavity and intersect with the radial members. This configuration allows the accommodating occlusal cavity to flex and change shape to accommodate changes in the surface shape or position of the occlusal surface of the tooth with which the occlusal cavity shaped to engage.

Figure 26:
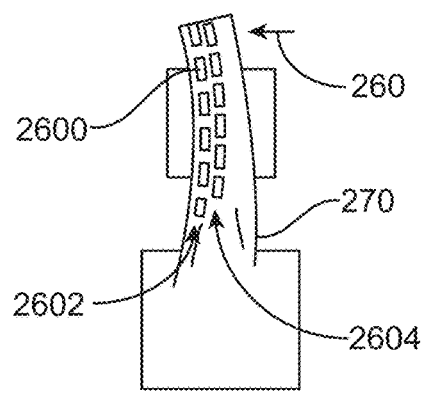
FIG. 26 shows a deflectable frame belt and attachment frame, in accordance with some embodiments.

FIG. 26 depicts an embodiment of an accommodating belt 270 and attachment frame 260 that uses holes formed through the belt and frame in order to provide for deformation flex in the frame. As shown in FIG. 26, the holes 2600 may be staggered in a buccal-lingual direction such that a midpoint of hole in a first column 2602 of holes 2600 aligns with a midpoint between two adjacent holes of a second column 2604 of holes 2600. In some embodiments, the holes or perforations through the frame belt 270 and the attachment frame 260.

Figure 27:
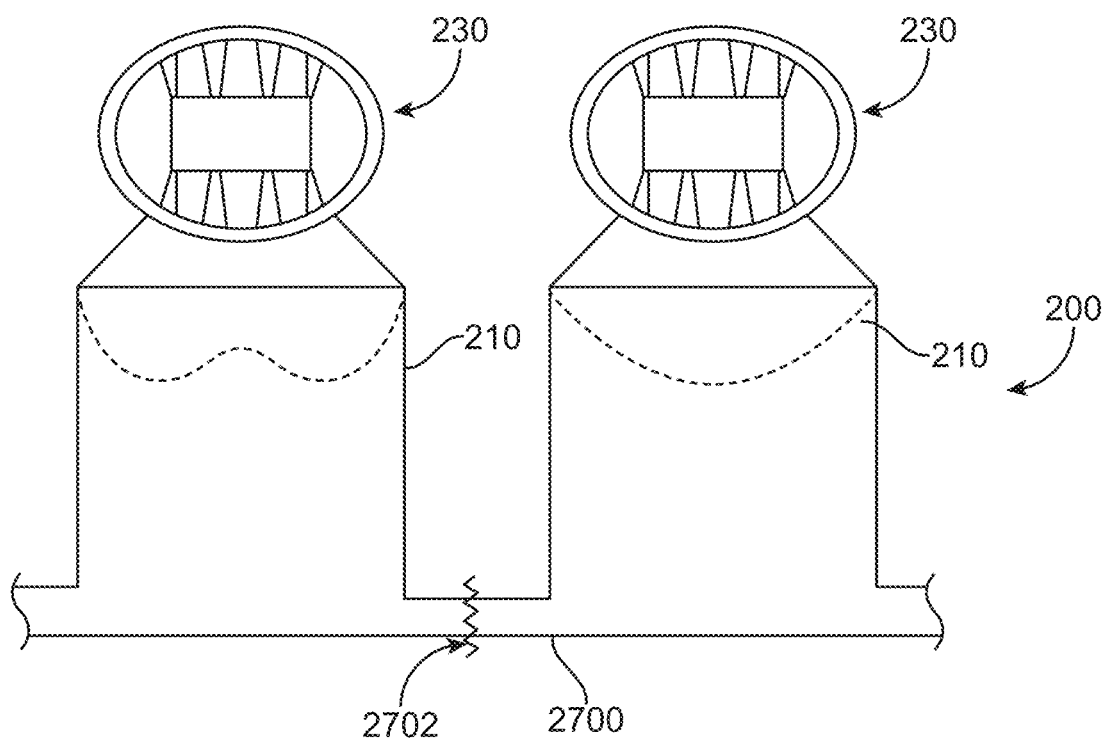
FIG. 27 shows an attachment placement device with a breakable coupling, in accordance with some embodiments.

FIG. 27 depicts an attachment placement device 200 including a plurality of registration elements 210 that each carry an attachment support 230. Each registration element 210 may be coupled to an adjacent registration element 210 via a solid coupling 2700. The coupling 2700 may be designed to allow for easy breakage of the coupling and separation of adjacent registration elements 210. For example the coupling may be between one and 10 layer heights of the fabrication machine. In some embodiments, the height of the coupling 2700 may be less than 10% of the height of the registration element 210. In some embodiments the height or thickness of the coupling 2700 may be less than 0.5 mm or less than 1.0 mm.

In some embodiments, the coupling may include a weakened location 2702 between adjacent registration elements 210. The weakened location may include a force concentration structure such as a notch or channel that allows for breakage of the coupling 2700. By allowing for easy separation of the registration elements 210 from each other, the attachment placement device 200 can accommodate large deviations of tooth locations as compared to their expected locations. In some embodiments, the attachment placement device 200 may be separable such that each registration element 210 is individually separable from the attachment placement device 200.

Figure 28:
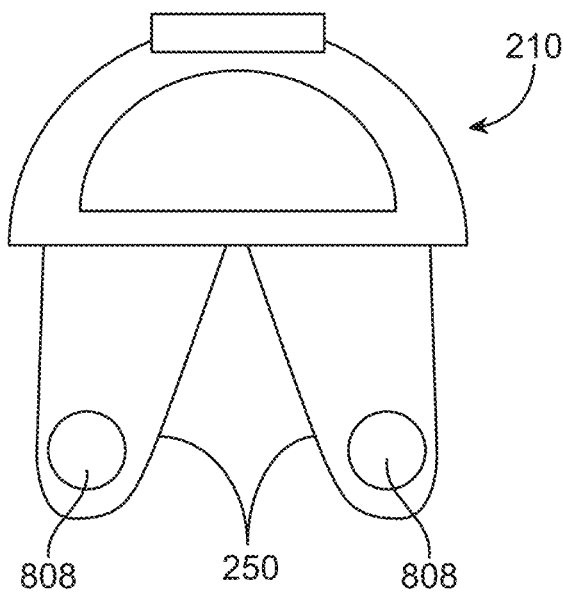
FIG. 28 shows a registration element with a plurality of retention elements, in accordance with some embodiments.

FIG. 28 depicts a registration element 210 that includes a plurality of retention supports 250 extending therefrom. Each of the plurality of retention supports 250 may include distal ends 808 that each have a surface corresponding to a shape of the tooth at a location for which the distal end is shaped to match. In some embodiments, for example in an embodiment such as that depicted in FIG. 27, wherein each registration element is 210 is individually separable, additional registration locations and contact with the tooth may provide for more accurate and reliable placement of the registration element 210 and the accompanying attachment 110. In some embodiments the retention supports 250 may be substantially parallel to each other. In some embodiments, the retention supports 250 may extend away from each other at an angle. In some embodiments the angle may be between about 5 degrees and about 30 degrees.

Figure 29:
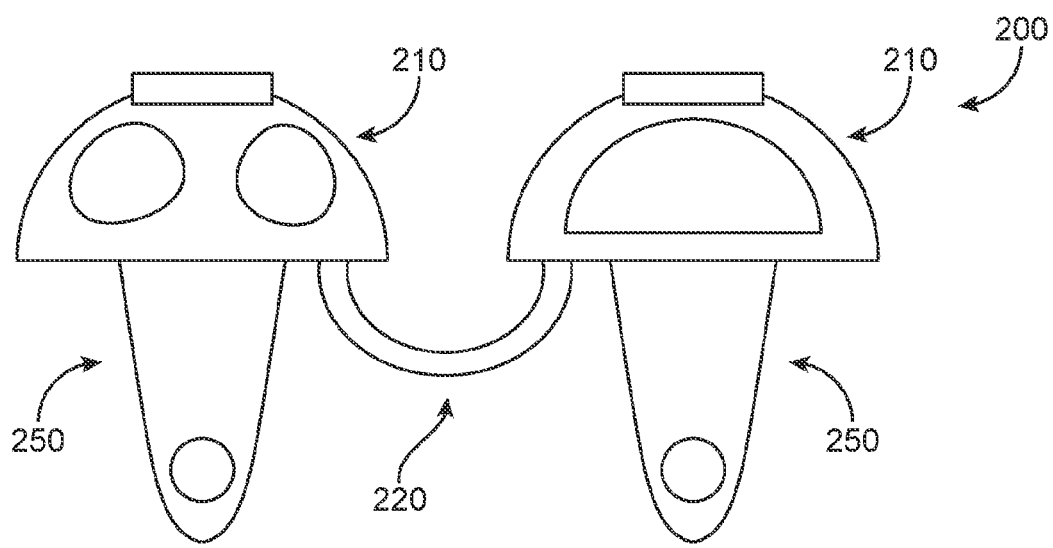
FIG. 29 shows a living hinge coupling a plurality of registration elements, in accordance with some embodiments.

FIG. 29 shows a living hinge coupling 220. A living hinge coupling can be located between adjacent registration elements 210 to provide articulation between the adjacent registration elements 210, so as to improve registration and alignment with the tooth by allowing the position and orientation of the registration element 210 to change in relation to other registration elements 210. This articulation of the plurality of registration elements 210 at a plurality of locations can accommodate differences in tooth position and orientation, such as tooth height and rotation, and may reduce the amount of material and time for fabrication by allowing the registration elements 210 to have similar heights. Also, by allowing relative movement between the plurality of registration elements 210, the plurality of couplings may allow teeth to move between the time the teeth are scanned and the device is placed on the teeth to adhere the attachments. The living hinge may be a flexible hinge made from the same material as the registration elements 210 that it connects. In some embodiments, a first end of the living hinge extends from a first registration element 210 and a second end of the living hinge extends from a second, immediately adjacent registration element 210.

In some embodiments, the device comprises at least a first registration element, a second registration element, a third registration element, and a first living hinge coupling between the first and second registration element 210 and a second living hinge coupling between the second and third registration element. The first and second couplings can allow the position and orientation of the second registration element 210 to change in relation to the first and third registration elements 210, which can improve placement of the retention elements on the teeth and positioning of the attachment.

In some embodiments, a single living hinge coupling extends between adjacent registration elements 210. In some embodiments, two living hinge couplings extend between adjacent registration elements 210. In some embodiments multiple living hinge couplings extend between adjacent registration elements 210. In some embodiments, the living hinge coupling may be made from a material different than the registration elements 210. For example, in some embodiments the material that forms the living hinge coupling may have a lower modulus of elasticity than the material that forms the registration elements 210.

In some embodiments, a living hinge coupling is formed by additive manufacturing during manufacture of the registration elements 210. In some embodiments, the registration elements 210, couplings, retention supports, attachment support, and attachments are all manufactured by an additive manufacturing process as a unitary structure formed of one or more suitable materials.

In some embodiments, the living hinge coupling 220 is designed and configured to allow a relative range of motion within a range from about 1 mm to about 5 mm and to exert a force within a range of from about 0.1 N to about 1 N between adjacent registration elements 210.

FIGS. 30-33 depict embodiments of inner surfaces 212 of registration elements 210 having a reduced contact surface. A reduced contact surface may allow the inner surface 212 to accommodate deviations in an expected surface geometry of the tooth. Deviations and expected surface geometry may be due to difficulties in scanning certain locations and features of a patient's dentition, such as the interproximal area of a patient's tooth, or flash of other material or debris on the surface of the patient's tooth. A reduced contact surface may also allow the registration elements 210 to accommodate variations in manufacturing, such as inadvertent capturing or cooling of resin during the SLA and other fabrication process.

Figure 30:
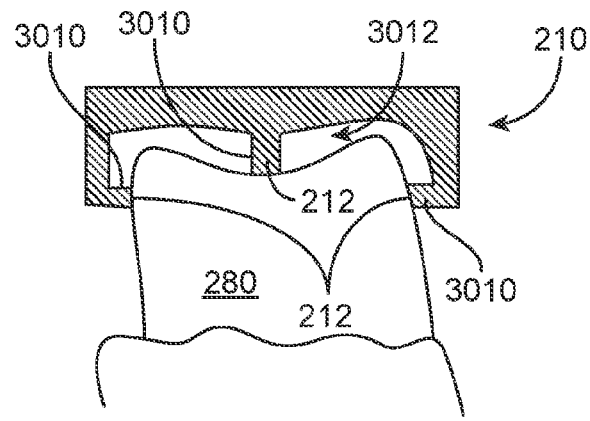
FIG. 30 shows registration elements with reduced contact surfaces, in accordance with some embodiments.

FIG. 30 depicts a buccal-lingual cross section of a tooth 280 and a reduced contact surface 212 of a registration element 210. The reduced contact surface is formed by a plurality of contact numbers 3010 that extend from the registration element 210 the distal ends of the contact members 3010 form the reduced contact surface 212. Each of the distal ends has a surface that corresponds to the shape of the tooth at the contact location. A clearance portion 3012 extends between each of the contact members 3010. The clearance portion is shaped such that it is set back from the expected location of the surface of the teeth.

The contact members may be of many sizes and shapes. In some embodiments the contact members may have a size and shape that corresponds to a minimum feature size of the fabrication machine and resin type. In some embodiments, the contact members may be 200 μm long and have a contact surface that is about 200 μm in diameter or length and width. In some embodiments, the contact members may be between 50 μm and 400 μm in length. In some embodiments the contact surface may have an area of less than 0.5 mm$^2$ or less than 0.1 mm$^2$. In some embodiments, the contact surface may be about or less than 1 mm in length and width. In some embodiments, the cross-section of the extensions 3010 may correspond to the size of a pixel or beam diameter of the fabrication machine used to fabricate the device.

In some embodiments, a reduced contact surface may comprise a first contact member shaped to mate with an occlusal surface of the patient's tooth, a second contact member shaped to mate with lingual surface of the patient's tooth, and a third contact surface shaped to mate with a buccal surface of the patient's tooth. In some embodiments the reduced contact surface may not include a contact surface shaped to mate with the interproximal services of a patient's tooth.

Figure 31:
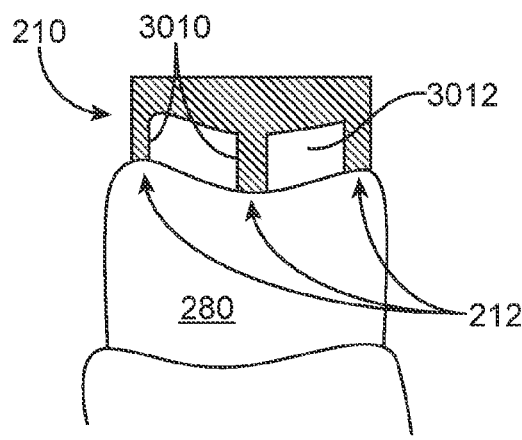
FIG. 31 shows registration elements with reduced contact surfaces, in accordance with some embodiments.

FIG. 31 depicts a mesial distal cross section of a tooth 280 and a reduced contact surface 212 of a registration element 210. The reduced contact surface is formed by a plurality of contact members 3010 that extend from the registration element 210 the distal ends of the contact members 3010 form the reduced contact surface 212. Each of the distal ends has a surface that corresponds to the shape of the tooth at the contact location. A clearance portion 3012 extends between each of the contact members 3010. The clearance portion is shaped such that it is set back from the expected location of the surface of the teeth.

In some embodiments, a reduced contact surface may comprise a first contact member shaped to mate with an central occlusal surface of the patient's tooth, a second contact member shaped to mate with distal occlusal surface of the patient's tooth, and a third contact surface shaped to mate with a mesial occlusal surface of the patient's tooth. In some embodiments the reduced contact surface may not include any contact surfaces shaped to mate with the interproximal surfaces of a patient's tooth.

Figure 32:
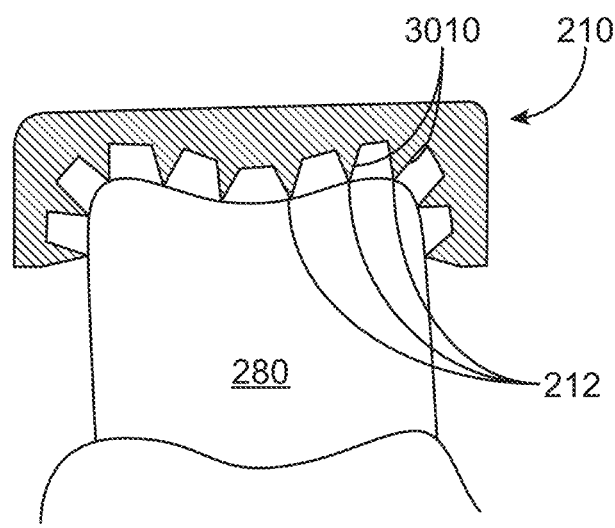
FIG. 32 shows registration elements with reduced contact surfaces, in accordance with some embodiments.

In some embodiments, a reduced contact surface 212 may include a combination of the embodiment shown in FIG. 31 and FIG. 32 wherein the reduced contact surface includes a plurality of contact surfaces shaped to mate with an occlusal surface of the patient's tooth, such as in central locations, mesial locations, distal locations, buccal locations, and lingual locations of the occlusal surface. In some embodiments the reduced contact surface may also include a plurality of contact surfaces shaped to mate with buccal and lingual surfaces of the patient's teeth including mesial and distal locations in central locations of the buccal and lingual surfaces of the patient's teeth. In some embodiments, there may be no contact surfaces shaped to mate with interproximal surfaces of the patient's teeth.

FIG. 32 depicts an embodiment of the reduced contact surface 212 wherein the contact members 3010 have a variable cross-section. In some embodiments, a base of the contact members 3010 have a cross-sectional area that is greater than a distal end or tooth contacting end of the contact members 3010. In some embodiments, the tooth contacting end of the contact members 3010 has a size that corresponds to the minimum feature size of the fabrication process while the base has a cross-sectional area that is at least five times the cross-sectional area of the tooth contacting end of the contact member 3010. In some embodiments the base has a cross-sectional area that is between 2 and 10 times cross-sectional area of the tooth contacting surface of the contact member 3010. In some embodiments, the base has a cross-sectional area that is less than five times the cross-sectional area of the tooth contacting end of the contact member 3010. The cross-sectional areas discussed herein may be taken perpendicular to a proximal-distal axis of the feature or elements. In some embodiments, the cross-sectional areas discussed herein may be taken perpendicular to a longest dimension of the feature or element.

Figure 33:
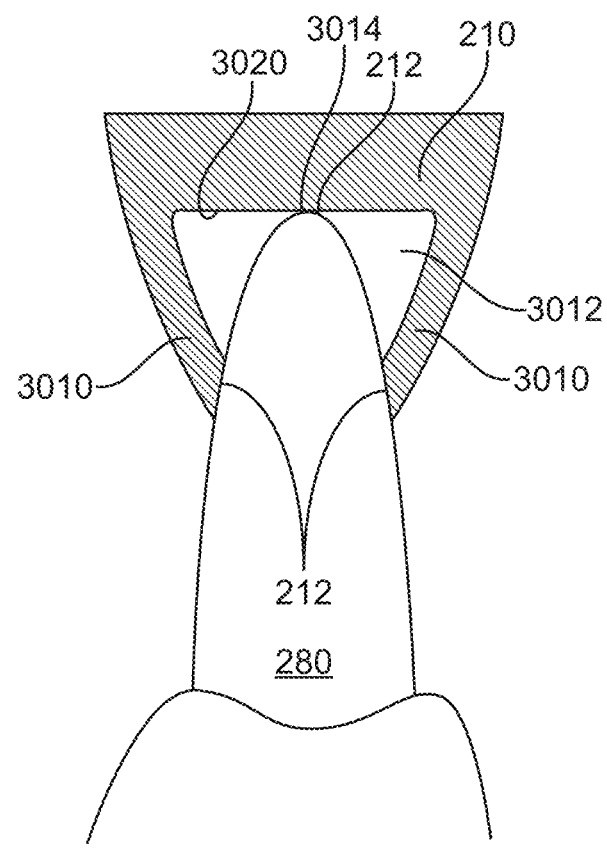
FIG. 33 shows registration elements with reduced contact surfaces, in accordance with some embodiments.

FIG. 33 depicts a buccal-lingual cross section of a tooth 280, which may be an incisal tooth, and a reduced contact surface 212 of a registration element 210. The reduced contact surface is formed by a plurality of contact members 3010 that extend from the registration element 210 the distal ends of the contact members 3010 form the reduced contact surface 212. In some embodiments, the reduced contact surface 212 may also include a contact surface 3014 that is not located at a distal end of the contact member 3010. For example, registration element 210 may comprise a substantially planar tooth facing surface 3020 that includes a portion 3014 shaped to match or contact the incisal edge of the patient's tooth 280. The registration element 210 may also include a plurality of contact members 3010 that extend from the substantially planar surface 3020 towards the buccal and lingual surfaces of the patient's incisor. Each of the distal ends of the plurality of contact members 3010 has a surface that corresponds to the shape of the tooth at the contact location. A clearance portion 3012 extends between each of the contact members 3010 and a contact location 3014 shaped to contact the incisal surface of the patient's incisor 280. The clearance portion is shaped such that it is set back from the expected location of the surface of the teeth and provides a cavity in which excess resin or other uncured fabrication material may pool while keeping the uncured fabrication material away from the contact locations of the reduced surface 212. In this way, excess or uncured fabrication material may not affect the location of the contact surfaces 212.

In some embodiments, removal of the attachment placement device 200 from the attachment after the attachment is affixed to the patient's tooth may be unpredictable. Dentist may pry or pull the attachment placement device 200 from the attachment in many ways causing unpredictable fracturing of the attachment frame 260 and the frangible portions 232 extend from the attachment frame to the attachment 110. In order provide for more predictable removal of the attachment placement device 200 from the attachment 110, stress concentrators 3500) may be formed in the attachment frame 260). The stress concentrators 3500) concentrate the removal forces applied by the dentist to the attachment placement device 200 and the attachment frame 260 and encourage fracturing of the attachment frame 260) at the locations of the stress concentrators 3500.

Figure 34:
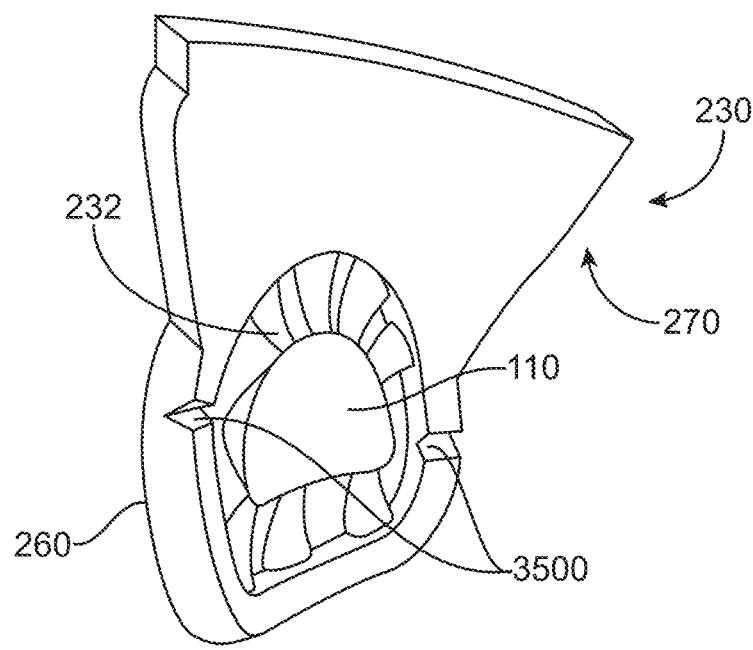
FIG. 34 shows an attachment frame with stress concentrators, according to some embodiments.

FIG. 34 depicts an attachment frame 260 having stress concentrators 3500) formed in the attachment frame 260. As shown, the stress concentrators 3500 may be oriented in a mesial distal direction on the attachment frame 3500. The stress concentrators may be notches or other weakened locations formed within the attachment frame 260. In some embodiments the notches may extend approximately one third of the distance through the width of the attachment frame 260. In some embodiments the notches may extend less than one third of the distance through the width of the attachment frame 260. In some embodiments, the notches may extend between one third and two thirds of the distance through the width of the attachment frame 260).

The location of the stress concentrators 3500 may vary based on the tooth to which they correspond. For example, for attachment frames on anterior teeth such as the central and lateral incisors, the stress concentrators 3500 may be located on mesial and distal portions of the attachment frame 260 and may also be located along a mesial distal axis of the attachment when the attachment frame is on an anterior tooth. In some embodiments, the location of the stress concentrators may change from mesial distal locations towards gingival and distal locations as the teeth become more posterior. For example, the posterior tooth such as a molar may include a first stress concentrator at a gingival portion of the attachment frame and a second stress concentrator at an occlusal portion of a distal side of the attachment frame 260. The location of the stress concentrators may be determined based on an expected location of the prying force used to remove the attachment placement device from the patient's teeth. For example, when the dentist is expected to pull or twist the attachment device 260 about a mesial distal axis, as may be the case for an anterior tooth, then the stress concentrators 3500 may be located along the mesial distal axis. However, when the dentist is expected to pry about a more occlusal gingival axis, as may be the case for a posterior tooth, then the stress concentrators 3500 may be located along an occlusal-gingival axis. In some embodiments, such as for the posterior teeth, a stress concentrator 3500 may be located at a most occlusal location of the attachment frame 260 at a distal end of the frame, for example at a location where the attachment frame 260 joins with the belt 270.

Figure 35:
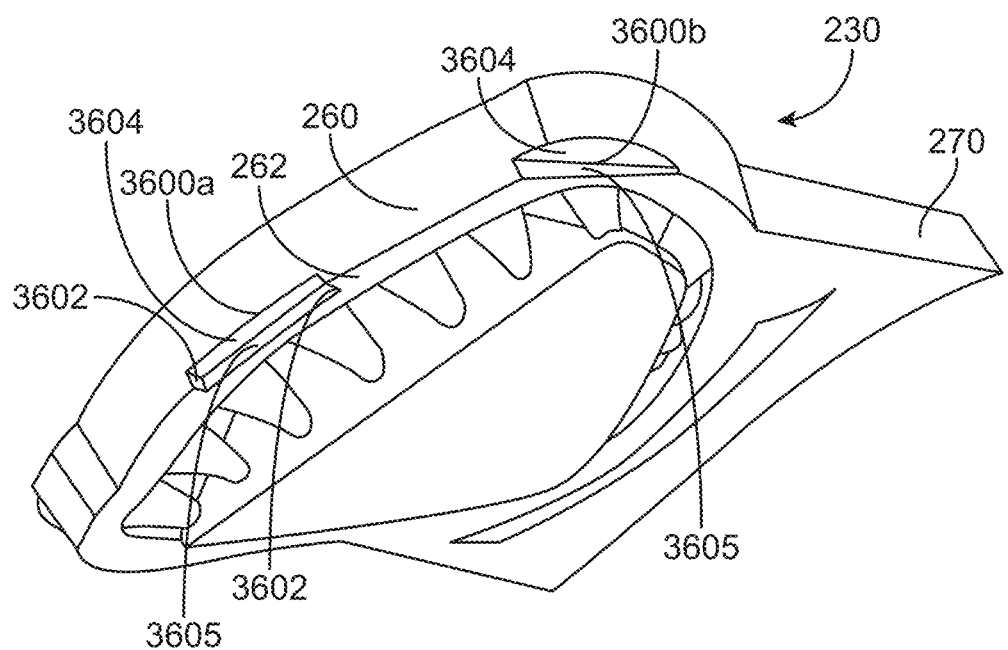
FIG. 35 shows an attachment frame with tool notches, in accordance with some embodiments.

Dentists often use tools in order to apply a removal force to the attachment frame 260). In order to promote easier and more predictable fracturing and removal of the attachment frame 260 from the attachment 110, notches may be formed at the tooth facing surface 262 of the attachment frame 260. FIG. 35 depicts an attachment frame 260 having two such notches 3600. A first notch 3600a may be located along a gingival facing portion of the attachment frame 260. The notch 3600a may be formed by two side surfaces 3602, an upper surface 3604, and a back surface 3605. The notch may have a width in a mesial distal direction that is greater than the width of the tool used with the notch. The height of the notch, which extends from the tooth contacting surface 262 to the upper surface 3604 may be less than half the thickness of the frame 260. In some embodiments, the notch may be less than 25% of the thickness of the attachment frame 260.

In some embodiments the attachment frame may include a notch 3600b along a mesial distal end of the attachment frame 260. In some embodiments a notch may be defined by a back surface 3605 and an upper surface 3604 and may not have side surfaces 3602.

In some embodiments, the stress concentrators 3500, may be located along an axis that is parallel to the width of the notch 3600. For example, the stress concentrators 3500 depicted in FIG. 34 may be form a line that is parallel to or substantially parallel to a line formed between the side surfaces 3602 of the notch 3600a or the back surface.

Because the notches 3600 are located on a tooth facing surface of the attachment frame 260, they may be difficult for a dentist to see. Tactile and other feedback structures may be added to the attachment frame in order to aid in locating the notches.

Figure 36:
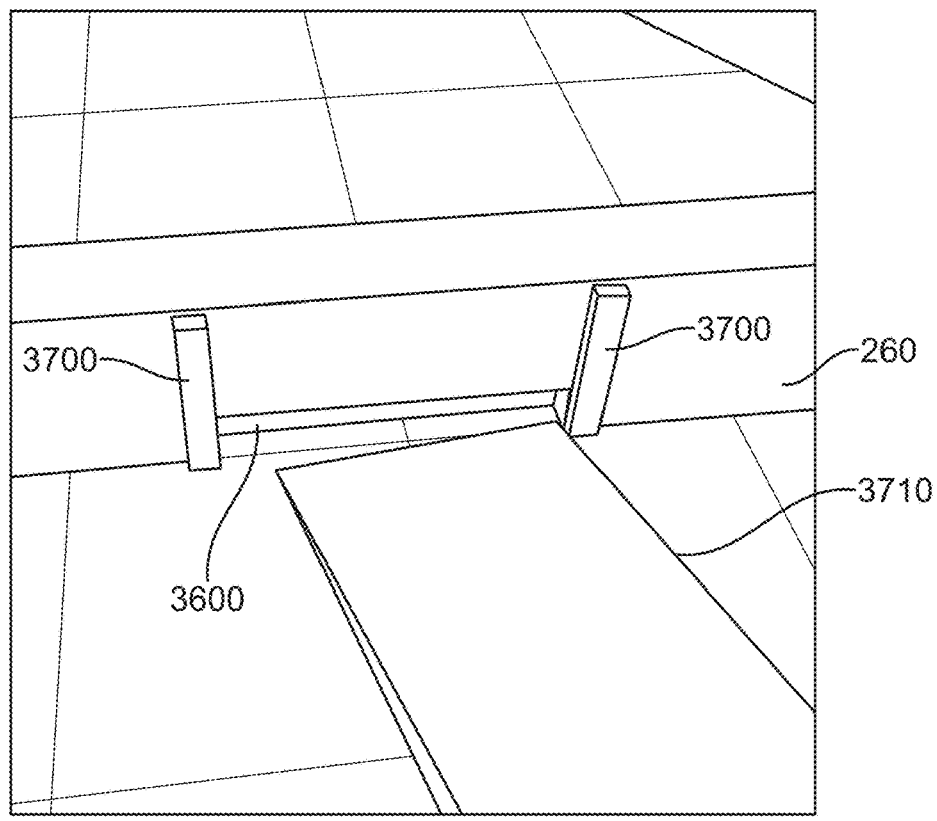
FIG. 36 shows an attachment frame with a tool notch feedback elements, in accordance with some embodiments.

FIG. 36 depicts feedback devices 3700 that provide both tactile and visual indication of the location of the notch

3600. During use, a dentist may slide their tool 3710 along the surface of the frame 260 until they feel the tactile feedback structures 3700 the which point the dentist will know that they have the location of a notch 3600. In some embodiments, the feedback structures 3700 may be colored with a different color than the frame 260 in order to provide visual feedback as to the location of the notch. In some embodiments the feedback structures 3700) may protrude from the surface of the attachment frame 260 at least 0.5 mm in order to provide tactile feedback as to the location of the notch 3600. In some embodiments, the feedback structures 3700 they extend from a tooth facing surface of the attachment frame 2602 a surface opposite the tooth facing surface of the attachment frame 260.

Figure 37:
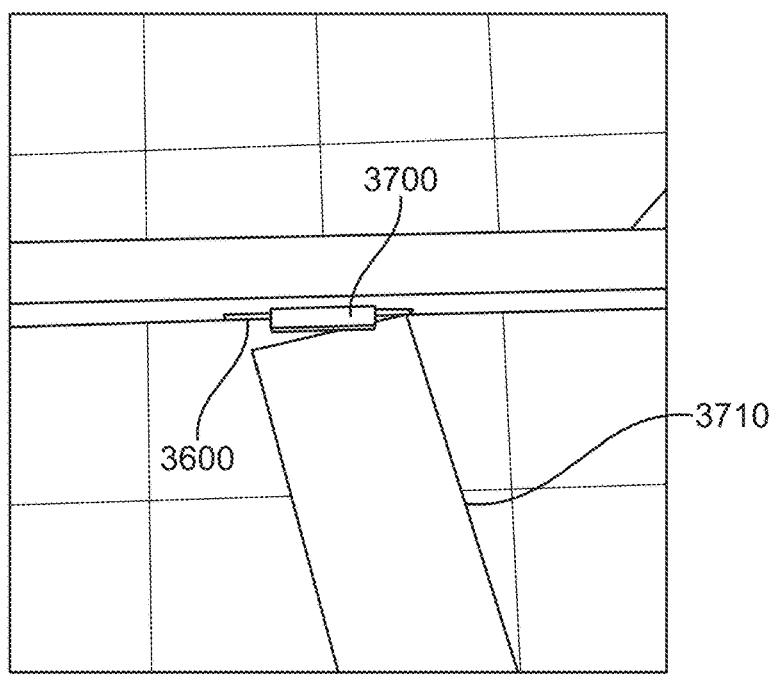
FIG. 37 shows an attachment frame with a tool notch feedback elements, in accordance with some embodiments.

FIG. 37 depicts a feedback structure 3700) that extends from the attachment frame 260 in a location above the notch 3600. In some embodiments feedback structures protrude from the surface of the attachment frame 260 at least 0.5 mm. In some embodiments the feedback structure may protrude from the surface of the attachment frame 260 at least 1.0 mm. In some embodiments, the feedback structure 3700 may have a color different color than the attachment frame 260 in order to provide additional visual feedback as to the location of the notch 3600.

Figure 38A:
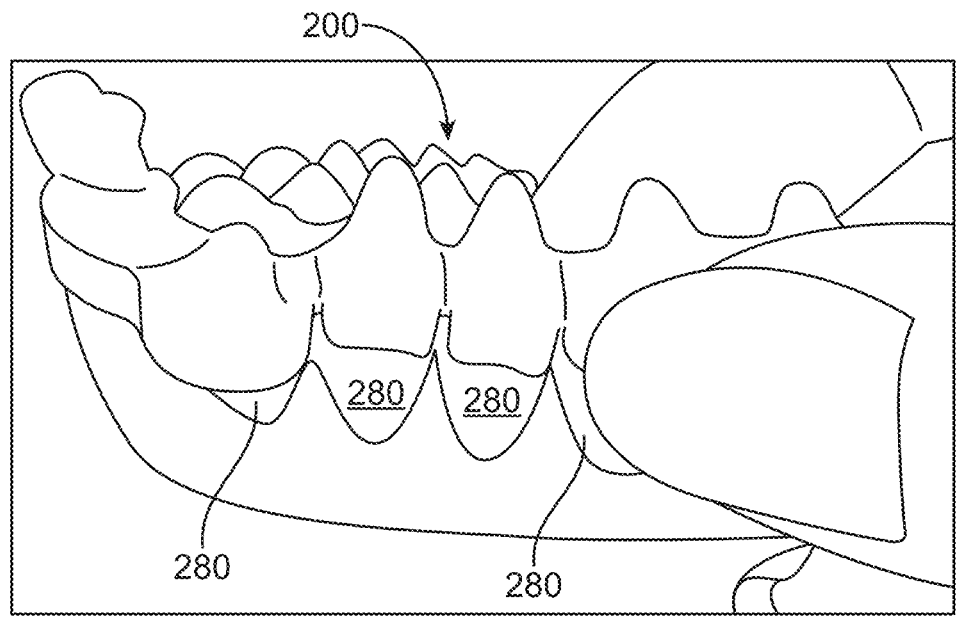
FIGS. 38A and 38B steps in removing an attachment placement device, in accordance with some embodiments.
Figure 38B:
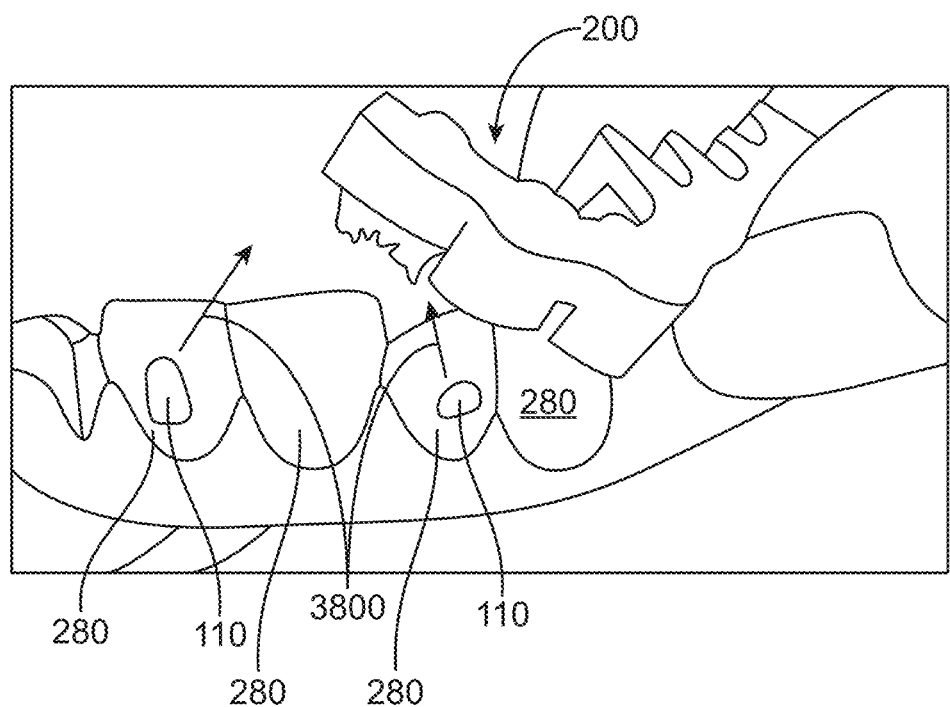
Figure 39:
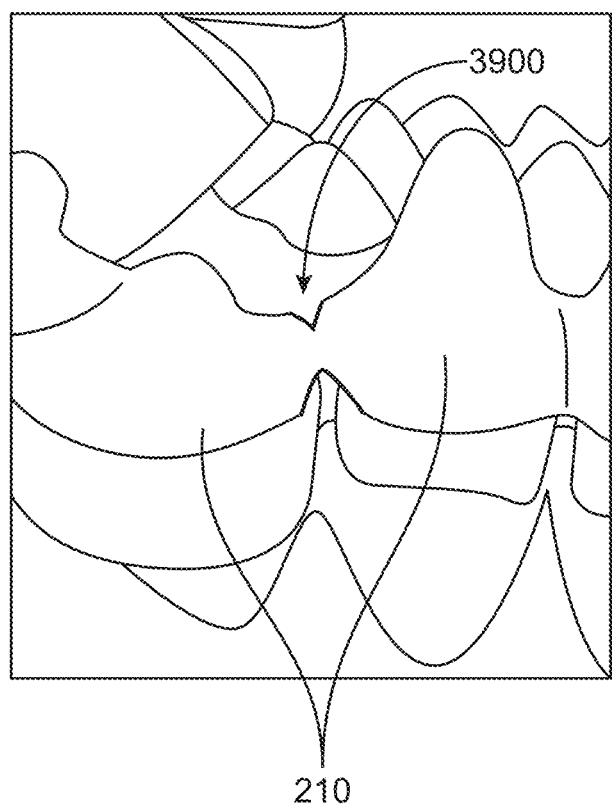
FIG. 39 shows a flexible portion of an attachment placement device, in accordance with some embodiments.

FIGS. 38A and 38B show the removal of an attachment placement device 200. In some embodiments the dentist may grasp the attachment placement device 200, for example, with their fingers, near the posterior teeth and rotate the attachment placement device 200 about a mesial distal axis of the anterior teeth. This may cause the posterior portion of the attachment placement device 200 to be pulled away from the attachments 110 on the anterior teeth in a substantially occlusal direction as indicated by arrows 3800. Such rotation places tensile forces on the extensions 232 that attach the attachment to the debtor frame 260. Such tensile forces may lead to unpredictable fracturing of the extensions 232 as compared to the pending loads applied to the extensions 232 of posterior teeth during removal process.

A flexible or weakened structure 3900, such as a coupling 220 discussed herein may be formed between the registration elements 210 of the posterior teeth and anterior teeth. For example, such a structure 3900 may be located between the canine and the first bicuspid for between the canine and the adjacent lateral incisor. The flexible or weakened structure 3900 may be as described herein with respect to the couplings 220.

By adding a flexible or weakened structure 3900, the posterior teeth may be removed with a bending movement along a mesial distal direction of the posterior teeth without inducing tension in the extensions 232 of the anterior teeth. Then, the anterior portion of the attachment placement device may be removed with a bending movement along a mesial distal direction of the anterior teeth.

Figure 40:
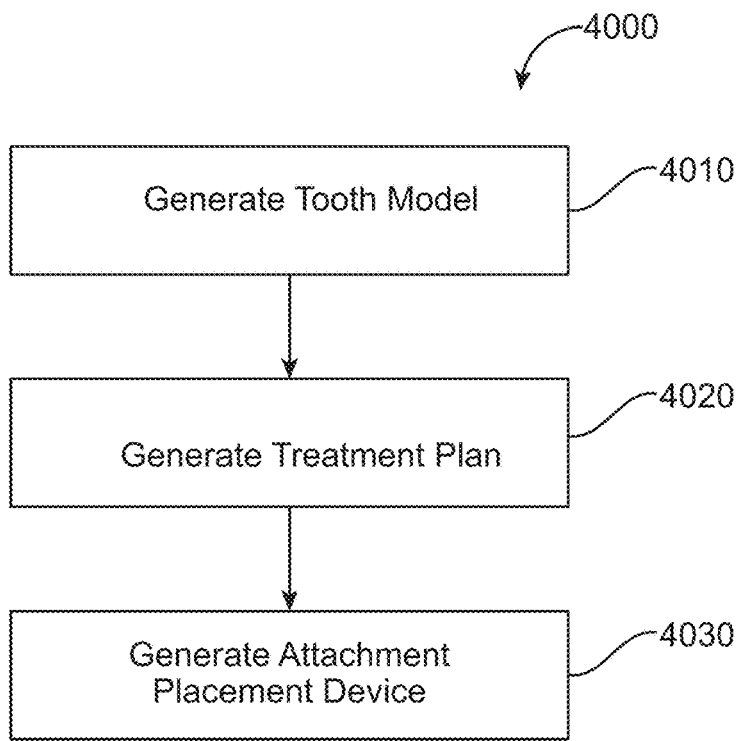
FIG. 40 shows a method for use in fabricating an attachment placement device, in accordance with some embodiments.

FIG. 40 depicts a method 4000 for designing and fabricating a attachment placement device 200. At block 4010 a tooth model of the patient's dentition is generated. The tooth model may be a three-dimensional surface model of the patient's dentition including the surface shapes of the tooth crowns and the surface shape of the patient's gingiva.

At block 4020 a treatment plan is generated for treating the patient's dentition for example for treating a patient's malocclusion. The treatment plan may comprise a series of stages that incrementally move the patient's teeth from an initial position, such as that depicted in the to scan, towards a final position. During treatment, the teeth of the patient are moved in the incremental stages of the treatment plan. The teeth are moved using a series of orthodontic appliances that apply movement forces to the patient's teeth in order to move the patient's teeth according to the treatment plan. In some embodiments attachments may be used in order to apply a movement force to the patient's teeth. As part of the treatment plan the location, size, orientation, size and shape of the attachments on the patient's teeth is determined.

At block 4030 in attachment placement device is generated. The attachment placement device may be generated as a three-dimensional digital model of any of the attachment placement devices 200 discussed herein and may include any of the features discussed herein. The attachment placement device may include a registration elements having a inner surface shaped to match a surface, such as an occlusal surface of the patient's teeth. The attachment placement device may also be generated to include the attachment frame and attachment as discussed herein. In some embodiments, after generating the attachment placement device 200, instructions for fabricating the attachment placement device may be output for example from a computer system as described herein. In some embodiments, the attachment placement device is directly fabricated, such as through an additive manufacturing process. As discussed herein, the attachment placement device may be fabricated as a unitary structure. In some embodiments, the features of the attachment placement device may be fabricated simultaneously, as discussed herein.

Figure 41:
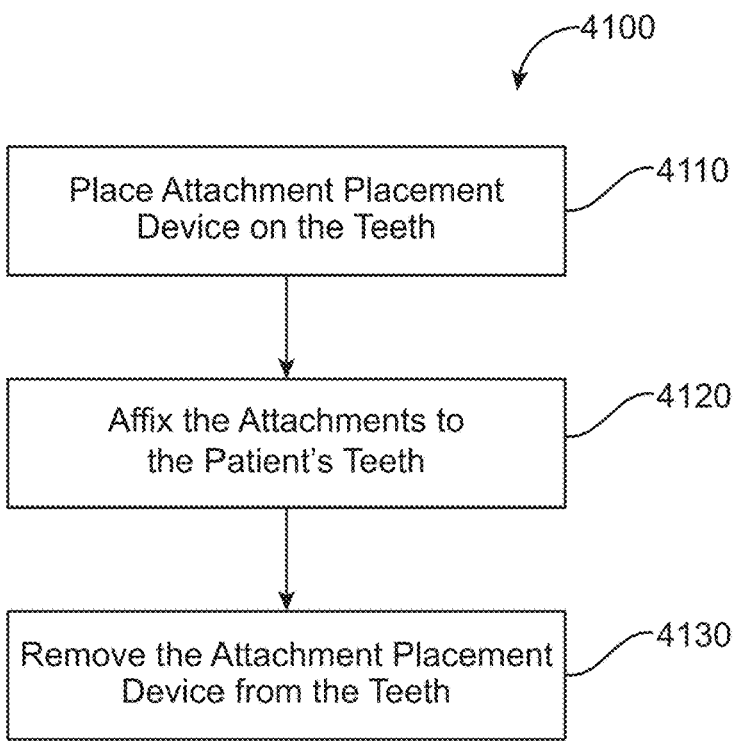
FIG. 41 shows a method for using an attachment placement device, in accordance with some embodiments.

FIG. 41 depicts a method 4100 of using an attachment placement device. At block 4110 the attachment placement device is placed on the patient's teeth. For example, the registration surfaces such as the inner surfaces 212 of the registration elements 210 may be placed on the patient's teeth in order to align the attachments in their proper location on the patient's teeth. In some embodiments the, registration element 210 and the retention elements 250 along with the inner surfaces 212 may work together to locate the attachment placement device in the proper location on the patient's dentition and hold the attachment placement device in the appropriate location.

At block 4120 the attachments 110 held on the attachment placement device 200 may be affixed to the patient's teeth as discussed herein or as known in the art.

At block 4130 attachment placement device 200 is removed from the teeth. In some embodiments removing the attachment placement device 200 from the teeth may include using a tool such as a pry tool to pry a gingival portion of the attachment frame 260 away from the patient's teeth and causing fracturing of the elements 232 that hold the attachment 110 to the frame 260 and also fracturing the attachment frame 260 at the location of the stress concentrators 3500. After removing the gingival portion of the attachment frames 260 of the attachment placement device 200, the anterior or posterior portion of the attachment placement device 200 may be rotated about a mesial distal axis of the anterior or posterior portion of the attachment placement device 200. After separation of one of the anterior or posterior portion of the attachment placement device from the attachments 110, the other of the anterior or posterior portion of the attachment placement device is rotated along a mesial distal axis of the other of the anterior of posterior portion of the attachment placement device to separate the attachment placement device from the attachments.

In some embodiments, and attachment placement device 200 may be formed to place attachments along one of four quadrants of the patient's dentition. The four quadrants may be the upper left quadrant, the lower left quadrant, the upper right quadrant, and the lower right quadrant of the patient's arches. In some embodiments after blocks 4110, 4120, and 4130 have been performed for a first of the quadrants the actions of the blocks may be repeated for each of the other three quadrants.

Figure 42:
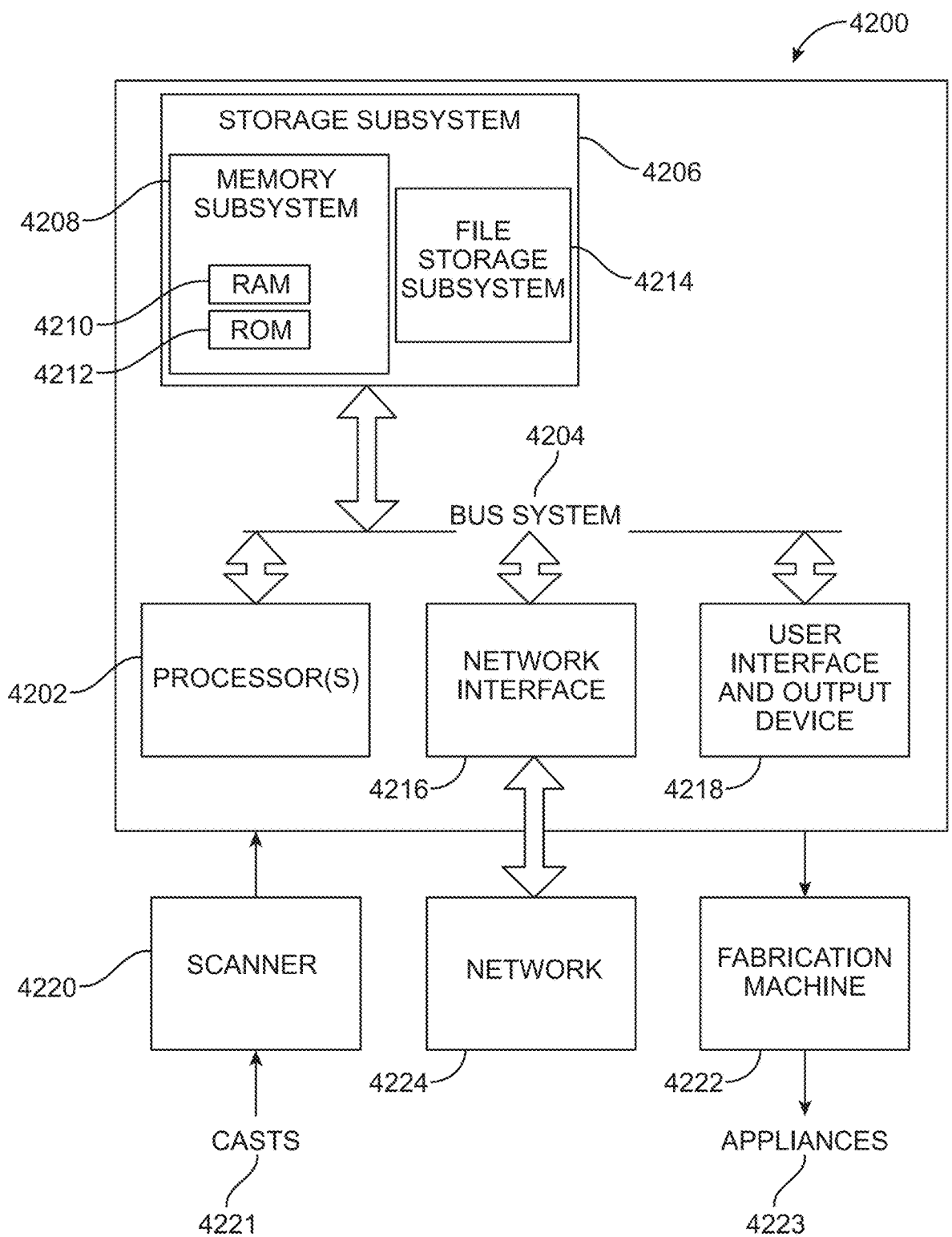
FIG. 42 shows a simplified block diagram of a data processing system, in accordance with embodiments.

FIG. 42 is a simplified block diagram of a data processing system 4200 that may be used in executing methods and processes described herein. The data processing system 4200 typically includes at least one processor 4202 that communicates with one or more peripheral devices via bus subsystem 4204. These peripheral devices typically include a storage subsystem 4206 (memory subsystem 4208 and file storage subsystem 4214), a set of user interface input and output devices 4218, and an interface to outside networks 4216. This interface is shown schematically as "Network Interface" block 4216, and is coupled to corresponding interface devices in other data processing systems via communication network interface 4224. Data processing system 4200 can include, for example, one or more computers, such as a personal computer, workstation, mainframe, laptop, and the like.

The user interface input devices 4218 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 4206 maintains the basic required programming, including computer readable media having instructions (e.g., operating instructions, etc.), and data constructs. The program modules discussed herein are typically stored in storage subsystem 4206. Storage subsystem 4206 typically includes memory subsystem 4208 and file storage subsystem 4214. Memory subsystem 4208 typically includes a number of memories (e.g., RAM 4210, ROM 4212, etc.) including computer readable memory for storage of fixed instructions, instructions and data during program execution, basic input/output system, etc. File storage subsystem 4214 provides persistent (non-volatile) storage for program and data files, and can include one or more removable or fixed drives or media, hard disk, floppy disk, CD-ROM, DVD, optical drives, and the like. One or more of the storage systems, drives, etc. may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 4220 includes any means for obtaining a digital representation (e.g., images, surface topography data, etc.) of a patient's teeth (e.g., by scanning physical models of the teeth such as casts 4221, by scanning impressions taken of the teeth, or by directly scanning the intraoral cavity), which can be obtained either from the patient or from treating professional, such as an orthodontist, and includes means of providing the digital representation to data processing system 4200 for further processing. Scanner 4220 may be located at a location remote with respect to other components of the system and can communicate image data and/or information to data processing system 4200, for example, via a network interface 4224. Fabrication system 4222 fabricates appliances 4223 based on a treatment plan, including data set information received from data processing system 4200. Fabrication machine 4222 can, for example, be located at a remote location and receive data set information from data processing system 4200 via network interface 4224.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

The present disclosure includes the following numbered clauses.

Clause 1. An orthodontic device, comprising: a plurality of registration elements, individual ones of the plurality of registration elements comprising a retention support for holding the registration element to one or more teeth of a patient: an attachment support extending from one or more of the plurality of registration elements, the attachment support releasably coupled to one or more of an attachment or an attachment mold; and a coupling between adjacent registration elements, the coupling allowing for articulation between the adjacent registration elements.

Clause 2. The orthodontic device of clause 1, wherein the coupling comprises one or more of a spring, a resilient member, a joint, a ball joint, or a heim joint.

Clause 3. The orthodontic device of clause 1, wherein each of the plurality of registration elements comprises a tooth registration surface, the tooth registration surface comprising a recess sized and shaped to receive a corresponding tooth.

Clause 4. The orthodontic device of clause 3, wherein the tooth registration surface comprises a tooth mating surface, the tooth mating surface shaped to approximate the contour of the tooth.

Clause 5. The orthodontic device of clause 4, wherein the tooth mating surface of each of the plurality of registration elements is sized and shaped to fix an orientation and a translational position of said each of the plurality of registration elements on a respective tooth.

Clause 6. The orthodontic device of clause 1, wherein the orthodontic device has been fabricated by 3D printing.

Clause 7. The orthodontic device of clause 6, wherein each of the plurality of registration elements and the coupling between adjacent registration elements comprise a corresponding layer of 3D printed material.

Clause 8. The orthodontic device of clause 1, further comprising a first registration element.

Clause 9. The orthodontic device of clause 8, further comprising at least a first registration element, a second registration element, and a third registration element.

Clause 10. The orthodontic device of clause 9, further comprising a first coupling between the first and second registration element and a second coupling between the second and third registration element.

Clause 11. The orthodontic device of clause 10, wherein each of the first registration element, the second registration element and the third registration element comprises a corresponding layer of a 3D printed material, and wherein the corresponding layer of the second registration element is configured to move in relation to corresponding layers of the first registration element and the third registration element.

Clause 12. The orthodontic device of clause 10, wherein the first coupling and the second coupling are configured to allow the second registration element to move with 3 translational degrees of freedom and 3 rotational degrees of freedom in relation to the first registration element and the third registration element, in order to allow a registration surface of the second retention element to move into rotational and translational alignment with an occlusal surface of a second tooth.

Clause 13. The orthodontic device of clause 9, wherein the first retention element comprises a first registration surface sized and shaped to fit a first occlusal surface of a first tooth and wherein the second registration element comprises a second registration surface sized and shaped to fit a second occlusal surface of a second tooth and wherein the third registration element comprises a third registration surface sized and shaped to fit a third occlusal surface of a third tooth.

Clause 14. The orthodontic device of clause 13, further comprising a plurality of couplings between the plurality of registration elements to allow the first registration element, the second registration element and the third registration element to move independently into corresponding registration positions on the first tooth, the second tooth and the third tooth, respectively.

Clause 15. The orthodontic device of clause 9, wherein the number of couplings is 1 less than the number of registration elements.

Clause 16. The orthodontic device of clause 1, further comprising an attachment releasably carried by the attachment support.

Clause 17. The orthodontic device of clause 16, wherein the attachment is configured to break away from the attachment support.

Clause 18. The orthodontic device of clause 1, further comprising an attachment mold releasably carried by the attachment support, the attachment mold shaped to receive an attachment material.

Clause 19. The orthodontic device of clause 18, further comprising a well surrounding at least a portion of the attachment mold and configured to collect excess attachment material.

Clause 20. The orthodontic device of clause 19, wherein the attachment well comprises a rim configured for surface contact with a tooth, and wherein the rim defines an edge of the attachment and separates the attachment from the excess attachment material in the well to facilitate removal of the excess attachment material.

Clause 21. The orthodontic device of clause 1, wherein the coupling is a ball and socket coupling and comprises supports between the ball and the socket.

Clause 22. The orthodontic device of clause 10, wherein the first and second couplings each include a ball extending from a shaft at a first side of the respective coupling and a socket and aperture formed in a second side of the respective coupling, wherein the ball of the first coupling is captured within the socked of the second coupling.

Clause 23. The orthodontic device of clause 22, wherein a diameter of the ball of the first coupling is larger than a diameter of the aperture of the second coupling.

Clause 24. The orthodontic device of clause 23, wherein the first and second couplings are fabricated together with the ball of the first coupling captured within the socket of the second coupling.

Clause 25. The orthodontic device of clause 22, wherein the first and second couplings are coupled together to allow rotation and translation of the couplings relative to each other.

Clause 26. The orthodontic device of clause 1, wherein the coupling a living hinge extending between adjacent registration elements.

Clause 27. The orthodontic device of clause 1, wherein the coupling is a frangible coupling extending between adjacent registration elements.

Clause 28. The orthodontic device of clause 1, wherein the first registration element comprises a first accommodating registration surface sized and shaped to fit a first occlusal surface of a first tooth.

Clause 29. The orthodontic device of clause 28, wherein the first accommodating registration surface accommodates changes in the location and shape of the first occlusal surface of the first tooth.

Clause 30. The orthodontic device of clause 28, wherein the first accommodating registration surface comprises a structure of intersecting members.

Clause 31. The orthodontic device of clause 30, wherein a first of the intersecting members extends radially from a central location of the registration surface to a perimeter of the registration surface and as second of the intersecting members extend annularly about the central location and wherein the first of the intersecting members intersect with the second of the intersecting members.

Clause 32. The orthodontic device of clause 1, wherein the first registration element comprises a first registration surface sized and shaped to fit a first occlusal surface of a first tooth.

Clause 33. The orthodontic device of clause 32, wherein the registration surface is a reduced registration surface comprising a plurality of extension elements that extend from the registration elements and comprise a contact surface shaped to match the surface shame of the first tooth.

Clause 34. The orthodontic device of clause 33, wherein the extension members contact occlusal surfaces of the first tooth.

Clause 35. The orthodontic device of clause 33, wherein the extension members contact buccal and lingual surfaces of the first tooth.

Clause 36. The orthodontic device of clause 33, wherein the extension members do not contact interproximal surfaces of the first tooth.

Clause 37. The orthodontic device of clause 33, wherein the extension members have a variable cross-section with a greater cross section area at a location proximal the registration member and a smaller cross sectional area at a location distal of the registration member.

Clause 38. An orthodontic device, comprising: a registration element; and a first flexible arm extending from the registration element on a lingual side, the first flexible arm having a connected end and a distal end, the distal end configured to extend at least part way over the tooth and apply a lingual force to bias the registration element against the tooth.

Clause 39. The orthodontic device of clause 38, further comprising an attachment support on a buccal side of the orthodontic device and an attachment releasably carried by the attachment support.

Clause 40. The orthodontic device of clause 39, wherein the distal end and the attachment support define a distance there between.

Clause 41. The orthodontic device of clause 40, wherein at least one of the first flexible arm and the attachment support are resilient and configured to deflect in order to vary the distance.

Clause 42. The orthodontic device of clause 41, wherein the resiliency of at least one of the first flexible arm and the attachment support create a force to maintain the orthodontic device in place on teeth of a patient.

Clause 43. The orthodontic device of clause 39, wherein the registration element is configured to place the attachment in a location for bonding a tooth when placed on the tooth.

Clause 44. The orthodontic device of clause 43, wherein the registration element comprises a registration surface sized and shaped to fit on an occlusal surface of the tooth at a predetermined location and orientation and wherein the first flexible arm extending from the registration element is located on the registration element and sized and shaped to urge the registration surface toward the occlusal surface to retain the retention element on the tooth.

Clause 45. The orthodontic device of clause 43, wherein the installed registration element is self-retentive.

Clause 46. The orthodontic device of clause 39, wherein the registration element is formed by 3D printing.

Clause 47. The orthodontic device of clause 38, wherein the distal end of the flexible arm engages an undercut portion of a tooth.

Clause 48. The orthodontic device of clause 38, wherein the distal end is convex shaped.

Clause 49. The orthodontic device of clause 38, wherein the distal end of the flexible arm has a contact area shaped to match the surface of a tooth.

Clause 50. The orthodontic device of clause 38, wherein the distal end of the flexible arm is configured to contact a single tooth.

Clause 51. The orthodontic device of clause 38, wherein the distal end of the flexible arm has a contact area shaped to match an interproximal region between adjacent teeth in the mouth of a patient.

Clause 52. The orthodontic device of clause 38, wherein the first flexible arm comprises a proximal segment that extends away from the registration element, a distal segment that extends toward the registration element, and an elbow joining the proximal segment and distal segment.

Clause 53. The orthodontic device of clause 52, wherein the proximal segment, distal segment, and elbow are integrally formed of a resilient material.

Clause 54. The orthodontic device of clause 38, further comprising a plurality of registration elements connected together by a plurality of couplings.

Clause 55. The orthodontic device of clause 54, wherein the plurality of registration elements and the plurality of couplings are formed integrally by 3D printing.

Clause 56. The orthodontic device of clause 54, wherein the coupling comprises one or more of a spring, a resilient member, or a joint.

Clause 57. The orthodontic device of clause 54, wherein the plurality of couplings allows relative movement between adjacent registration elements.

Clause 58. The orthodontic device of clause 38, further comprising a second flexible arm extending from the registration element on a lingual side, the second flexible arm having a connected end and a distal end, the distal end configured to extend at least part way over the tooth and apply a lingual force to bias the registration element against the tooth.

Clause 59. The orthodontic device of clause 58, wherein the first flexible arm and the second flexible arm are parallel to each other.

Clause 60. The orthodontic device of clause 58, wherein the first flexible arm and the second flexible arm extend from the registration element at an angle of between 5 degrees and 30 degrees to each other.

Clause 61. The orthodontic device of clause 38, wherein the first registration element comprises a first accommodating registration surface sized and shaped to fit a first occlusal surface of a first tooth.

Clause 62. The orthodontic device of clause 61, wherein the first accommodating registration surface accommodates changes in the location and shape of the first occlusal surface of the first tooth.

Clause 63. The orthodontic device of clause 61, wherein the first accommodating registration surface comprises a structure of intersecting members.

Clause 64. The orthodontic device of clause 63, wherein a first of the intersecting members extends radially from a central location of the registration surface to a perimeter of the registration surface and as second of the intersecting members extend annularly about the central location and wherein the first of the intersecting members intersect with the second of the intersecting members.

Clause 65. The orthodontic device of clause 38, wherein the first registration element comprises a first registration surface sized and shaped to fit a first occlusal surface of a first tooth.

Clause 66. The orthodontic device of clause 61, wherein the registration surface is a reduce registration surface comprising a plurality of extension elements that extend from the registration elements and comprise a contact surface shaped to match the surface shame of the first tooth.

Clause 67. The orthodontic device of clause 66, wherein the extension members contact occlusal surfaces of the first tooth.

Clause 68. The orthodontic device of clause 66, wherein the extension members contact buccal and lingual surfaces of the first tooth.

Clause 69. The orthodontic device of clause 66, wherein the extension members do not contact interproximal surfaces of the first tooth.

Clause 70. The orthodontic device of clause 66, wherein the extension members have a variable cross-section with a greater cross section area at a location proximal the registration member and a smaller cross sectional area at a location distal of the registration member.

Clause 71. A dental attachment placement device, comprising: a template having one or more tooth receiving cavities and one or more attachment molds, the one or more attachment molds defining a recess for receiving attachment material; and a well surrounding at least a portion of the one or more attachment mold, wherein the well is configured to collect additional attachment material in excess of a volume of the recess.

Clause 72. A method, the method comprising using the device of any one of the preceding clauses.

Clause 73. An orthodontic device, comprising: a plurality of registration elements, individual ones of the plurality of registration elements comprising a retention support for holding the registration element to one or more teeth of a patient: an attachment support extending from one or more of the plurality of registration elements, the attachment support releasably coupled to one or more of an attachment or an attachment mold: a base; and a plurality of couplings that couple the registration elements to the base, the coupling allowing for articulation between the adjacent registration elements.

Clause 74. The orthodontic device of clause 73, wherein the coupling comprises one or more of a spring, a resilient member, a joint, a ball joint, or a heim joint.

Clause 75. The orthodontic device of clause 73, wherein each of the plurality of registration elements comprises a tooth registration surface, the tooth registration surface comprising a recess sized and shaped to receive a corresponding tooth.

Clause 76. The orthodontic device of clause 75, wherein the tooth registration surface comprises a tooth mating surface, the tooth mating surface shaped to approximate the contour of the tooth.

Clause 77. The orthodontic device of clause 76, wherein the tooth mating surface of each of the plurality of registration elements is sized and shaped to fix an orientation and a translational position of said each of the plurality of registration elements on a respective tooth.

Clause 78. The orthodontic device of clause 73, wherein the orthodontic device has been fabricated by 3D printing.

Clause 79. The orthodontic device of clause 73, further comprising a first registration element.

Clause 80. The orthodontic device of clause 79, further comprising at least a first registration element, a second registration element, and a third registration element.

Clause 81. The orthodontic device of clause 80, further comprising a first coupling between the first and the base and a second coupling between the second registration element and the base.

Clause 82. The orthodontic device of clause 81, wherein each of the first registration element and the second registration element comprises a corresponding layer of a 3D printed material, and wherein the corresponding layer of the second registration element is configured to move in relation to corresponding layers of the first registration element and the base.

Clause 83. The orthodontic device of clause 81, wherein the first coupling and the second coupling are configured to allow the second registration element to move with 3 translational degrees of freedom and 3 rotational degrees of freedom in relation to the first registration element and the base, in order to allow a registration surface of the second retention element to move into rotational and translational alignment with an occlusal surface of a second tooth.

Clause 84. The orthodontic device of clause 80, wherein the first retention element comprises a first registration surface sized and shaped to fit a first occlusal surface of a first tooth and wherein the second registration element comprises a second registration surface sized and shaped to fit a second occlusal surface of a second tooth.

Clause 85. The orthodontic device of clause 73, further comprising an attachment releasably carried by the attachment support.

Clause 86. The orthodontic device of clause 85, wherein the attachment is configured to break away from the attachment support.

Clause 87. The orthodontic device of clause 73, further comprising an attachment mold releasably carried by the attachment support, the attachment mold shaped to receive an attachment material.

Clause 88. The orthodontic device of clause 87, further comprising a well surrounding at least a portion of the attachment mold and configured to collect excess attachment material.

Clause 89. The orthodontic device of clause 88, wherein the attachment well comprises a rim configured for surface contact with a tooth, and wherein the rim defines an edge of the attachment and separates the attachment from the excess attachment material in the well to facilitate removal of the excess attachment material.

Clause 90. The orthodontic device of clause 73, wherein the coupling is a captured head and socket coupling.

Clause 91. The orthodontic device of clause 90, wherein the captured head extends from the registration element and the socket is formed in the base.

Clause 92. The orthodontic device of clause 91, further comprising a shaft extending from the registration element and the head is located at a distal end of the shaft.

Clause 93. The orthodontic device of clause 92, wherein the socket includes an aperture that captures the shaft and head.

Clause 94. The orthodontic device of clause 93, wherein the socket has a diameter that is greater than a diameter of the shaft and less than a diameter of the head.

Clause 95. The orthodontic device of clause 94, wherein the head includes a first diameter proximal the shaft and a second diameter distal of the shaft, wherein the first diameter is greater than the second diameter.

Clause 96. The orthodontic device of clause 95, wherein a height of the head is a distance between the first diameter and the second diameter and the socket has a depth, the depth of the socket being greater than the height of the head.

Clause 97. The orthodontic device of clause 96, wherein the coupling allows three degrees of rotation and three degrees of translation between the registration element and the base.

Clause 98. couplings each include a ball extending from a shaft at a first side of the respective coupling and a socket and aperture formed in a second side of the respective coupling, wherein the ball of the first coupling is captured within the socked of the second coupling.

Clause 99. The orthodontic device of clause 91, wherein a diameter of the ball of the first coupling is larger than a diameter of the aperture of the second coupling.

Clause 100. The orthodontic device of clause 91, wherein the socket and head are fabricated together with the head is fabricated captured within the socket.

Clause 101. The orthodontic device of clause 73, wherein the coupling comprises a spring.

Clause 102. The orthodontic device of clause 101, wherein the spring is coupled to an outer surface of the base.

Clause 103. The orthodontic device of clause 101, further comprising a blind hole in the base and the coupling is coupled to an inner surface of the blind hole.

Clause 104. The orthodontic device of clause 73, wherein the base is planar.

Clause 105. An orthodontic device, comprising: a registration element; and a first flexible arm extending from the registration element on a lingual side, the first flexible arm having a connected end and a distal end, the distal end configured to extend at least part way over the tooth and apply a lingual force to bias the registration element against the tooth; and an accommodating attachment support on a buccal side of the orthodontic device and an attachment releasably carried by the attachment support.

Clause 106. The orthodontic device of clause 106, wherein the attachment support comprise an attachment frame that coupes to an attachment and a frame belt that extends between the attachment support and the attachment support.

Clause 107. The orthodontic device of clause 107, wherein the frame belt comprises channels formed therein to allow the accommodating attachment support to deflect.

Clause 108. The orthodontic device of clause 107, wherein the frame belt allows for deflection of the attachment frame by up to 300 microns without breaking.

Clause 109. The orthodontic device of clause 107, wherein the frame belt allows for deflection of the attachment frame by up to 200 microns without breaking.

Clause 110. The orthodontic device of clause 106, wherein the attachment support comprise an attachment frame that coupes to an attachment and the attachment frame comprises channels formed therein to allow the accommodating attachment support, including the attachment frame, to deflect.

Clause 111. An orthodontic device, comprising: a plurally of registration elements; and a plurality of first flexible arm extending from each registration element on a lingual side, the first flexible arm having a connected end and a distal end, the distal end configured to extend at least part way over the tooth and apply a lingual force to bias the registration element against the tooth; and a plurality of attachment supports each located on a buccal side of the plurally of registration elements and comprising an attachment frame that is releasably coupled to an attachment.

Clause 112. The orthodontic device of clause 111, wherein the attachment frame comprises stress concentrators formed therein.

Clause 113. The orthodontic device of clause 112, wherein the stress concentrators are located along a mesial-distal axis of the attachment frame.

Clause 114. The orthodontic device of clause 111, wherein the stress concentrators are notches in the frame.

Clause 115. The orthodontic device of clause 114, wherein the notches extend through the frame less than 50% of a thickness of the frame.

Clause 116. The orthodontic device of clause 114, wherein the notches extend through the frame between 20% and 50% of the thickness of the frame.

Clause 117. The orthodontic device of clause 112, wherein the plurality of registration elements are arranged to register with anterior and posterior teeth and wherein the stress concentrators of anterior registration elements are arranged along a mesial-distal axis and stress concentrators of posterior registration elements are arranged gingivally-occlusally.

Clause 118. The orthodontic device of clause 111, wherein the attachment frame comprises a tool notch formed therein for receiving a dental tool.

Clause 119. The orthodontic device of clause 118, wherein the tool notch is formed in a tooth facing surface at the outer perimeter of the attachment frame.

Clause 120. The orthodontic device of clause 118, wherein the tool notch comprises opposing sidewalls located at opposite ends of the notch.

Clause 121. The orthodontic device of clause 120, further comprising feedback structures located on the perimeter of the frame at the ends of the notch.

Clause 122. The orthodontic device of clause 121, wherein the feedback structures are tactile feedback structures and extends from the perimeter of the frame.

Clause 123. The orthodontic device of clause 118, wherein the tool notch comprises an upper surface that is configured to face the tooth to which the registration element is registered.

Clause 124. The orthodontic device of clause 123, further comprising feedback structures on the external perimeter of the frame proximal the upper surface.

Clause 125. The orthodontic device of clause 124, wherein the feedback structures are tactile and visual feedback structures and extends from the perimeter of the frame.

Clause 126. A method used in fabricating an orthodontic device for a patient's dentition, the method comprising: generating a three-dimensional model for the patient's dentition; determining locations of attachments for placement of the patent's teeth; and generating a model of an attachment placement device for placing the attachments at the locations.

Clause 127. The method of clause 126, further comprising fabricating the attachment placement device.

Clause 128. The method of clause 126, wherein the model of the attachment placement device includes any of the features of the orthodontic devices of clauses 1-125.

Clause 129. The method of clause 126, wherein the attachment placement device includes: a plurality of registration elements, individual ones of the plurality of registration elements comprising a retention support for holding the registration element to one or more teeth of a patient: an attachment support extending from one or more of the plurality of registration elements, the attachment support releasably coupled to one or more of an attachment or an attachment mold: a base; and a plurality of couplings that couple the registration elements to the base, the coupling allowing for articulation between the adjacent registration elements.

Clause 130. The method of clause 129, wherein the coupling is a captured head and socket coupling.

Clause 131. The method of clause 130, wherein the captured head extends from the registration element and the socket is formed in the base.

Clause 132. The method of clause 131, wherein the attachment placement device further comprises a shaft extending from the registration element and the head is located at a distal end of the shaft.

Clause 133. The method of clause 132, wherein the socket includes an aperture that captures the shaft and head.

Clause 134. The method of clause 133, wherein the socket has a diameter that is greater than a diameter of the shaft and less than a diameter of the head.

Clause 135. The method of clause 134, wherein the head includes a first diameter proximal the shaft and a second diameter distal of the shaft, wherein the first diameter is greater than the second diameter.

Clause 136. The method of clause 135, wherein a height of the head is a distance between the first diameter and the second diameter and the socket has a depth, the depth of the socket being greater than the height of the head.

Clause 137. The method of clause 132, wherein head and socket are fabricated simultaneously with the head captured by the socket.

Clause 138. A method of using an orthodontic device, the method comprising: placing an attachment placement device comprising a first attachment to a patient's teeth: affixing a first attachment to the patient's teeth; and removing the attachment placement device by fracturing the attachment placement device from the attachment.

Clause 139. The method of clause 138, wherein the attachment placement device is any of the orthodontic devices of clauses 1-125.

Clause 140. The method of clause 138, wherein removing the attachment placement device includes separating a gingival portion of an attachment frame from the attachment placement device.

Clause 141. The method of clause 140, wherein removing the attachment placement device includes rotating a posterior portion of the attachment placement device way from the occlusal surfaces of the patient's teeth about a mesial-distal axis of the posterior teeth and separating the occlusal portion of the attachment placement device from the posterior teeth.

Clause 142. The method of clause 141, wherein removing the attachment placement device includes rotating a anterior portion of the attachment placement device way from the incisal surfaces of the patient's teeth about a mesial-distal axis of the anterior teeth and separating the occlusal portion of the attachment placement device from the anterior teeth.

Clause 143. The method of clause 142, wherein the attachment placement device is a first attachment placement device for a first quadrant of teeth of the patient and further comprising removing second, third, and fourth attachment placement devices for each of the second, third and fourth quadrants of a patient's teeth.

Clause 144. The method of clause 143, wherein a quadrant extends from a midline of an upper or lower arch between the central incisors towards the posterior teeth.

Clause 145. An orthodontic device of one of clauses 1-37, wherein the coupling is a coupling means between adjacent registration elements, the coupling means for allowing articulation between the adjacent registration elements.

Clause 146. An orthodontic device of one of clause 38-70, further comprising a retention means that includes the first flexible arm, for retaining the device on a patient's tooth.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. An orthodontic device, comprising:
    a plurality of attachments shaped to interact with and to impart forces using an interior surface of an aligner;
    a plurality of registration elements;
    a plurality of first flexible arms extending from a lingual side of the plurality of registration elements, each first flexible arm of the plurality of first flexible arms having a connected end and a distal end, the distal end configured to extend at least part way over a respective tooth and apply a lingual force to bias a respective registration element of the plurality of registration elements against the respective tooth;
    a plurality of attachment supports located on a buccal side of the plurality of registration elements, wherein each attachment support of the plurality of supports comprises an attachment frame that is integrally formed with and releasably coupled to a respective one of the plurality of attachments; and
    a tool notch for receiving a dental tool, the tool notch formed in a tooth contacting surface of the attachment frame that is configured to directly contact the tooth when worn by a patient and wherein the tool notch is located at an outer perimeter of the attachment frame, wherein the tool notch includes a surface that faces the tooth and defines a portion of the tool notch.

2. The orthodontic device of claim 1, wherein the attachment frame comprises stress concentrators formed therein.

3. The orthodontic device of claim 2, wherein the stress concentrators are located along a mesial-distal axis of the attachment frame.

4. The orthodontic device of claim 2, wherein the stress concentrators are notches in the attachment frame.

5. The orthodontic device of claim 4, wherein the notches extend through the frame in a buccal-lingual direction less than 50% of a thickness of the frame.

6. The orthodontic device of claim 4, wherein the notches extend through the frame between 20% and 50% of the thickness of the frame.

7. The orthodontic device of claim 2, wherein the plurality of registration elements are arranged to register with anterior and posterior teeth and wherein the stress concentrators of anterior registration elements are arranged along a mesial-distal axis and stress concentrators of posterior registration elements are arranged gingivally-occlusally.

8. The orthodontic device of claim 1, wherein the tool notch comprises opposing sidewalls located at opposite ends of the tool notch.

9. The orthodontic device of claim 8, further comprising feedback structures located on a perimeter of the attachment frame at the ends of the tool notch.

10. The orthodontic device of claim 9, wherein the feedback structures are tactile feedback structures and extend from the perimeter of the frame.

11. The orthodontic device of claim 1, further comprising feedback structures on an external perimeter of the attachment frame proximal the surface of the tool notch that faces the tooth.

12. The orthodontic device of claim 11, wherein the feedback structures are tactile and visual feedback structures and extend from the perimeter of the attachment frame.

13. The orthodontic device of claim 1, wherein the orthodontic device further comprises a plurality of additively formed layers.

14. The orthodontic device of claim 1, wherein the orthodontic device is three-dimensionally (3D) printed.

15. The orthodontic device of claim 1, wherein at least one side surface defines a portion of the tool notch wherein the tool notch comprises the at least one side surface.

16. The orthodontic device of claim 15, wherein the at least one side surface extends from the upper surface of the tool notch that faces the tooth towards the tooth.

17. A method of using an orthodontic device, the method comprising:
    placing an attachment placement device comprising a first attachment to a patient's teeth, the attachment placement device including:
        the first attachment shaped to interact with and to impart forces using an interior surface of an aligner;
        a registration element;
        a first flexible arm extending from a lingual side of the registration element, the first flexible arm having a connected end and a distal end, the distal end configured to extend at least part way over a tooth of the patient and apply a lingual force to bias the registration element against the tooth of the patient; and an attachment support located on a buccal side of the registration element, wherein the attachment support comprises an attachment frame that is integrally formed with and releasably coupled to the first attachment; and a tool notch for receiving a dental tool, the tool notch formed in a tooth contacting surface of the attachment frame that is configured to directly contact the tooth when worn by a patient and wherein the tool notch is located at an outer perimeter of the attachment frame, wherein the tool notch includes a surface that faces the tooth and defines a portion of the tool notch; and removing the attachment placement device by inserting a dental tool into the tool notch and fracturing the attachment placement device from the attachment with the dental tool in the tool notch.

18. The method of claim 17, wherein removing the attachment placement device includes separating a gingival portion of the attachment frame from the attachment placement device.

19. The method of claim 18, wherein removing the attachment placement device includes rotating a posterior portion of the attachment placement device away from occlusal surfaces of the patient's teeth about a mesial-distal axis of posterior teeth and separating an occlusal portion of the attachment placement device from the posterior teeth.

20. The method of claim 19, wherein removing the attachment placement device includes rotating an anterior portion of the attachment placement device away from incisal surfaces of the patient's teeth about a mesial-distal axis of anterior teeth and separating the occlusal portion of the attachment placement device from the anterior teeth.

21. The method of claim 20, wherein the attachment placement device is a first attachment placement device for a first quadrant of teeth of the patient and further comprising removing second, third, and fourth attachment placement devices for each of the second, third and fourth quadrants of a patient's teeth.

* * * * *